(12) United States Patent
Gupta et al.

(10) Patent No.: US 12,260,358 B1
(45) Date of Patent: Mar. 25, 2025

(54) USING GEOCODED PROVIDER MODELS TO IMPROVE EFFICIENCY OF A TRANSPORTATION MATCHING SYSTEM

(71) Applicant: Lyft, Inc., San Francisco, CA (US)

(72) Inventors: Gaurav Gupta, Burlingame, CA (US); Ehud Milo, San Mateo, CA (US); Omar Khalid, Redmond, WA (US); Amy J. Kim, San Francisco, CA (US); Jacky Yi Han Lu, San Mateo, CA (US); Richard Zhao, San Francisco, CA (US); Robert A. Farmer, San Francisco, CA (US); Akash Gaurav Shah, Millbrae, CA (US)

(73) Assignee: Lyft, Inc., San Francisco, CA (US)

( * ) Notice: Subject to any disclaimer, the term of this patent is extended or adjusted under 35 U.S.C. 154(b) by 174 days.

(21) Appl. No.: 18/048,545

(22) Filed: Oct. 21, 2022

Related U.S. Application Data

(63) Continuation of application No. 16/780,712, filed on Feb. 3, 2020, now Pat. No. 11,494,714, which is a continuation of application No. 16/125,563, filed on Sep. 7, 2018, now Pat. No. 10,552,773.

(51) Int. Cl.
*G06Q 10/0631* (2023.01)
*G06N 20/00* (2019.01)

(52) U.S. Cl.
CPC ....... *G06Q 10/06311* (2013.01); *G06N 20/00* (2019.01); *G06Q 2240/00* (2013.01)

(58) Field of Classification Search
CPC .................. G06Q 10/06311; G06N 20/00
See application file for complete search history.

(56) References Cited

U.S. PATENT DOCUMENTS

| | | |
|---|---|---|
| 7,663,528 B1 | 2/2010 | Malakian et al. |
| 9,358,986 B2 | 6/2016 | Hunt |
| 9,864,778 B1 | 1/2018 | Strand et al. |
| 10,032,181 B1 | 7/2018 | Madhow et al. |
| 10,157,436 B2 | 12/2018 | Samocha et al. |

(Continued)

FOREIGN PATENT DOCUMENTS

WO    WO 2020/159431 A1    8/2020

OTHER PUBLICATIONS

Alexander et al., Origin-destination trips by purpose and time of day inferred from mobile phone data, 2015, Elsevier, Transportation Research Part C 58, pp. 240-250 (Year: 2015).

(Continued)

*Primary Examiner* — Dylan C White
(74) *Attorney, Agent, or Firm* — Keller Preece PLLC

(57) ABSTRACT

This disclosure describes a transportation matching system that manages the allocation of transportation providers by training and utilizing multiple machine-learning models to identify, allocate, and serve specific transportation providers with customized opportunities to relocate the transportation providers between geocoded areas in a geocoded region. For instance, the transportation matching system trains and utilizes an incremental provider model, a provider allocation model, and personalized provider behavioral models as well as a customized provider interface generator to satisfy anticipated transportation requests and improve transportation matching within a geocoded region.

20 Claims, 22 Drawing Sheets

(56) References Cited

U.S. PATENT DOCUMENTS

| | | |
|---|---|---|
| 10,552,773 B1 | 2/2020 | Shah et al. |
| 10,706,487 B1 | 7/2020 | Chachra et al. |
| 10,794,713 B2 | 10/2020 | Magazinik et al. |
| 11,035,683 B2 | 6/2021 | Marco |
| 11,514,546 B2 | 11/2022 | Chachra et al. |
| 11,551,139 B1 | 1/2023 | Finamore et al. |
| 11,763,411 B1 | 9/2023 | Chachra et al. |
| 11,887,483 B2 * | 1/2024 | Bajaj ............... G08G 1/202 |
| 2005/0015316 A1 | 1/2005 | Salluzzo |
| 2005/0021225 A1 | 1/2005 | Kantarjiev et al. |
| 2006/0069601 A1 | 3/2006 | Simon et al. |
| 2008/0195428 A1 | 8/2008 | O'Sullivan |
| 2009/0119006 A1 | 5/2009 | Silver et al. |
| 2009/0210262 A1 | 8/2009 | Clark et al. |
| 2009/0325556 A1 | 12/2009 | Lee et al. |
| 2010/0268450 A1 | 10/2010 | Stephen |
| 2011/0161116 A1 | 6/2011 | Peak et al. |
| 2011/0184640 A1 | 7/2011 | Coleman et al. |
| 2011/0246404 A1 | 10/2011 | Lehmann et al. |
| 2012/0246039 A1 | 9/2012 | Fain et al. |
| 2012/0316763 A1 | 12/2012 | Haynes, III et al. |
| 2013/0041708 A1 | 2/2013 | Jackson, Jr. et al. |
| 2013/0132140 A1 * | 5/2013 | Amin ............... G06Q 10/06311 |
| | | 705/7.13 |
| 2013/0246207 A1 | 9/2013 | Novak et al. |
| 2013/0253969 A1 | 9/2013 | Das et al. |
| 2014/0129951 A1 | 5/2014 | Amin et al. |
| 2014/0156410 A1 | 6/2014 | Wuersch et al. |
| 2014/0172439 A1 | 6/2014 | Conway et al. |
| 2014/0207375 A1 | 7/2014 | Lerenc |
| 2014/0279654 A1 | 9/2014 | Lievens et al. |
| 2014/0337123 A1 | 11/2014 | Nuernberg et al. |
| 2014/0358435 A1 | 12/2014 | Bell et al. |
| 2015/0039214 A1 | 2/2015 | McClellan et al. |
| 2015/0046080 A1 | 2/2015 | Wesselius et al. |
| 2015/0081399 A1 | 3/2015 | Mitchell et al. |
| 2015/0154810 A1 | 6/2015 | Tew et al. |
| 2015/0161554 A1 | 6/2015 | Sweeney et al. |
| 2015/0161564 A1 | 6/2015 | Sweeney et al. |
| 2015/0206267 A1 | 7/2015 | Khanna et al. |
| 2015/0242772 A1 | 8/2015 | Backof, II et al. |
| 2015/0262430 A1 | 9/2015 | Farrelly et al. |
| 2015/0339928 A1 | 11/2015 | Ramanujam |
| 2015/0379437 A1 | 12/2015 | Reich |
| 2016/0026936 A1 | 1/2016 | Richardson et al. |
| 2016/0027307 A1 | 1/2016 | Abhyanker et al. |
| 2016/0034845 A1 | 2/2016 | Hiyama et al. |
| 2016/0098649 A1 | 4/2016 | Ifrach et al. |
| 2016/0117610 A1 | 4/2016 | Ikeda et al. |
| 2016/0148164 A1 | 5/2016 | Luk et al. |
| 2016/0171574 A1 | 6/2016 | Paulucci et al. |
| 2016/0171882 A1 | 6/2016 | Handley |
| 2016/0209220 A1 * | 7/2016 | Laetz ............... G06Q 10/02 |
| 2016/0320198 A1 | 11/2016 | Liu et al. |
| 2016/0321566 A1 | 11/2016 | Liu et al. |
| 2017/0034110 A1 | 2/2017 | Bijor et al. |
| 2017/0102243 A1 | 4/2017 | Samocha et al. |
| 2017/0124506 A1 | 5/2017 | Khan |
| 2017/0154348 A1 | 6/2017 | Biswas et al. |
| 2017/0169377 A1 | 6/2017 | Liu et al. |
| 2017/0169535 A1 | 6/2017 | Tolkin et al. |
| 2017/0191842 A1 | 7/2017 | Igor et al. |
| 2017/0227370 A1 * | 8/2017 | O'Mahony ........ G01C 21/3453 |
| 2017/0262790 A1 | 9/2017 | Khasis |
| 2017/0353536 A1 | 12/2017 | Shraer et al. |
| 2017/0372235 A1 | 12/2017 | Dayama et al. |
| 2018/0025407 A1 | 1/2018 | Zhang et al. |
| 2018/0032928 A1 | 2/2018 | Li et al. |
| 2018/0075380 A1 | 3/2018 | Perl et al. |
| 2018/0101878 A1 | 4/2018 | Marueli et al. |
| 2018/0121847 A1 | 5/2018 | Zhao et al. |
| 2018/0121958 A1 | 5/2018 | Aist et al. |
| 2018/0158322 A1 | 6/2018 | McDonnell et al. |
| 2018/0174446 A1 | 6/2018 | Wang |
| 2018/0190040 A1 | 7/2018 | Batten et al. |
| 2018/0211541 A1 | 7/2018 | Rakah et al. |
| 2018/0225796 A1 | 8/2018 | Liu |
| 2018/0232840 A1 * | 8/2018 | Liu ............... G06F 16/29 |
| 2019/0066251 A1 | 2/2019 | Samocha et al. |
| 2019/0080340 A1 | 3/2019 | Berger et al. |
| 2019/0340928 A1 | 11/2019 | Goldman et al. |
| 2020/0082313 A1 | 3/2020 | Crapis et al. |
| 2020/0082315 A1 * | 3/2020 | Crapis ............... G06Q 10/06311 |
| 2020/0250600 A1 | 8/2020 | Gupta et al. |
| 2021/0072035 A1 | 3/2021 | Magazinik et al. |
| 2021/0192292 A1 | 6/2021 | Zhai |
| 2021/0192555 A1 | 6/2021 | Tang |
| 2024/0070571 A1 * | 2/2024 | Mayer ............... G06Q 10/025 |

OTHER PUBLICATIONS

U.S. Appl. No. 16/539,965, filed Apr. 21, 2023, Office Action.
U.S. Appl. No. 18/059,071, filed Mar. 30, 2023, Office Action.
U.S. Appl. No. 18/059,071, filed May 2, 2023, Notice of Allowance.
Ma, et al. "Spatio-temporal pricing for ridesharing platforms." Operations Research 70.2 (2022): 1025-1041. [online], [retrieved on Dec. 17, 2022]. Retrieved from the Internet <https://arxiv.orgiabs/1801.04015> (Year: 2018).
U.S. Appl. No. 16/944,428, filed Dec. 27, 2022, Office Action.
U.S. Appl. No. 17/063,403, filed Dec. 28, 2022, Office Action.
U.S. Appl. No. 17/063,403, filed Mar. 22, 2023, Notice of Allowance.
U.S. Appl. No. 16/539,965, filed Oct. 26, 2023, Office Action.
U.S. Appl. No. 16/944,428, filed Dec. 13, 2023, Office Action.
Chowdhry, Amit, Uber: Users are more likely to pay surge pricing if their phone battery is low, May 25, 2016. Forbes.com https://www.forbes.conn/sites/annitchowdhry/2016/05/25/uber-low-battery/#732fbb8074b3 (Year: 2016).
European Search Report for European Patent Application No. EP 17195935.6, mailed Dec. 11, 2017, 9 pages.
Office Action as received in European Application 17195935.6 dated Oct. 18, 2019.
Summons to attend oral proceedings as received in European Application 17195935.6 dated Jun. 16, 2020.
Office Action as received in Israeli Application 254949 dated Sep. 24, 2019.
Office Action as received in Israeli Application 254949 dated Jul. 26, 2020.
Lyft Help; "Personal Power Zones"; Date downloaded Jan. 12, 2022; https://help.lyft.com/hc/e/articles/115012926807-Personal-Power-Zones.
Non-final Office Action for U.S. Appl. No. 14/985,565, mailed Aug. 29, 2017.
Final Office Action for U.S. Appl. No. 14/985,565, mailed Feb. 21, 2018.
Non-final Office Action for U.S. Appl. No. 14/985,565, mailed May 29, 2018.
Final Office Action for U.S. Appl. No. 14/985,565, mailed Dec. 17, 2018.
Non-final Office Action for U.S. Appl. No. 14/985,565, mailed Sep. 16, 2019.
Non-final Office Action for U.S. Appl. No. 15/290,366, mailed Jun. 25, 2019.
U.S. Appl. No. 16/125,563, filed Nov. 30, 2018, Office Action.
U.S. Appl. No. 16/125,563, filed May 1, 2019, Office Action.
U.S. Appl. No. 16/125,563, filed Oct. 8, 2019, Notice of Allowance.
U.S. Appl. No. 16/125,551, filed Aug. 14, 2020, Office Action.
U.S. Appl. No. 16/125,527, filed Aug. 18, 2020, Office Action.
U.S. Appl. No. 16/125,540, filed Aug. 19, 2020, Office Action.
U.S. Appl. No. 15/810,028, filed Dec. 2, 2019, Office Action.
U.S. Appl. No. 15/810,028, filed Apr. 30, 2019, Notice of Allowance.
U.S. Appl. No. 16/539,965, filed Jun. 8, 2021, Office Action.
U.S. Appl. No. 14/985,565, filed Aug. 29, 2017, Office Action.
U.S. Appl. No. 14/985,565, filed Feb. 21, 2018, Office Action.
U.S. Appl. No. 14/985,565, filed May 29, 2018, Office Action.
U.S. Appl. No. 14/985,565, filed Dec. 17, 2018, Office Action.
U.S. Appl. No. 14/985,565, filed Apr. 4, 2019, Office Action.

(56) References Cited

OTHER PUBLICATIONS

U.S. Appl. No. 14/985,565, filed Sep. 16, 2019, Office Action.
U.S. Appl. No. 14/985,565, filed Jun. 4, 2020, Notice of Allowance.
U.S. Appl. No. 15/290,366, filed Jun. 25, 2019, Office Action.
U.S. Appl. No. 15/290,366, filed Jan. 10, 2020, Office Action.
U.S. Appl. No. 15/290,366, filed May 13, 2020, Office Action.
U.S. Appl. No. 15/290,366, filed Oct. 27, 2020, Office Action.
U.S. Appl. No. 15/290,366, filed Mar. 22, 2021, Office Action.
U.S. Appl. No. 15/290,366, filed Jun. 29, 2021, Office Action.
U.S. Appl. No. 14/880,021, filed Jan. 13, 2017, Office Action.
U.S. Appl. No. 14/880,021, filed Jul. 11, 2017, Office Action.
U.S. Appl. No. 14/880,021, filed Dec. 5, 2017, Office Action.
U.S. Appl. No. 14/880,021, filed Apr. 17, 2018, Office Action.
U.S. Appl. No. 14/880,021, filed Aug. 23, 2018, Notice of Allowance.
U.S. Appl. No. 16/177,085, filed Nov. 5, 2020, Office Action.
U.S. Appl. No. 16/177,085, filed Mar. 25, 2021, Office Action.
U.S. Appl. No. 16/177,085, filed Feb. 18, 2022, Office Action.
U.S. Appl. No. 16/177,085, filed Jul. 18, 2022, Office Action.
U.S. Appl. No. 16/780,712, filed Mar. 25, 2022, Office Action.
U.S. Appl. No. 16/780,712, filed Jun. 24, 2022, Notice of Allowance.
U.S. Appl. No. 16/921,698, filed Mar. 31, 2022, Office Action.
U.S. Appl. No. 16/539,965, filed Sep. 26, 2022, Office Action.
U.S. Appl. No. 16/177,085, filed Oct. 27, 2022, Notice of Allowance.
U.S. Appl. No. 16/921,698, filed Jul. 26, 2022, Notice of Allowance.
U.S. Appl. No. 16/944,428, filed Jul. 21, 2023, Office Action.
U.S. Appl. No. 18/469,127, filed Apr. 11, 2024, Office Action.
U.S. Appl. No. 18/469,127, filed May 15, 2024, Notice of Allowance.
U.S. Appl. No. 16/944,428, filed Jul. 9, 2024, Office Action.

\* cited by examiner

USING GEOCODED PROVIDER MODELS TO IMPROVE EFFICIENCY OF A TRANSPORTATION MATCHING SYSTEM

CROSS-REFERENCE TO RELATED APPLICATIONS

The present application is a continuation of U.S. application Ser. No. 16/780,712, filed on Feb. 3, 2020, which is a continuation of U.S. application Ser. No. 16/125,563, filed on Sep. 7, 2018, now U.S. Pat. No. 10,552,773, issued on Feb. 4, 2020. The aforementioned applications are hereby incorporated by reference in their entirety.

BACKGROUND

In recent years, popularity and usage of on-demand transportation matching systems have significantly grown. Indeed, the proliferation of web and mobile applications easily enable requesting individuals to request transportation from one geographic area to another geographic area. For instance, an on-demand transportation matching system receives transportation requests and pairs the requests with providers that can transport requesting individuals to the destination locations. In addition, the on-demand transportation matching system provides tools to providers to pick up requesting individuals as well as transport them to the destination locations.

Some existing on-demand transportation matching systems manage networks of hundreds of thousands of providers as well as millions of requesting individuals. Furthermore, within a short time period, these on-demand transportation matching systems are often required to process thousands of transportation requests for a geographic area, where each request involves matching a requesting individual to a provider. Because of the significant technical complexity required to process such large volumes of transportation requests—often occurring at unexpected times—on-demand transportation matching systems often suffer from computational problems and inefficiencies.

As an initial problem, when a large number of transportation requests are received in a short timeframe within a region, these on-demand transportation matching systems commonly struggle to appropriately match the transportation requests because there are not enough providers within a satisfactory distance of the requesting individuals. Indeed, it is typical for the number of received transportation requests for one area to exceed the number of available providers, while at the same time, another area may have a surplus of available providers to the number of transportation requests. This results in delays in processing and matching each transportation request, which thereby increases the number of transportation requests that a transportation matching system handles at any particular time, thereby increasing the computational strain on the transportation matching system.

Some on-demand transportation matching systems have attempted to better allocate available providers across multiple areas to better match the demand of each area. However, these on-demand transportation matching systems have failed to identify an efficient approach that accurately redirects available providers to areas where transportation requests are anticipated. Indeed, these on-demand transportation matching systems employ approaches that are rigid, overly complicated, and computationally inefficient, which prohibits operation in near-real-time. Thus, because these on-demand transportation matching systems rely on outdated information, too often, these systems send providers to areas where they are not needed, wasting the computational resources of the system as well as the time of the providers.

These along with additional problems and issues exist with conventional transportation matching systems.

SUMMARY

This disclosure describes one or more embodiments of methods, non-transitory computer-readable media, and systems that solve the foregoing problems in addition to providing other benefits. While this summary refers to systems for simplicity, the summary also applies to certain disclosed methods and non-transitory computer-readable media. To solve the foregoing and other problems, the disclosed systems manage the allocating of transportation providers (or simply "providers") by training and utilizing multiple machine-learning models and optimization models (e.g., flow optimization models) to identify and allocate specific providers based on real-time data. Further, the disclosed systems generate and serve customized interfaces to providers to assist them in relocating within a region. Also, because of the efficiencies achieved by the disclosed systems, the disclosed systems can perform these actions in near-real-time for hundreds of thousands of providers as well as millions of requestors.

To illustrate, in various embodiments, the disclosed systems train and utilize an incremental provider model for a geocoded region (or simply "region") to generate incremental provider functions for each geocoded area (or simply "area") in the region. For instance, for each area in the region, the disclosed systems identify real-time forecasts of local and neighborhood transportation requests (or simply "requests") as well as the number of providers in the region that are available to fulfill requests within the area. In addition, the disclosed systems identify a conversion function for each of the areas, which is used along with the forecasts to generate incremental provider functions for each area. Generally, an incremental provider function outputs a metric that indicates the effect of adding one or more incremental transportation providers to an area in anticipation of requests that the area is expected to receive in the near future (or simply "anticipated requests").

In some embodiments, the disclosed systems utilize incremental provider metrics from the incremental provider functions generated for each of the areas to determine a transportation flow matrix. Indeed, the disclosed systems train and utilize a provider allocation model to determine how to reallocate and balance providers between areas of the region to better fulfill anticipated requests. For instance, the disclosed systems utilize the provider allocation model in connection with the number of available transportation providers in each area and the incremental provider metric for each area to determine the transportation flow matrix for the region.

Additionally, in one or more embodiments, the disclosed systems train and apply personalized provider behavioral models to determine which of the available providers to target for reallocation to a target area. For example, the disclosed systems can identify target areas within the region with a forecasted provider allocation shortage and, for each of the identified target areas, identify available providers to fulfill anticipated requests. Further, for each identified provider for each area, the disclosed systems apply a provider-specific personalized behavioral model to determine which of the providers to move to the target area. Further, the disclosed systems repeat selecting providers for each target area with a forecasted provider allocation shortage and, in some cases, for every area in the region simultaneously, while also ensuring that a provider is not selected to be moved to areas inconvenient for the provider (e.g., to non-adjacent areas or to areas that require too much travel for the provider).

Furthermore, in various embodiments, the disclosed systems generate customized provider interfaces for each provider selected for reallocation to a target area. For instance, the disclosed systems generate a customized user interface that includes a mapping interface portion and an accumulation interface portion. The mapping interface includes one or more zones that center around the target area. The accumulation interface portion includes an incremental accumulation (e.g., bonus) metric that increases as the provider approaches the target area and/or based on the time that the provider stays in each of the zones.

The following description sets forth additional features and advantages of one or more embodiments of the disclosed methods, non-transitory computer-readable media, and systems. In some cases, such features and advantages are evident to a skilled artisan from the description or learned by the practice of the disclosed embodiments.

BRIEF DESCRIPTION OF THE DRAWINGS

The detailed description refers to the drawings briefly described below.

DETAILED DESCRIPTION

Figure 1:
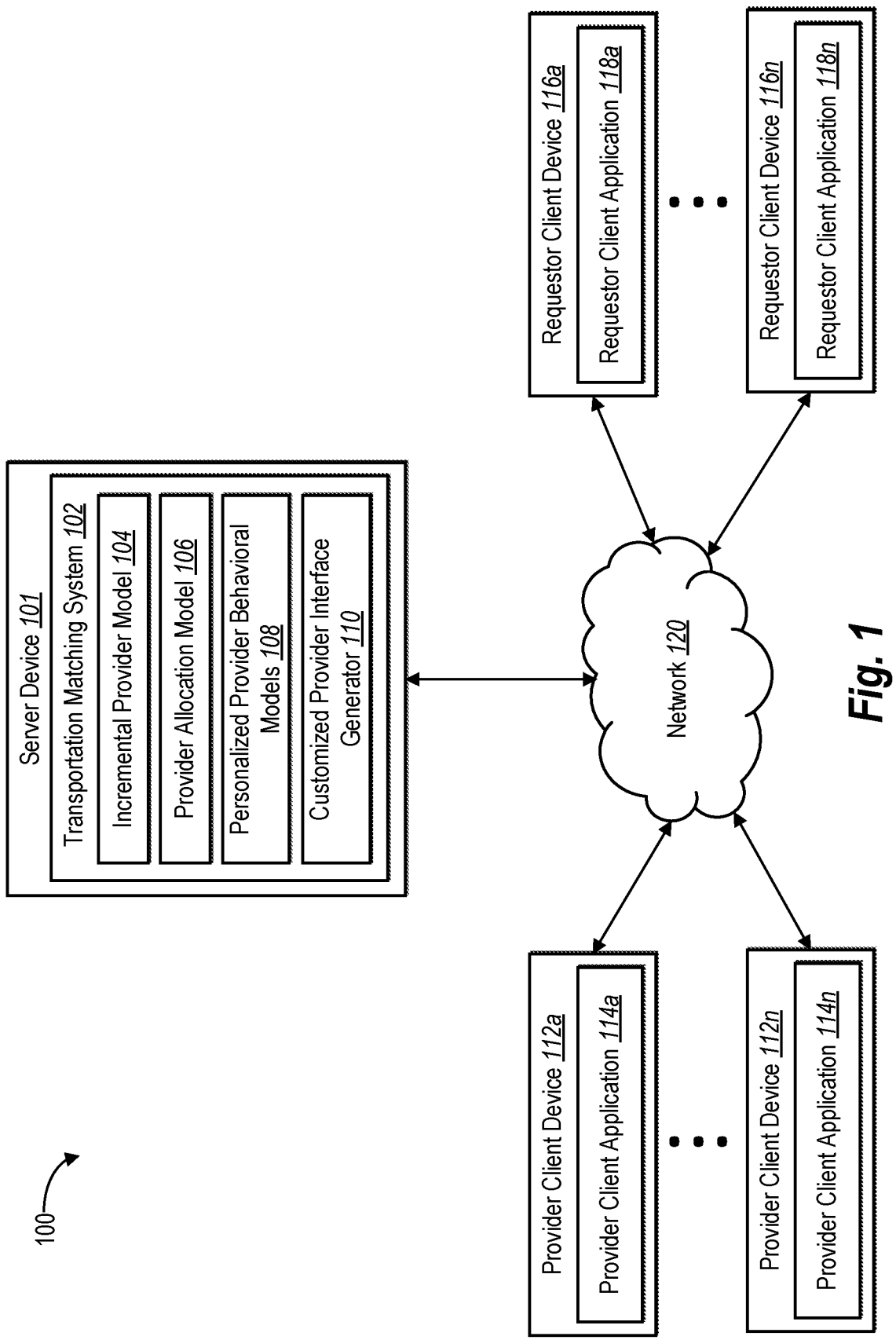
FIG. 1 illustrates a block diagram of an environment for implementing a dynamic transportation matching system in accordance with one or more embodiments.

This disclosure describes a dynamic transportation matching system that utilizes multiple machine-learning models to more efficiently process transportation requests across multiple geographic areas in a region. In particular, the transportation matching system trains and utilizes an incremental provider model, a provider allocation model, and personalized provider behavioral models as well as a customized provider interface generator to improve transportation matching within a geocoded region. Indeed, the transportation matching system utilizes multiple machine-learning models to efficiently identify areas within a region with a forecasted shortage as well as specific providers to reallocate to those identified areas. Further, because of the achieved efficiencies, the transportation matching system often manages the allocation of transportation providers within a region in real-time or near-real-time.

As mentioned above, the transportation matching system can train and utilize an incremental provider model to anticipate areas in a region where additional providers will be needed. Indeed, in various embodiments, the transportation matching system trains and utilizes the incremental provider model within a region to generate incremental provider functions for each area in the region. For instance, for each area in the region, the transportation matching system identifies real-time forecasts of requests in an area (e.g., ride request in the next 5-10 mins) as well as neighboring areas. Also, the transportation matching system identifies the number of providers in the region that are available to fulfill requests within the area, which is generally limited to providers within a predefined travel time or radius of the area.

In addition, the transportation matching system identifies a conversion function for each of the areas in the region. In various embodiments, the conversion function for an area is based on the forecasted requests as well as the providers in neighboring areas. In one or more embodiments, the conversion function identified for an area is based on requests and providers in neighboring areas (e.g., which influence demand-driven rates) as well as the estimated time of arrival of providers in neighboring areas. In some embodiments, the conversion function provides the likelihood that each available provider in the neighboring areas will fulfill a request from requestors originating in the area.

In various embodiments, the transportation matching system generates incremental provider functions for areas in the region based on applying the conversion function for an area to the forecasted number of transportation requests anticipated for the area (e.g., anticipated demand for the area). The incremental provider function for an area outputs metrics (i.e., incremental provider metrics) that indicate the effect of adding additional providers to the area or removing providers from the area.

Moreover, the transportation matching system generates the incremental provider model by combining the incremental provider functions generated for each area in the region. Indeed, the transportation matching system determines a separate incremental provider function for each area in the region based on a conversion function for the area, the number of providers available to fulfill transportation requests from the area, and the number of forecasted requests for the area and neighboring areas.

As also mentioned above, the transportation matching system can train and utilize a provider allocation model to determine where to relocate providers to better fulfill anticipated requests. Indeed, in one or more embodiments, the transportation matching system utilizes incremental provider metrics from the incremental provider functions generated for each area to determine a transportation flow matrix. As part of applying the provider allocation model to an area, the transportation matching system determines the number of providers that are available to fulfill requests for each area within the region. In some embodiments, the number of providers available to fulfill requests for an area includes providers beyond the boundary of the neighboring area, but still within a travel time threshold or radius.

In addition, the transportation matching system can determine a transportation flow matrix for the region based on the number of available providers and the incremental provider metrics specific to each region. For example, in various embodiments, the transportation matching system compares incremental provider metrics among adjacent and nearby areas in the region to determine which areas will receive the greatest benefit (i.e., value or incremental effect) of having one or more additional providers made available. Further, the transportation matching system performs a benefit maximization analysis across all areas in the region such that the transportation flow matrix indicates the optimal provider allocation across the region for a specified time interval.

Accordingly, the transportation flow matrix provides a mapping of how to reallocate providers within the region to fulfill more anticipated requests. In one or more embodiments, as part of generating the transportation flow matrix, the transportation matching system ensures that the transportation flow matrix does not suggest reallocating more providers than are currently available in the region, or reallocating providers beyond a threshold travel time.

As further mentioned above, the transportation matching system can train and utilize personalized provider behavior models to determine which providers to move to an area with an anticipated provider shortage. Indeed, in various embodiments, the transportation matching system identifies areas within the region with a forecasted provider allocation shortage and, for each of the identified areas, determines specific available providers to move to the identified areas to fulfill anticipated requests.

For example, in some embodiments, the transportation matching system identifies the transportation flow matrix described above, which provides forecast allocation values for each geocoded area in the region. In addition, the transportation matching system determines from the transportation flow matrix the areas in the region that have a forecasted provider allocation shortage (e.g., target areas). For each target area, the transportation matching system identifies providers that are available to fulfill requests in the target areas. In some embodiments, the available providers for an area also include those providers beyond the neighboring areas of a target area, but within a travel time threshold or radius, as mentioned above.

In addition, for each of the identified providers, the transportation matching system utilizes a personalized provider behavioral model trained specifically for the provider to determine a probability that the provider will relocate to a target area. In some embodiments, the personalized provider behavioral model also provides one or more incentives that would be most effective in relocating the provider to the target area and corresponding probabilities for each incentive.

Upon applying a personalized provider behavioral model to each identified provider for the target area, the transportation matching system can select one or more providers to attract to the target area based on the output of the provider's respective personalized behavioral model. Further, the transportation matching system can repeat selecting providers to attract for each target area utilizing the personalized provider behavioral models.

In one or more embodiments, the transportation matching system determines that the same provider is selected for reallocation to different target areas. In some embodiments, the transportation matching system determines to send the provider to one of the selected target areas over the other selected target areas. In other embodiments, the transportation matching system determines to send the selected provider to either selected target area, particularly if the areas are near or adjacent to one another.

As noted previously, the transportation matching system trains a separate personalized provider behavioral model for each provider. For example, in some embodiments, the transportation matching system feeds a provider's information and personal transportation data, such as details on previous fulfilled requests and previous incentives, to a personalized provider behavioral model to train the personalized provider behavioral model to predict a probability that the provider will relocate to a target area to fulfill a request. Often, the transportation matching system trains and maintains the personalized provider behavioral models online.

As also mentioned above, the transportation matching system can generate customized provider interfaces for the provider selected for reallocation to a target area within the region. Indeed, in various embodiments, the transportation matching system generates a customized provider interface (i.e., user interface) that includes a mapping interface portion and an accumulation interface portion. The mapping interface includes a map of the target area as well as the current location of the provider. Further, the map portion includes one or more zones that center around a target area (e.g., an inner zone around the target area and a second zone around the inner zone). The accumulation interface portion includes an incremental bonus metric (i.e., accumulation metric) that increases as the provider approaches the target area and/or based on the time that the provider stays in each of the zones.

In some embodiments, the transportation matching system determines a minimum bonus amount (i.e., a minimum accumulation amount), an incremental bonus amount (i.e., an incremental accumulation amount), and an incremental rate for each of the zones. As the provider moves, the mapping interface portion updates the location of the provider. Further, when the transportation matching system detects that a provider crosses into an outer zone, the transportation matching system increases the incremental accumulation metric to the minimum amount for the outer zone. Further, as the provider stays within the outer zone, the transportation matching system increases the incremental accumulation metric by the corresponding incremental rate until the maximum accumulation amount for the outer zone is reached. The transportation matching system can repeat the above actions when the provider crosses and remains within the inner zone.

The transportation matching system can keep updating the customized provider interface until the transportation matching system matches the provider with a transportation request. For example, the transportation matching system maintains and updates the display of the customized provider interface on a client device associated with the provider until the customized provider interface is replaced with a matched request. In some embodiments, the transportation matching system applies the accumulation amount indicated by the incremental accumulation metric to the provider upon completing their next transportation request.

As apparent in the previous description, the transportation matching system provides many advantages and benefits over conventional on-demand transportation matching systems. For instance, unlike conventional systems that are particularly inefficient at matching requests with providers when either the number of providers or requests unexpectedly vary or rapidly increase, the transportation matching system utilizes flexible, simplistic, and efficient models that handle nearly any volume of requests in real-time (or near-real-time).

Indeed, conventional systems that relied on previous or historical data fail to handle high or fluctuating volumes of requests because these conventional systems use static parameters that do not account for current or future conditions. In contrast, the transportation matching system avoids the limits and rigidity of conventional systems by using multiple models that dynamically generate and adjust computational parameters using current and forecasted data. In this manner, the transportation matching system can efficiently manage the allocation of providers within a region in real-time based on actual market state conditions.

Further, in some embodiments, the transportation matching system employs pruning to further reduce computational requirements such that the transportation matching system can offer real-time results. For example, it is not uncommon for a region to include over 5,000 areas. However, the transportation matching system can analyze the areas in the region to determine which regions to exclude (e.g., skip) during one or more rounds of the allocation modeling. For example, the transportation matching system prunes out a number of areas such that the transportation matching system does not complete every model on every area, which in turn, reduces the computational requirements of redistributing the available providers between areas in the region. To illustrate, in one or more embodiments, the transportation matching system prunes out areas or groups of areas when determining the transportation flow matrix for the region based on the current and/or historical on inactivity within those regions.

In addition, in various embodiments, the transportation matching system provides improvements over conventional systems by better distributing provider resources across a region in order to fulfill anticipated and actual requests. As a result, the transportation matching system minimizes provider downtime as well as minimizes requestor wait times—saving computer processing resources to the transportation matching system as well as to providers and requestors. Accordingly, the transportation matching system results in an overall optimization in transportation services across a region with any given number of available providers.

Further, the transportation matching system offers providers with a customized graphical user interface that provides a minimalist interface format that automatically guides providers to target areas with minimal interaction by the provider. Indeed, the transportation matching system generates a user interface that automatically updates multiple portions of the interface without the need of the provider to enter feedback input, thus, reducing the number of steps the provider needs to relocate between areas within a region.

As illustrated by the foregoing discussion, the present disclosure utilizes a variety of terms to describe features and advantages of the transportation matching system. For reference, additional detail is now provided regarding the use of these terms. For example, as used herein, the term "transportation provider" (or simply "provider") refers to a driver or other person who operates a transportation vehicle and/or who interacts with a provider client device. In particular, the term "provider" can include a person who drives a transportation vehicle along various routes to pick up and drop off requestors. To illustrate, the transportation matching system matches a provider to a received request and serves instructions to the provider regarding when and where to travel in order to fulfill the matched transportation request. In response to a provider fulfilling a requested transport, the transportation matching system credits the provider based on, for example, the distance driven, the day and time, and any available incentives.

The term "provider" can include both available providers (e.g., a provider with an unoccupied vehicle) as well as providers currently offering a ride to a passenger in fulfillment of a transportation request. In general, however, the term provider, as used herein, will largely refer to an available provider, or a provider who is waiting to be matched to a requestor, or who is or will soon be able to pick up additional requestors (e.g., as permitted by a transportation type selected by the requestor).

In some embodiments, a provider refers to an autonomous transportation vehicle—that is, a self-driving vehicle that includes computer components and accompanying sensors for driving without manual-provider input from a human operator. When a transportation vehicle is an autonomous vehicle, the transportation vehicle may include components such as location components, one or more sensors by which the autonomous vehicle navigates, and/or other components necessary to navigate without a provider (or with minimal interactions with a provider). Additionally, in some embodiments, one or more of the vehicle subsystems include a hybrid self-driving vehicle with both self-driving functionality and some human operator interaction. This human operator interaction may work in concert with or independent of the self-driving functionality.

As mentioned above, providers are associated with transportation vehicles as well as provider client devices. The transportation vehicle may be an airplane, automobile, bicycle, motorcycle, or another vehicle. As used herein, the term "provider client devices" refers to a computing device associated with a provider. A provider client device can include a mobile device, such as a laptop, smartphone, or tablet associated with the provider. However, the provider client device may be any type of computing device as further explained below with reference to FIG. 16. In addition, the provider client device may include provider applications that utilize web browsers, applets, or other software applications (e.g., native applications) available to the provider client devices. Further, in some embodiments, the provider client devices are built-in to a transportation vehicle associated with the provider.

Although this disclosure often describes a provider as performing certain functions, the provider client device is often performing a corresponding function. For example, when the transportation matching system sends a transportation request to a provider—or queries location information from a provider—the transportation matching system sends the transportation request or location query to the provider client device associated with the provider.

The term "requestor" refers to a person (or group of people) who request a ride or other form of transportation from the transportation matching system. In particular, the term "requestor" may include a person who requests a ride or other form of transportation but who is still waiting for pickup. A requestor may also refer to a person whom a transportation vehicle has picked up and who is currently riding within the transportation vehicle to a destination (e.g., a destination indicated by a requestor).

In one or more embodiments, a requestor initiates a software application of the dynamic transportation matching system and/or whose requestor client device sends a query for a price estimate and/or a query for an estimated time of arrival to the dynamic transportation matching system. Accordingly, a requestor enters in a pickup location and/or destination for transportation (and optionally selects a transportation type) by interacting with graphical user interfaces of a requestor client application on their requestor client device.

Relatedly, the term "requestor client device" refers to a computing device associated with a requestor. A requestor client device includes a mobile device, such as a laptop, smartphone, or tablet associated with a requestor. However, the requestor client device may be any type of computing device as further explained below with reference to FIG. 16. Each of the requestor client devices respectively includes requestor client applications. In some embodiments, the requestor client applications comprise web browsers, applets, or other software applications (e.g., native applications) available to the requestor client devices. Additionally, in some instances, the transportation matching system provides data packets including instructions that, when executed by the requestor client devices, create or otherwise integrate requestor applications within an application or webpage.

As used herein, the term "transportation request" (or simply "request") refers to a collection of data sent to a transportation matching system comprising information associated with transportation being requested by a requestor. The Transportation matching system, in turn, matches the request to at least one provider (e.g., a transportation provider) who utilizes an associated transportation vehicle to fulfill the request. In one or more embodiments, a request includes a pickup location specified by the requestor computing device, a pickup time specified by the requestor computing device, a destination, and/or other preferences associated with the requestor computing device (e.g., a music preference or a provider rating preference). The transportation matching system matches a transportation request to a particular provider (i.e., provider computing device) based on the provider's proximity to the requestor computing device where the request originated as well as other factors, such as the destination specified in the request, driver ratings, and so forth.

As used herein, the term "geocoded region" (or simply "region") refers to a spatial subdivision or unit of a larger geographic space. For instance, in some embodiments the term "region" refers to a city, a collection of cities, or a portion of a city. Examples of regions include Chinatown of San Francisco, California; San Francisco, California; or one or more of the Boroughs of New York City, New York. In addition, a region is a collection of geocoded areas. As used herein, the term "geocoded area" (or simply "area") refers to a smaller unit of geographic space. For example, geocoded area can include a segment of a street, a street, a set of bordering streets, a city block, a set of city blocks, or another portion of an area within a larger geographic space. In many embodiments, a geocoded area represents a geographic hash ("geohash") in a grid (or other polygon shape) of geohashes within a larger pattern of geographic space (e.g., a region). Moreover, the term "target area" refers to an area in a region to which the transportation matching system is trying to move a provider. Commonly, a target area will be an area with an anticipated provider shortage in a time interval in the near future.

Relatedly, the term "neighborhood" refers to a geographic region that includes multiple areas, but that is smaller than a region. In particular, each area can be the focus of a neighborhood, and adjacent areas can have overlapping neighborhoods. For example, a neighborhood includes areas that are adjacent to a given area (e.g., immediately surrounding the given area), areas that are within a threshold distance or radius of the given area, and/or areas that are within a threshold travel time (e.g., driving distance) of the given area. Examples of neighborhoods are provided below with respect to FIG. 4B.

Similarly, as used herein, the term "neighborhood radius" refers to a neighborhood comprising all geographic areas within a predetermined travel time from a specific geographic area. For example, a neighborhood radius may include all areas within 8 or 10 minutes travel time from a given area. Relatedly, the term "dispatch radius" refers to a geographical radius comprising locations within a larger predetermined travel time from a given area. For example, a dispatch radius may include providers within 15 or 20 minutes travel time from the given area. In another example, a dispatch radius includes providers within 7-10 minutes travel time from the border of a neighborhood for a given area. Accordingly, a dispatch radius includes and often encompasses a neighborhood radius for a given area. As described below, some models utilize requestors and providers within the neighborhood radius of areas while other models utilize providers within the dispatch radius of the areas.

As mentioned above, the transportation matching system employs various inputs and metrics to train and utilize the machine-learning models described herein. One type of input includes forecasted data. As used in this disclose, the term "real-time transportation request forecasts" (or simply "forecasted requests") refers to anticipated transportation requests for a time interval in the near future (e.g., 3-7 mins, 5-10 mins, 5-30 mins, etc.) for one or more areas in the region. In particular, the term "forecasted requests" includes a real-time determination based on historical data as well as current market conditions (e.g., the number of requestors coming online and/or the location of available providers) of anticipated transportation requests for the one or more areas. In some embodiments, an area forecasted request corresponds to a number of transportation requests forecasted to be received from a single area. In other embodiments, a neighborhood forecasted request corresponds to a number of transportation requests forecasted to be received from a neighborhood for an area, as defined above.

Additionally, as used herein, the terms "passenger conversion function," "requestor conversion function," or simply "conversion function" refers to operations, algorithms, or process of determining whether a transportation request will result in a completed service. In particular, the term "conversion function" can output a probability or a likelihood (e.g., [0-1]) that a transportation request by a requestor (or from all requests) will convert into a pairing with a provider and/or a completed ride by the provider. Further examples of conversion functions are provided below in connection with FIG. 3.

As used herein, the term "model" refers to an algorithm, set of operations, or process for simulating and predicting a result given one or more inputs. An example of a model is a machine-learning model. As used herein, the term "machine-learning," refers to the process of constructing and implementing algorithms that can learn from and make predictions on data. For example, a machine-learning model can utilize algorithms to learn from, and make predictions on, known data by analyzing the known data to learn to generate outputs that reflect patterns and attributes of the known data. Thus, a machine-learning model makes high-level abstractions in data by generating data-driven predictions or decisions from the known input data. In various embodiments, a machine-learning model can include but is not limited to, support vector machines, linear regression, logistic regression, Bayesian networks, clustering, K-nearest neighbors (KNN), K-means, random forest learning, dimensionality reduction algorithms, boosting algorithms, artificial neural networks, deep learning, etc.

As mentioned above, this disclosure describes the training and utilization of various models. In particular, this disclosure focuses on an incremental provider model, a provider allocation model, and personalized provider behavioral models to improve managing and allocating transportation providers between areas in a region. Each of these models is described further below in connection with FIGS. 3-5, 6-8, and 9-12, respectively.

Figure 7B:
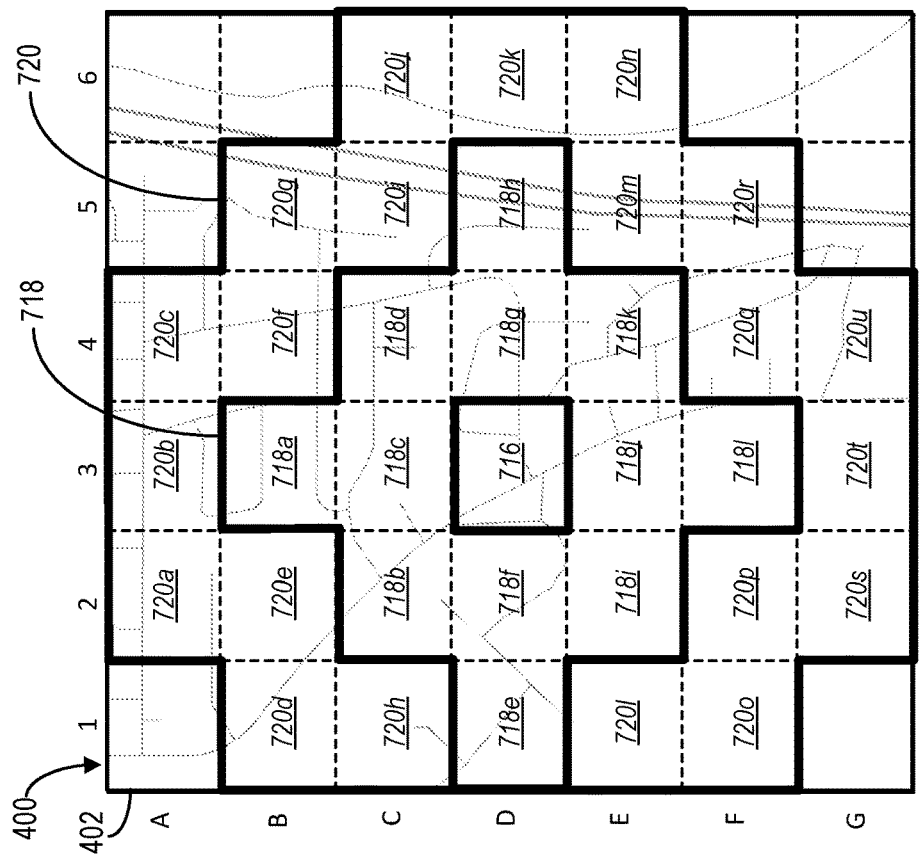
FIGS. 7A-7C illustrate utilizing the provider allocation model to determine a transportation flow matrix for the geocoded region in accordance with one or more embodiments.

As used herein, the term "transportation flow matrix" refers to a data structure output of the provider allocation model. In particular, the term "transportation flow matrix" includes a matrix or other data structure that indicates projected or anticipated needs of providers in a future time interval for areas in a region relative to one another. Indeed, the transportation flow matrix includes provider allocation values that forecast provider allocation shortages for areas at a future time interval (e.g., in the next 5-10 mins) based on current and forecasted requestor conditions and provider conditions. For case in explanation, in many embodiments, the transportation flow matrix assigns an integer value to each area in a region, as shown in FIG. 7C. However, in some embodiments, the transportation flow matrix employs non-integer numbers or other values to indicate anticipated provider needs among areas in a region.

The term "time interval," as used herein, refers to an interval of time determined or set by the transportation matching system. A time interval may be any time interval, including, but not limited to, a one-minute interval and a one-hour interval. For example, a time interval may be a five-minute interval from 2:15 p.m. to 2:20 p.m. on Thursday, Jun. 14, 2018. As another example, a time interval may be a fifteen-minute interval from 5:03 p.m. to 5:18 p.m. on Sunday, Feb. 4, 2018. In some embodiments, for example, the transportation matching system sets a time interval for which to forecast data, such as an estimated number of transportation requests.

In addition, as used herein, an "incentive" refers to an offer made by the transportation matching system that attracts, induces, or motivates a provider to relocate their transportation vehicle to a target area within the region. In one or more embodiments, an incentive motivates a provider to be physically present (e.g., driving, idle, or parked) within the target area within a desired time interval. Incentives can be offered to a provider via one or more incentive types. Incentive types can include a fixed monetary amount added to the next fulfilled request, a percentage amount that is applied to the next fulfilled request, a quota that pays out an accumulation (e.g., a bonus) upon a number of relocating requests being satisfied, discounts on fees and services (e.g., a membership discount, gas discount, insurance discount, vehicle reimbursement), accrued vacation hours, or a combination of incentive types.

Relatedly, the term "incremental accumulation metric" refers to a calculated measurement reflecting or providing the basis for an incentive (e.g., an incentive necessary to trigger additional provider activity). For example, in one or more embodiments, an incremental accumulation metric is specific to a type of incentive (a minimum bonus, a percentage-based bonus, a fixed-amount guarantee, etc.) and can be added to one or more subsequent fulfilled transportation request. Examples of calculating, presenting, and applying an incremental accumulation metric are provided below in connection with FIGS. 13A-13F.

As used herein, the term "zone" refers to a virtual boundary corresponding to a map. In particular, the term "zone" can include encompassing an area or portion thereof (e.g., a street, a block, a development). For instance, a zone can align with the boundaries of a target area. In some embodiments, the transportation matching system utilizes multiple zones, often expanding away from a target area in concentric shapes. For example, the transportation matching system creates an inner zone corresponding to the boundaries of a target area and an outer zone corresponding to the boundaries of the neighborhood surrounding a target area. The width of a zone can be based on map distance, travel time, geographical features, or aligned with the boundaries of areas in a region. As described below in connection with FIGS. 13A-13F, the incremental accumulation metric can have a minimum amount and a maximum amount corresponding to one or more zones.

Figure 2:
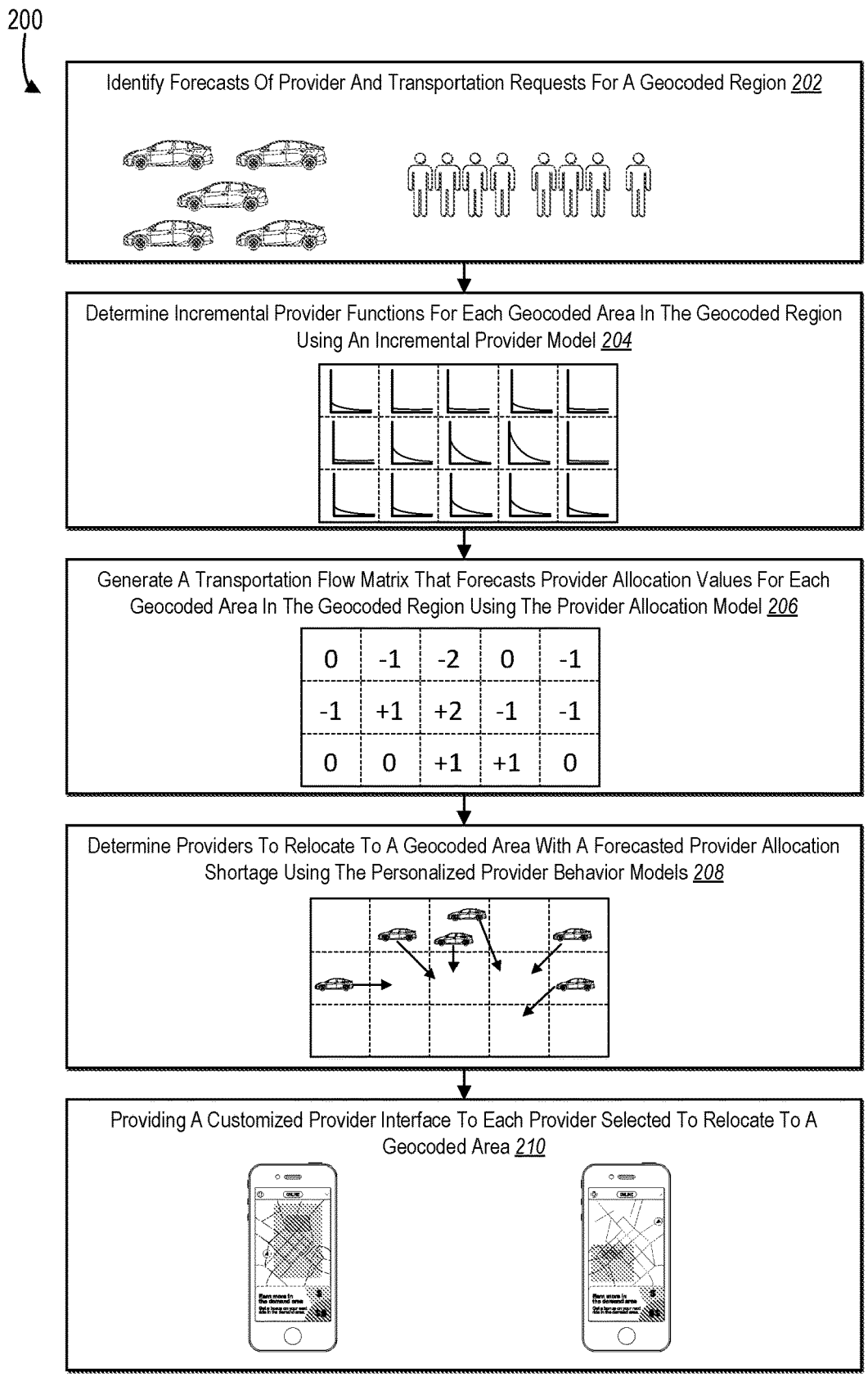
FIG. 2 illustrates an overview of the transportation matching system managing the allocation of transportation providers within a geocoded region in accordance with one or more embodiments.

Referring now to the figures, the figures illustrate the transportation matching system with respect to managing and allocating transportation providers between areas in a region by training and/or applying various models. While the following figures provide illustrations and accompanying description with respect to driver-operated cars, the figures apply to other types of transportation vehicles as well as driverless or autonomous vehicles that can freely travel between areas within a region. Further, the description with respect to FIGS. 1 and 2 provides an overview of the transportation matching system. After providing an overview, the disclosure describes components and processes of the transportation matching system in further detail with reference to subsequent figures.

To illustrate, FIG. 1 includes a block diagram of an environment 100 for implementing a transportation matching system 102 in accordance with one or more embodiments. As shown in FIG. 1, the environment 100 includes the transportation matching system 102 on a server device 101 (or multiple server devices), provider client devices 112a-112n, requestor client devices 116a-116n, and a network 120. The server device 101 can include one or more computing devices to implement the transportation matching system 102. Additional description regarding the illustrated devices (101, 112a-112n, and 116a-116n) is provided with respect to FIG. 16 below.

As shown, the transportation matching system 102 utilizes the network 120 to communicate with the provider client devices 112a-112n and the requestor client devices 116a-116n. For example, the transportation matching system 102 communicates with the provider client devices 112a-112n and the requestor client devices 116a-116n via the network 120 to determine locations of the provider client devices 112a-112n and the requestor client devices 116a-116n, respectively. In some embodiments, per device settings the transportation matching system 102 may receive location coordinates from the provider client devices 112a-112n and/or the requestor client devices 116a-116n, respectively. Based on the location coordinates, the transportation matching system 102 determines the geocoded area in which the provider client devices 112a-112n and/or the requestor client devices 116a-116n are located.

More specifically, the transportation matching system 102 connects transportation requests with transportation vehicles. By connecting requests with transportation vehicles, the transportation matching system 102 manages the distribution and allocation of providers (e.g., a provider's transportation vehicle) throughout areas in a region. For example, to facilitate connecting requests with transportation vehicles, the transportation matching system 102 communicates with the provider client devices 112a-112n (through provider client applications 114a-114n) and with the requestor client devices 116a-116n (through requestor client applications 118a-118n).

As mentioned above and as shown in FIG. 1, each of the provider client devices 112a-112n include provider client applications 114a-114n. In many embodiments, the transportation matching system 102 communicates with the provider client devices 112a-112n through the provider client applications 114a-114n. Additionally, the provider client applications 114a-114n optionally include computer-executable instructions that, when executed by the provider client devices 112a-112n, cause the provider client devices 112a-112n to perform certain functions. For instance, the provider client applications 114a-114n can cause the provider client devices 112a-112n to communicate with the transportation matching system 102 to navigate to various places such as a target area, a requestor's pickup location, a requestor's destination location, as well as collect fares and bonuses (i.e., accumulations) for completed transportation requests.

Relatedly, as mentioned above, each of the requestor client devices 116-116a includes a requestor client application 118a-118n, respectively. A requestor may use a requestor client application to request transportation services, receive a price estimate for the transportation service, and access other transportation-related services. For example, the requestor 118a may interact with the requestor client device 114a through graphical user interfaces of the requestor client application 116a to enter a pickup location and a destination for transportation. The transportation matching system 102 can, in turn, offer the requestor client device 114a with a price estimate for the transportation, an estimated time of arrival of a provider (or transportation vehicle), or access other transportation-related services through the requestor client application 116a. Having received the price estimate, the requestor 118a may then select (and the requestor client device 114a detect) a selection of a transportation-request option to request transportation services from the transportation matching system 102.

In various instances, the transportation matching system 102 is unable to match a provider (e.g., a provider client device) to a transportation request by a requestor (e.g., a requestor client device) because there is a shortage of providers within a close proximity to the requestor. Indeed, at the time of a request, the transportation matching system 102 may identify a number of available providers, but beyond an acceptable estimated time of arrival to the requestor (or a service license agreement (SLA)). As such, in these instances, the transportation matching system 102 must often deny the request in one area while providers are idling in another area of the region. Alternatively, the transportation matching system 102 might match a provider to a transportation request, but the requestor may cancel the transportation request because the requestor is not willing to wait for the provider to travel such a far distance to get to the requestor. In either case, the resources of the transportation matching system 102 are wasted on cancellations or failed attempts to match a transportation request to a provider.

To overcome this challenge, the transportation matching system 102 employs a number of models. For example, as shown in FIG. 1, the transportation matching system 102 includes an incremental provider model 104, a provider allocation model 106, and personalized provider behavioral models 108. In addition, the transportation matching system 102 includes a customized provider interface generator 110.

Each of the models and components of the transportation matching system 102 are described in detail below. As a brief overview, however, the incremental provider model 104 determines the forecasted benefit (i.e., incremental effect) to each area in a region of adding one or more additional providers, the provider allocation model 106 determines how to reallocate providers within the region to best fulfill anticipated transportation requests for a future time interval to target areas, and the personalized provider behavioral models 108 determine which provider to send to which target area having the anticipated request need in the future time interval. Additionally, once the transportation matching system 102 determines which providers to relocate to which target areas within the region, the customized provider interface generator 110 generates and serves user interfaces to the provider client devices 112a-112n via the provider client applications 114a-114n to attract providers to target areas.

To illustrate, FIG. 2 provides an overview of the transportation matching system utilizing the models mentioned above to allocate transportation providers within a geocoded region in accordance with one or more embodiments. In particular, FIG. 2 shows a flow diagram of a series of acts 200 for managing the allocation of providers by utilizing the models 104-108 and the customized provider interface generator 110. In one or more embodiments, the transportation matching system 102 implements the series of acts 200 shown in FIG. 2.

As shown in FIG. 2, the transportation matching system 102 performs the act 202 of identifying forecasts of providers and transportation requests for a geocoded region. For instance, in one or more embodiments, the transportation matching system 102 estimates the number of transportation requests that requestors (i.e., requesting client devices) in each area of the region will submit in the next time interval (e.g., 5-10 mins). Similarly, the transportation matching system 102 can also determine the number of providers (i.e., provider client devices) that are or will be available to fulfill transportation requests in each area of the region for the time interval.

Using the forecasted data of providers and estimated requests for a future time interval, the transportation matching system 102 can begin to reallocate the providers to areas where the number of forecasted requests outnumber the number of forecasted providers. As explained previously, reallocating providers between areas in a region is much more complex than having providers in provider allocation surplus areas move to provider allocation shortage areas. Rather, reallocating providers between areas is a non-trivial process based on many sophisticated factors. However, as described in this disclosure, the transportation matching system 102 utilizes models to efficiently and elegantly identify a solution to this issue across the region, and in real-time.

To illustrate, FIG. 2 includes the act 204 of determining incremental provider functions for each geocoded area in the geocoded region using an incremental provider model. For instance, the transportation matching system 102 uses the forecasted data along with other data to generate an incremental provider model that includes a separate incremental provider function for each area within the region. Each area's incremental provider function indicates the benefit (e.g., value) or incremental effect to the area of adding additional providers in the next time interval. Additional detail regarding the incremental provider model is further described in connection with FIGS. 3-5.

As also shown, the series of acts 200 includes the act 206 of generating a transportation flow matrix that forecasts provider allocation values for each geocoded area in the geocoded region. For example, the transportation matching system 102 trains and utilizes the provider allocation model to generate the transportation flow matrix for the region based on the incremental provider function for each area as well as forecasted demand for each area. As mentioned previously, the transportation flow matrix for the region can indicate a reallocation solution of which areas in the region would benefit most from one or more additional providers, which in turn maximizes overall benefit (i.e., incremental effect) to both providers and requestors. Additional detail regarding the provider allocation model is further described in connection with FIGS. 6-8.

FIG. 2 also includes the act 208 of determining providers to relocate to a geocoded area with a forecasted provider allocation shortage using the personalized provider behavioral models. Indeed, although the transportation flow matrix can indicate an optimal solution to reallocate providers within the region for a future time interval, the transportation flow matrix does not indicate from which areas to pull providers. Further, the transportation matching system 102 cannot compel providers to relocate to target areas. Accordingly, the transportation matching system 102 trains and utilizes personalized provider behavioral models to determine which providers to attract to which target areas. Additional detail regarding the personalized provider behavioral models is further described in connection with FIGS. 9-11.

In some embodiments, the act 208 of determining providers to relocate to a geocoded area with a forecasted provider allocation shortage using the personalized provider behavioral models is, in part, performed prior to or in parallel with the act 206 of generating the transportation flow matrix that forecasts provider allocation values for each geocoded area in the geocoded region. For example, the transportation matching system 102 determines the probability of relocating each provider to each area in a region, which the transportation matching system 102 then uses to determine the transformation flow matrix. Further, as described above, the transportation matching system 102 uses the transformation flow matrix in connection with the personalized provider behavioral models to determine how to optimally distribute providers throughout the region.

Further, once the transportation matching system 102 determines which providers to incentivize to relocate to which target areas, the transportation matching system 102 can serve the incentive to the providers. To illustrate, the series of acts 200 includes the act 210 of generating and serving a customized provider interface to each provider selected to relocate to a target area. Indeed, the transportation matching system 102 can generate a customized provider interface that personally incentivizes each provider to navigate to a target area selected for the provider. Additional detail regarding the transportation matching system 102 generating and serving customized provider interfaces personalized to each provider is further described in connection with FIGS. 12-14.

Figure 3:
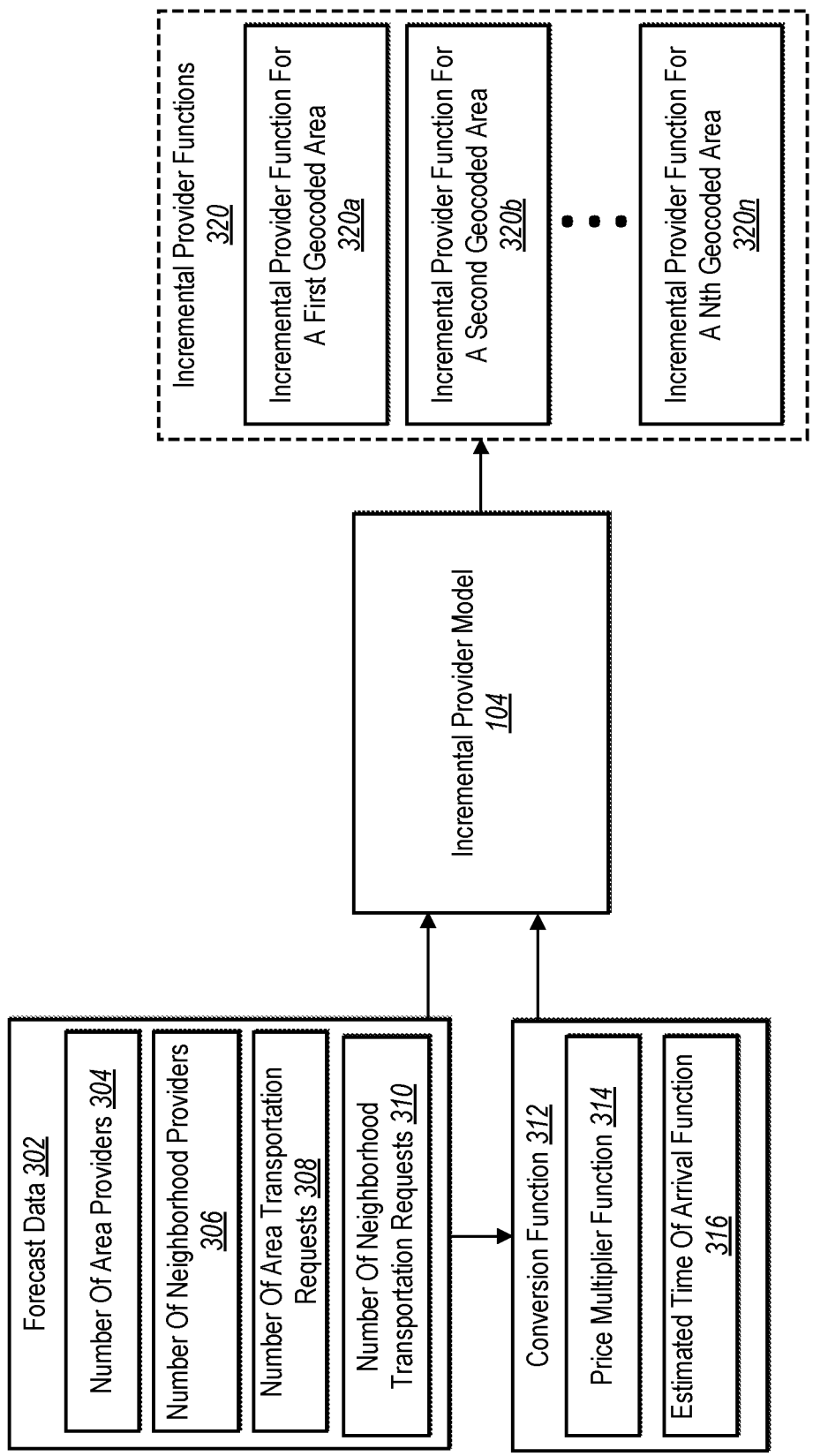
FIG. 3 illustrates a block diagram of an incremental provider model in accordance with one or more embodiments.

As mentioned previously, FIG. 3 further describes the incremental provider model 104. In particular, FIG. 3 illustrates the transportation matching system 102 utilizing an incremental provider model 104 to determine incremental provider functions 320 in accordance with one or more embodiments. In general, the incremental provider model 104 generates a separate incremental provider function for each area in the region, which enables the transportation matching system 102 to determine the benefit or value (i.e., incremental provider effect or simply incremental effect) of adding additional providers to any given area in the region. As shown in FIG. 1, the incremental provider model 104 can reside on the transportation matching system 102.

As shown, FIG. 3 includes the incremental provider model 104. The incremental provider model 104 receives information from the forecast data 302 and conversion function 312 and generates incremental provider functions 320 for each geocoded area in the region. While not illustrated, in various embodiments, the transportation matching system 102 hosts and implements the incremental provider model 104. In additional embodiments, the transportation matching system 102 also identifies and/or generates the input elements shown in FIG. 3.

As mentioned above, the incremental provider model 104 receives input from the forecast data 302. In particular, the forecast data 302 includes market state data corresponding to each area in the region as well as each area's neighborhood. For example, the forecast data 302 indicates to the incremental provider model 104 a number of area providers 304 (e.g., area supply), a number of neighborhood providers 306 (e.g., neighborhood supply), a number of area transportation requests 308 (e.g., area demand) from unique requestors forecasted for each area in the region and a number of neighborhood transportation requests 310 (e.g., neighborhood demand) forecasted for each area in the region.

In one or more embodiments, the forecast data 302 indicates provider and request forecasts for future time intervals, such as in the next five minutes, ten minutes, thirty minutes, etc., and can include providers anticipated to come online before the start of or during the future time interval. In some embodiments, the forecast data 302 indicates forecasts and predictions for a current time interval that is elapsing (e.g., for the remaining duration of the time interval). Further, in various embodiments, the forecast data 302 indicates a combination of current and future forecasts, such as current providers in each area as well as anticipated transportation requests in the area in the next 5 minute time interval.

In addition to serving the forecast data 302 to the incremental provider model 104, the transportation matching system 102 serves the forecast data 302 (or portions thereof) to the conversion function 312, as shown in FIG. 3. In some embodiments, forecast data 302 is utilized by a number of models and functions, such as the price multiplier function 314, and the estimated time of arrival function 316, the provider allocation model 106, and other models described below.

Figures 4A, 4B:
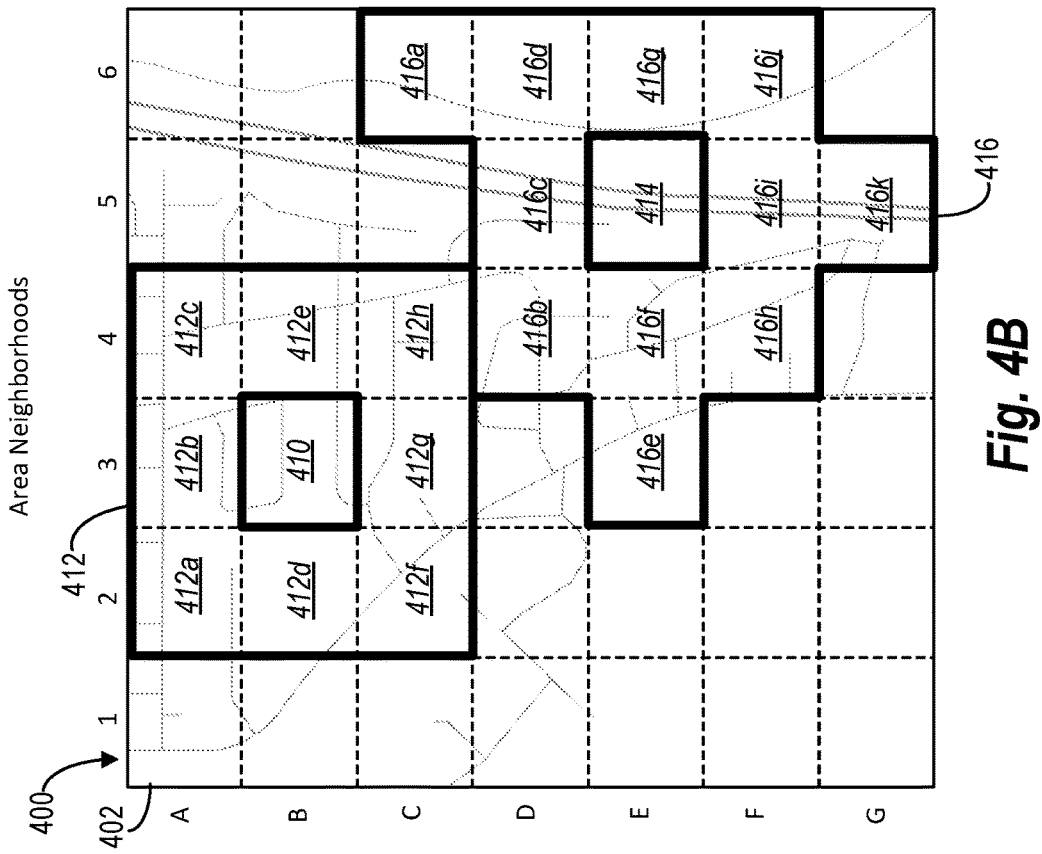
FIGS. 4A-4E illustrate utilizing the incremental provider model to determine incremental provider functions for each geocoded area in an example geocoded region in accordance with one or more embodiments.

As mentioned above and as illustrated in FIG. 3, the forecast data 302 includes the number of area providers 304, which indicates the number of area providers in each area in the region (e.g., current and/or anticipated). Similarly, the number of neighborhood providers 306 indicates the number of providers in neighboring areas surrounding a given area, excluding the area itself. As defined above, a neighborhood can include adjacent areas surrounding a given area. Thus, in many embodiments, the number of neighborhood providers 306 for an area includes available providers that are outside of an area, but within nearby surrounding areas, such that the providers can relocate to the given area before the start (or the end) of the future time interval, or close enough to the given area to be paired with a requestor in the target area during the future time interval. However, in some embodiments, the number of neighborhood providers 306 includes both the number of providers in a given area as well as providers located in the surrounding areas. Examples of different neighborhood boundaries and configurations are illustrated in FIG. 4B.

Similarly, as shown, the forecast data 302 includes the number of area transportation requests 308 in each area in the region, which includes requests anticipated in a future time interval for each area. Likewise, the number of neighborhood transportation requests 310 forecasts the total number of transportation requests that are anticipated in areas surrounding an area, excluding the area itself. However, in some embodiments, the number of neighborhood transportation requests 310 includes both the number of forecasted transportation requests in the given area as well as the surrounding areas.

FIG. 3 also includes the conversion function 312 (e.g., a conversion model for the region that includes separate conversion functions for each area). As mentioned earlier, the conversion function 312 indicates the likelihood or probability that a requestor who submits a transportation request, or is anticipated to submit a request, will be matched to a provider and/or complete transportation with a provider. As shown, the conversion function 312 includes a price multiplier function 314 and an estimated time of arrival function 316 (or "ETA function 316").

In one or more embodiments, the transportation matching system 102 utilizes the price multiplier function 314 to determine a price multiplier for a given area at a given time interval based on the number of providers and the number of transportation requests in the area's neighborhood (e.g., as received from the forecast data 302). Often, a regional base price is set, and a neighborhood-specific price multiplier is added to the neighborhood when transportation demands in the neighborhood are high. For example, when the number of requests in a neighborhood outnumbers providers, then the price multiplier function 314 generates a larger price multiplier, which is added to the base price, to help curtail demand.

Indeed, the price multiplier is based on the supply of available providers in a neighborhood rather than an area alone or the region as a whole. Further, adding additional providers to an area or the neighborhood of the area affects the area's price multiplier. Further, in many embodiments, the price multiplier function 314 is part of an online machine learner—meaning the transportation matching system 102 trains and maintains the price multiplier function 314 online. A detailed explanation on the transportation matching system 102 determining price multipliers is provided in U.S. patent application Ser. No. 15/810,028, Dynamically Generating And Updating Multipliers For A Transportation Matching System Using Machine Learning, filed Nov. 11, 2017, the entire contents of which is hereby incorporated by reference.

As shown, the conversion function 312 also includes the ETA function 316. In various embodiments, the transportation matching system 102 utilizes the ETA function 316 to determine an ETA of providers for an area. For example, for each area in the region, the transportation matching system 102 determines the ETA of providers located in each area's neighborhood. In one or more embodiments, the ETA function 316 is part of an online machine learner that freshly updates ETA data based on locations of providers, traffic and road conditions, etc.

In some instances, the ETA function 316 provides the average ETA between a location in an area and providers in the neighborhood of the area. The ETA function 316 can measure travel time from a provider to the closest border point of the area or the center of the area.

In some instances, the ETA function 316 provides the ETA time of the closest provider to the area. For example, the ETA 316 function provides the estimated average arrival time of a driver as a function of how many available drivers are present in the neighborhood of the area. In other instances, the ETA function 316 provides a weighted average ETA that favors a shorter ETA over a longer ETA, or vice-versa. Further, the ETA function 316 can consider additional factors, such as driver efficiency coefficients and driver correction metrics, which increase or decrease the calculated ETA for an area. Indeed, the ETA function 316 considers the current distribution of ETA functions for an area as well as the driver efficiency coefficients and driver correction coefficients, which are learned on-line for area and/or at regular intervals (e.g., 1, 5, 15 minutes, etc.). In addition, as with the price multiplier function 314, if the number of providers in an area or in the corresponding neighborhood increase or decrease, so does the ETA calculated for the area, as further described below. Additional detail regarding providing the ETA to an area is provided in U.S. patent application Ser. No. 15/810,028, mentioned above.

Using the outputs of the price multiplier function 314 and the ETA function 316, the transportation matching system 102 can apply the conversion function 312 to the region. For example, in various embodiments, the transportation matching system 102 determines a separate conversion function 312 for each area in the region. As mentioned previously, in various embodiments, the output of the conversion function 312 includes the probability (e.g., [0-1] or [0%-100%]) that transportation requests will progress to a completed ride by the provider. In one or more embodiments, the probability indicates the likelihood that a requestor who initiates a software application of the dynamic transportation matching system will progress to a completed ride.

In some embodiments, the transportation matching system 102 employs the conversion function shown in Equation 1 below.

$$\text{Convesion}_{g,t} = \text{Price}_{g,t}(\text{Providers}_{N(g),t}, \text{Requests}_{N(g),t}), \text{ETA}_{g,t}(\text{Providers}_{N(g),t}) \qquad (1)$$

As shown in the Equation 1, g represents a given area and t represents a specified time interval. Additionally, N(g) refers to the neighborhood of the given area g. Accordingly, Equation 1 shows that conversion for a given area at a specified time interval is a function of the price multiplier and the ETA of the given area at the specified time interval. Further, the price multiplier is based on available providers and transportation requests in the neighborhood of the given area at the specified time interval, as described above. Similarly, the ETA is based on the providers located in the neighborhood of the given area at the specified time interval, as also described above.

As also mentioned above, the output of the conversion function 312 is based on the number of providers available to fulfill requests in a given area. Thus, as the number of available providers increase or decrease for an area, both the price multiplier and the ETA for the area change, which in turn affects the conversion rate of the area.

Upon determining the conversion function 312 for each area in a region, the transportation matching system 102 can feed the output of the conversion function 312 along with the forecast data 302 into the incremental provider model 104, which determines incremental provider metrics and/or incremental provider functions for the region.

To illustrate, in one or more embodiments, the transportation matching system 102 trains and utilizes the incremental provider model 104 to produce an incremental provider metric corresponding to adding a single provider (or another fixed number) to each area in the region. For example, the transportation matching system 102 applies the conversion function for the current number of providers in an area to the number of forecasted transportation requests for the area (and at a specified time interval) to determine the first number of converted transportation requests. Further, the transportation matching system 102 applies the conversion function for the current number of providers plus an incremental provider in the same area to the number of forecasted transportation requests for the area (based on the incremented supply) to determine the second number of converted transportation requests.

Figures 4C, 4D:
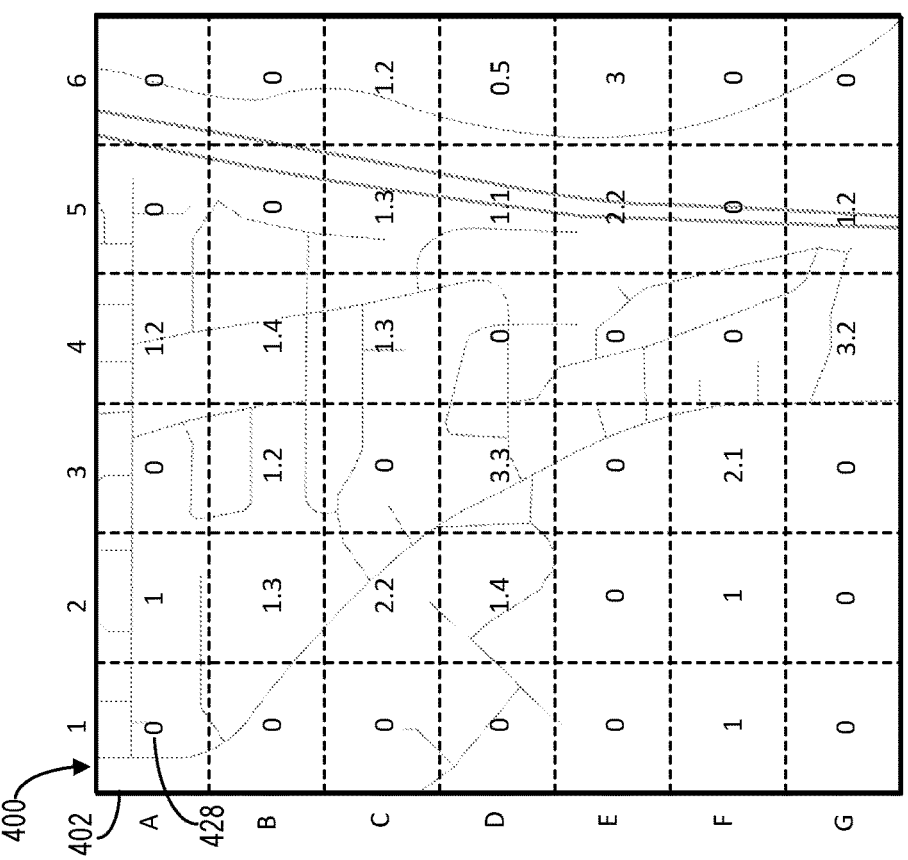

Further, the transportation matching system 102 calculates the difference between the first number of converted transportation requests (e.g., based on the current provider number) and the second number of converted transportation requests (e.g., based on the incremented provider number) to identify the incremental provider metric (e.g., value) for the given area at a specified time interval. Examples of the transportation matching system 102 determining an incremental provider metric for each area in a region is shown in FIG. 4D.

In some embodiments, the transportation matching system 102 further applies additional factors in determining the incremental provider metric for the given area at the specified time interval. For example, the transportation matching system 102 applies variables such as a base conversion rate, a conversion reduction amount, a supply learner intercept factor, or a supply learner slope quality to help normalize the incremental provider metric. To illustrate, in some embodiments, the incremental provider metric is based on a number of functions and/or models (e.g., a conversion function utilizing base conversion and conversion reduction coefficients, a provider allocation model, and/or a supply learner model) that represent current market state data. For instance, the supply learner model determines the current number of available providers with the flow of anticipated available providers (e.g., the supply model adds providers that are about to complete rides and, thus, become available in the next five minutes).

Further, the transportation matching system 102 can apply or weight the incremental provider metric using one or more previous incremental provider metrics (e.g., a smoothing metric) for the area (e.g., corresponding to one or more previous time intervals) to smooth the incremental provider metric from one time interval to the next. In at least one embodiment, the transportation matching system 102 applies the base price and/or price multiplier corresponding to the given area at the specified time interval to further convert the incremental provider metric into a monetary unit, which the transportation matching system 102 can employ to compare the benefit (i.e., value or incremental effect) of adding a provider across the region.

As described above, the transportation matching system 102 can employ the incremental provider model 104 to determine incremental provider metrics for each area in a region. In alternative embodiments, the transportation matching system 102 determines an incremental provider function for each area in the region. While the incremental provider metric indicates the incremental effect (e.g., benefit) of adding one provider to each area, the incremental provider function indicates the benefit of adding (or subtracting) any number of providers to the area. Indeed, the incremental provider function can indicate the incremental provider metric corresponding to adding an additional provider to an area as well as incremental provider metrics of further adding providers to the area.

The incremental provider function provides the transportation matching system 102 with flexibility by dynamically offering multiple outcomes with respect to adding multiple providers to each of the areas in a single function. Accordingly, the incremental provider function enables the transportation matching system 102 to reduce computational costs by eliminating the extra steps of having to iterate incremental provider metric calculations based on adding different numbers of providers to an area or to the neighborhood of the area. Indeed, as noted above, because a change in the number of providers to an area or to the neighborhood of the area greatly affects the conversion model for the area, generating an incremental provider function drastically reduces the steps needed to determine multiple incremental provider metrics for an area, let alone all areas in a region, in real-time.

As FIG. 3 illustrates, the incremental provider model 104 generates incremental provider functions for each geocoded area in a region. As shown, the incremental provider model 104 generates a first incremental provider function 320a for a first area in the region, a second incremental provider function 320b for a second area in the region, through an nth incremental provider function 320n for a subsequent area in the region (e.g., the last area or another area in the region).

In one or more embodiments, the transportation matching system 102 employs Equation 2, shown below, within the incremental provider model 104 to generate a separate incremental provider function for each area in a region.

$$\text{IPF}_{g,t}(\text{Providers}_{N(g),t}) = \text{Convesion}_{g,t} \times \text{Request}_{g,t} \qquad (2)$$

Figure 4E:
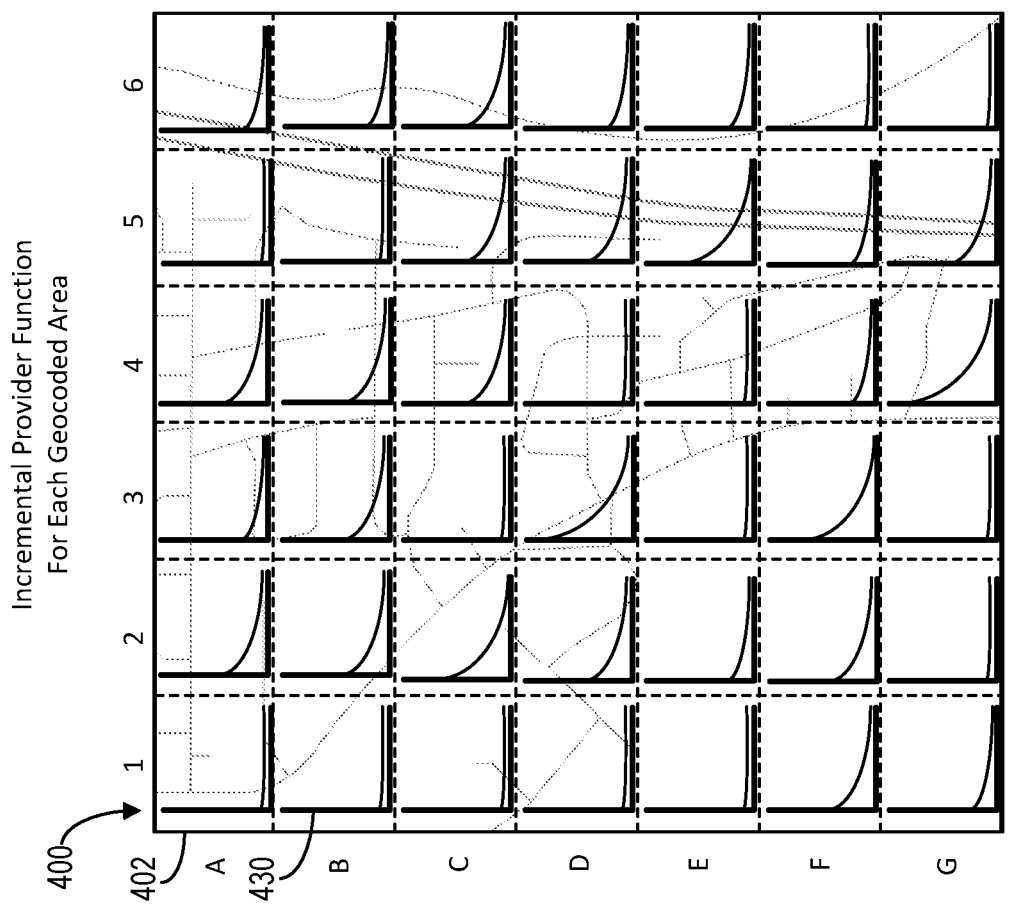

As shown in Equation 2, the incremental provider function IPF for a given area g at a specified time t is based on the dependent variable of providers in the neighborhood of area g at the specified time t. In other words, the incremental provider function determines outcomes (at the specified time t) for a range of additional (or fewer) providers in the neighborhood of area g represented in a single result. In many embodiments, the result of the incremental provider function for an area is an incremental value curve, as shown in FIG. 4E and described below.

As also shown above in Equation 2, the incremental provider function is based on applying the conversion model (e.g., from Equation 1 above) to the number of local transportation requests in the area g at the specified time t based on a varying number of providers in the neighborhood of area g. Indeed, in one or more embodiments, the incremental provider function can be represented as an incremental value curve that indicates how adding more providers to an area's neighborhood affects the probability that a request in the area will result in a conversion to a completed ride.

In some embodiments, the transportation matching system 102 utilizes the forecasted data 302 to determine an incremental value function for a future time interval (e.g., specified time t equals 5-10 minutes or 5-15 minutes from the current time). Indeed, the transportation matching system 102 inputs the number of area providers 304 and the number of neighborhood providers 306 (current or forecasted for the future time interval) as well as the number of area transportation requests 308 and the number of neighborhood transportation requests 310 for the future time interval. By utilizing the forecasted data 302, the incremental provider model 104 determines the benefit (i.e., incremental effect) of fulfilling future transportation requests for an area given the current number of providers in and around the area.

As mentioned above, in some embodiments, the transportation matching system 102 determines incremental provider functions for each area and, in other embodiments, the transportation matching system 102 determines a single incremental provider metric for the area. The transportation matching system 102 can utilize the incremental provider function of each area to determine the single incremental provider metric for the area by considering the effect of adding one provider to an area or an area's neighborhood (e.g., the incremental effect of providing additional providers to the area). However, by utilizing incremental provider functions over incremental provider metrics, the transportation matching system 102 can reduce calculating changes to a region from once per minute to once every ten to fifteen minutes as the incremental provider functions account for further forecasts of providers (when the incremental provider model 104 is based on the forecast data 302 for the future time interval, as described above).

FIGS. 4A-4E illustrate an example of the transportation matching system 102 utilizing the incremental provider model 104 to generate incremental provider functions (e.g., 320a-320n). In particular, FIGS. 4A-4E illustrate a series of maps demonstrating how the transportation matching system 102 utilizes the incremental provider model 104 to determine incremental provider functions for each geocoded area in a geocoded region.

As shown, FIGS. 4A-4E each includes a map of a geocoded region 400 (or simply "region 400) made up of geocoded areas 402 (or simply "areas 402). The region 400 includes forty-two geocoded areas 402 arranged in a grid of geohashes, where the grid includes numbers along the x-axis and letters along the y-axis for identifying a given area. While an example arrangement of areas 402 is shown in the region 400, a region can encompass a larger geographical space, vary in configuration (e.g., shape), and/or include additional areas. For example, the region 400 displayed in FIGS. 4A-4E includes areas 402 that are about 1-square kilometer and the region 400 corresponds to a portion of San Francisco. For context, a region that encompasses all of San Francisco and that uses areas of the same size would include around 5,000 areas.

As shown in FIG. 4A, each of the areas 402 in the region 400 includes a forecast of providers 404 (shown as "P") and transportation requests 406 (shown as "R"). The forecast data can reflect providers 404 and transportation requests 406 for a current and/or future time interval, as described previously. For purposes of explanation, the forecast data used by the transportation matching system 102 in FIGS. 4A-4E comprises the current number of providers in an area and the number of forecasted transportation requests in a future time interval of 5-10 mins. To illustrate, Area A1 includes one current provider 404 and no anticipated transportation requests 406 while Area E4 includes three current providers 404 and two transportation requests 406 anticipated in the next time interval, which starts in 5 minutes and has a duration of 5 minutes (e.g., 5-10 mins).

In various embodiments, the transportation matching system 102 also identifies provider and request forecasts for the neighborhood of an area. As described above, the number of providers and transportation request in an area's neighborhood can affect whether providers in the neighborhood are available to fulfill an anticipated request for an area or whether those providers will be fulfilling other anticipated transportation requests in the neighborhood.

As mentioned above, the transportation matching system 102 can determine which areas make up the neighborhood of an area by including nearby areas. The transportation matching system 102 can determine nearby areas based on adjacency, manual grouping, zip-code, area-code, geographical distance, or travel time. To illustrate, FIG. 4B illustrates two types of neighborhood configurations based on different approaches taken by the transportation matching system 102.

As shown in FIG. 4B, a first neighborhood 412 surrounds a first area 410 (i.e., Area B3) and a second neighborhood 416 surrounds a second area 414 (i.e., Area E5). To identify areas that belong to the neighborhood of the first area 410, in one or more embodiments, the transportation matching system 102 includes areas that are within a geographical distance of the first area. For example, the transportation matching system 102 identifies areas within 1 kilometer from the center of the first area 410 to include the first neighborhood 412. In this example, the first neighborhood 412 includes areas 412a-412h as shown. Generally, a geographical distance-based approach will include areas adjacent to the first area. The transportation matching system 102 can select a radius that starts from the center of an area, one or more points along the boundary of an area, or another point within the area.

In some embodiments, the transportation matching system 102 expands the radius around the first neighborhood 412 to include additional areas. For example, if the transportation matching system 102 utilizes a radius of 2 kilometers from the center of the first area 410, the first neighborhood 412 will expand by one additional area on all sides (if not constrained by the boundary of the region 400).

In alternative embodiments, the transportation matching system identifies areas based on determining a geographical distance or travel time from an area. To illustrate, the second area 414 (i.e., Area E5) includes the second neighborhood 416 that includes areas in the region 400 (i.e., areas 416a-

416k) that are within a predefined travel time of the second area 414. For instance, the transportation matching system 102 identifies any areas within a 7-minute driving time from the boundary of the second area 414 as belonging to the second neighborhood 416. In this manner, depending on available roadways (e.g., congested city streets, open interstate freeways, etc.), current traffic conditions, construction, etc., the areas belonging to a neighborhood could change from day to day or even from one hour to the next.

In one or more embodiments, the transportation matching system 102 creates a neighborhood matrix for each area. For example, the transportation matching system 102 includes all areas in a region. If the area is included in the neighborhood for the given area, the transportation matching system 102 assigns the area with a value of one in the matrix; otherwise, the transportation matching system 102 assigns the area with a value of zero in the matrix. The transportation matching system 102 can then recall the neighborhood matrix for an area when serving neighborhood-level forecasts data for the area to the incremental provider model or other models.

FIG. 4C shows neighborhood-level forecasts for each of the areas 402 in the region 400. In particular, FIG. 4C shows the number of neighborhood providers 424 (shown as "P(N)") and neighborhood transportation requests 426 (shown as "R(N)") for each of the areas 402. Further, as explained earlier, the transportation matching system 102 can employ various approaches to identify areas in the neighborhood of a given area. For simplicity, neighborhoods in FIG. 4C are formed based on the distance-based approach described above (e.g., the first neighborhood 412). Accordingly, the neighborhood for each area in FIG. 4C includes adjacent areas (including diagonally adjacent).

In one or more embodiments, the transportation matching system 102 calculates the neighborhood-level forecasts for a given area by summing up the number of providers and/or transportation requests in the given area's neighborhood (excluding the area itself so as to determine additional providers that can move into the area). To illustrate, if Area C3 is the given area, then the transportation matching system 102 adds the number of providers 404 in Areas B2, B3, B4, C2, C4, D2, D3, and D3 (i.e., 2+3+2+0+2+2+1+2=13, as shown in FIG. 4A) to determine the number of neighborhood providers 424 for Area C3. As another example, if the Area G6 is the given area, then the transportation matching system 102 sums the number of providers 404 in Areas F5, F6, and G5 to determine the neighborhood providers 424. The transportation matching system 102 can employ a similar approach to identify the number of neighborhood transportation requests 426 for each of the areas 402 in the region 400.

Upon identifying the local and neighborhood forecasts of providers and transportation requests for each of the areas 402 in the region 400, the transportation matching system 102 can generate an incremental provider model for the region 400 as described above. For example, in one or more embodiments, the transportation matching system 102 utilizes the incremental provider model to determine an incremental provider metric for each area, as shown in FIG. 4D. In alternative embodiments, the transportation matching system 102 utilizes the incremental provider model to determine an incremental provider function for each area, as shown in FIG. 4E.

More specifically, FIG. 4D shows an incremental provider metric 428 for each of the areas 402 in the region 400 that indicates the benefit or incremental provider value (i.e., incremental effect) of adding one provider to each area. As shown, the incremental provider metric 428 can be a numerical value. In some embodiments, the numerical value that represents a relative benefit of adding an additional provider to each area compared to the other areas in the region. In alternative embodiments, the numerical value represents an actual or estimated benefit, such as a monetary increase that will occur based on the transportation matching system 102 adding another provider to the area before or during the future time interval.

As shown in FIG. 4E, each of the areas 402 includes an incremental provider function 430 represented as an incremental value curve, which shows how the value (y-axis) changes as additional providers (x-axis) are added to the area. Each incremental provider function 430 is formulated following the description in connection with Equation 2 above. Generally, as shown by the downward sloping of many of the incremental provider functions, the benefit or incremental effect to an area of adding providers decrease with each additional provider added until adding more providers yields little to no benefits to the area (disregarding the cost of moving providers among areas). Further, FIG. 4E also shows that some areas would greatly benefit from adding multiple providers (e.g., Areas C2, D3, E5, and G4) while other areas would receive little or no benefit from adding even one additional provider (e.g., Areas A1, E3, and G6).

As further described below, in various embodiments, the transportation matching system 102 utilizes the incremental provider function 430 for each area to ensure that moving a provider from a first area to a second area increases the overall value to the region 400. For example, the transportation matching system 102 verifies that adding a provider to the second area does not decrease the value to the first area by more than the value gain to the second area. In some embodiments, as also described below, the transportation matching system 102 utilizes the incremental provider functions to verify that the value gained by moving an available provider from the first area to the second area is above a threshold before moving the provider.

Notably, the incremental provider functions in FIG. 4E are merely illustrative and do not reflect the full advantages of each incremental provider function 430. For example, as described above, the transportation matching system 102 determines a separate conversion function, price multiplier function, and ETA function for each area. Each of these functions is based on area-specific data and influence the incremental provider function for the area. As a result, each area has a uniquely-tailored incremental value curve. Indeed, each incremental value curve may have a different starting point (e.g., y-intercept), slope rate, or curvature—all of which are factors that affect the incremental benefit or incremental effect of adding providers to an area.

To illustrate, if two areas have incremental provider functions with the same starting point, but the first area slopes downward faster than the second area (e.g., the first area has a lower price multiplier function), then adding an additional provider to the first area is not as beneficial overall to the region as adding a provider to the second area. Likewise, adding a second provider to the second area will also yield a greater benefit or incremental effect than adding a second provider to the first area. Alternatively, the first area and the second area receive a similar benefit from adding one additional provider, but then receive different amounts of benefits for adding the next additional provider.

Figure 5:
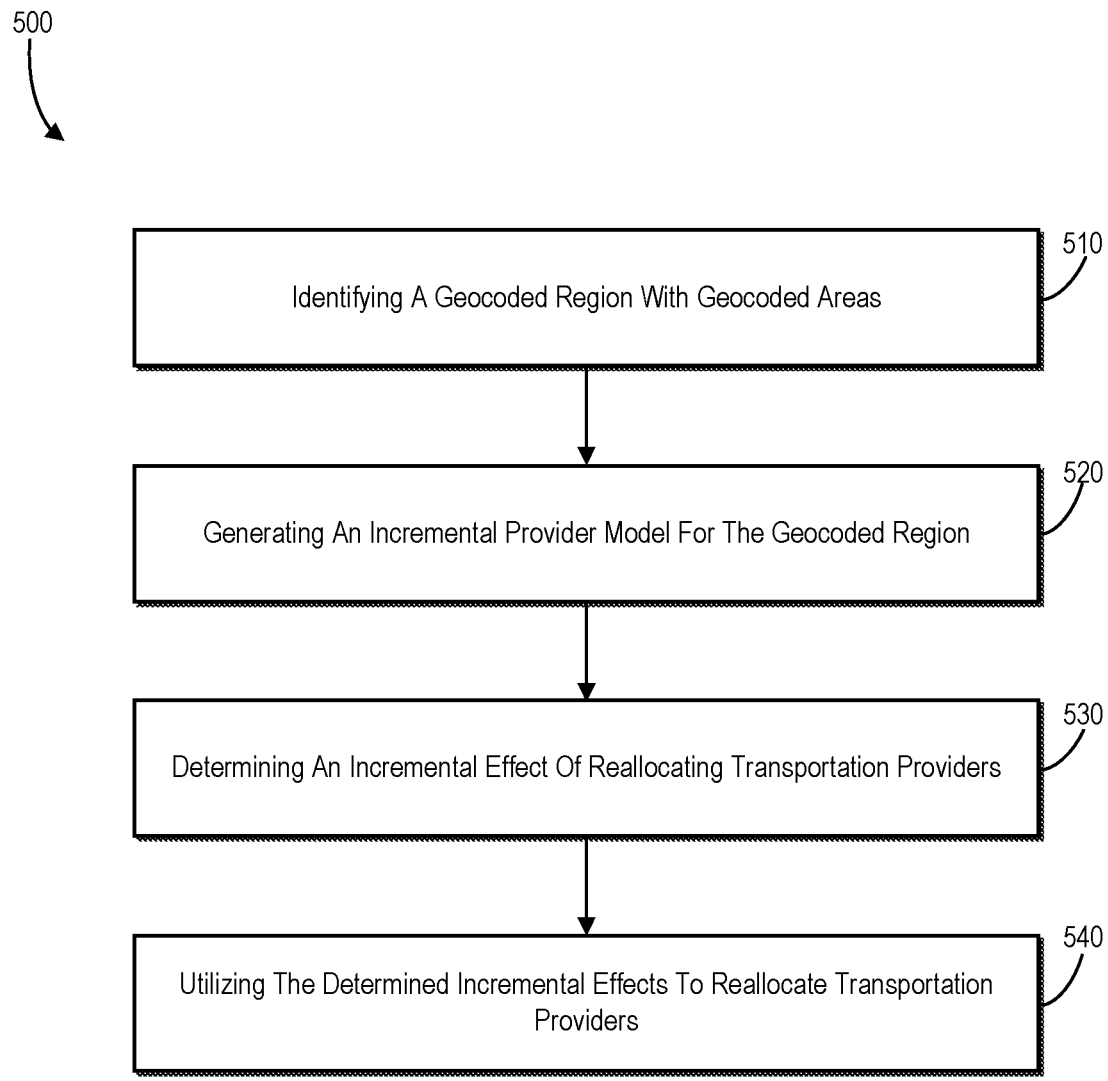
FIG. 5 illustrates a flowchart of a series of acts for generating incremental provider functions for each area in a geocoded region by utilizing an incremental provider model for the geocoded region in accordance with one or more embodiments.

FIGS. 1-4E, the corresponding text, and the examples describe several different systems, methods, techniques, components, and/or devices of the transportation matching system 102 in accordance with one or more embodiments. In addition to the description herein, one or more embodiments can also be described in terms of flowcharts including acts for accomplishing a particular result. For example, FIG. 5 illustrates a flowchart of an exemplary sequence of acts 500 for managing the allocation of transportation providers based on utilizing an incremental provider model for the geocoded region in accordance with one or more embodiments. Further, FIG. 5 may be performed with more or fewer acts. Further, the acts may be performed in differing orders. Additionally, the acts described herein may be repeated or performed in parallel with one another or parallel with different instances of the same or similar acts.

While FIG. 5 illustrates the series of acts 500 according to particular embodiments, alternative embodiments may omit, add to, reorder, and/or modify any of the acts shown. The series of acts 500 can be performed as part of a method. Alternatively, a non-transitory computer-readable medium can comprise instructions that, when executed by one or more processors, cause a computing device (e.g., a client device and/or a server device) to perform the series of acts of 500. In still further embodiments, a system performs the series of acts of 500.

To illustrate, the series of acts 500 includes an act 510 of identifying a geocoded region with geocoded areas. In particular, the act 510 can involve identifying a geocoded region including a plurality of geocoded areas. In one or more embodiments, a geocoded area is a uniform geographic space in length and width, such as 100 meters, 500 meters. 1 kilometer, 1 mile, 10 miles, etc. Further, a geocoded area can be square, rectangular, or another shape.

As shown in FIG. 5, the series of acts 500 further includes an act 520 of generating an incremental provider model for the geocoded region. In particular, the act 520 can involve generating an incremental provider model for the geocoded region based on a number of transportation providers available to fulfill transportation requests from each geocoded area; a real-time transportation request forecast for each geocoded area including a number of transportation requests forecasted to be received from the geocoded area; and real-time transportation request forecasts for geocoded areas near each geocoded area. In some embodiments, the real-time transportation request forecasts include the numbers of transportation requests forecasted to be received from the geocoded areas near the geocoded area.

In some embodiments, the act 520 also includes determining the number of transportation providers available to fulfill transportation requests from each geocoded area based on determining transportation providers that are within a threshold transportation distance or a threshold travel time of each geocoded area. In various embodiments, regarding the act 520, the real-time transportation request forecast that includes the number of transportation requests forecasted to be received from each geocoded area corresponds to a first time interval in the near future and/or the real-time transportation request forecasts of transportation requests for geocoded areas near the geocoded area correspond to the same first time interval in the near future.

Further, in one or more embodiments, regarding the act 520, the number of transportation providers available to fulfill transportation requests from the geocoded area corresponds to real-time transportation provider forecasts for the geocoded area during a current time interval or in the first time interval in the near future. In additional embodiments, the first time interval in the near future occurs five to thirty minutes in the future (e.g., in 5-10, 5-15, 5-30, 20-30 minutes from the current time).

As shown in FIG. 5, the act 520 of generating the incremental provider model for the region includes generating a separate incremental provider function for each geocoded area based on a conversion function of the geocoded area, the number of transportation providers for the geocoded area, the real-time transportation request forecast for the geocoded area, and the real-time transportation request forecasts for geocoded areas near the geocoded area. In some embodiments, the act 540 includes a first incremental provider function for a first geocoded area of the plurality of geocoded areas from the incremental provider model outputting a metric corresponding to adding one or more incremental transportation providers to the first geocoded area.

In addition, as shown the series of acts 500 further includes an act 530 of utilizing the incremental provider model to determine an incremental effect of reallocating transportation providers. In particular, the act 530 can involve utilizing the incremental provider model for the geocoded region to determine, for each of the plurality of geocoded areas of the geocoded region, an incremental effect of reallocating a transportation provider to the geocoded area.

As shown in FIG. 5, the series of acts 500 further includes an act 540 of utilizing the determined incremental effects to reallocate transportation providers. In particular, the act 540 can involve utilizing the determined incremental effects to reallocate transportation providers within the geocoded region.

In one or more embodiments, generating the incremental provider model includes generating a first incremental provider function for a first geocoded area of the geocoded areas by applying a first conversion function for the first geocoded area to the real-time transportation request forecast for the first geocoded area. In additional embodiments, the conversion function for the first geocoded area includes a multiplier function for the first geocoded area and an estimated transportation provider time of arrival function for the first geocoded area.

In further embodiments, the multiplier function for the first geocoded area outputs a multiplier metric based on the number of transportation providers available to fulfill transportation requests from the first geocoded area and the numbers of transportation requests forecasted to be received from the geocoded areas near the first geocoded area received from the real-time transportation request forecasts for geocoded areas near the first geocoded area. Moreover, in additional embodiments, the estimated transportation provider time of arrival function is based on the number of transportation providers in geocoded areas near the first geocoded area that are available to fulfill transportation requests from the first geocoded area.

As shown, the series of acts 500 also includes an act of identifying a conversion function for each geocoded area. In particular, the act can involve identifying a conversion function for each of the plurality of geocoded areas. In one or more embodiments, the conversion function for each geocoded area is based on a price multiplier function and an estimated time of arrival function identified for the geocoded area.

Figure 6:
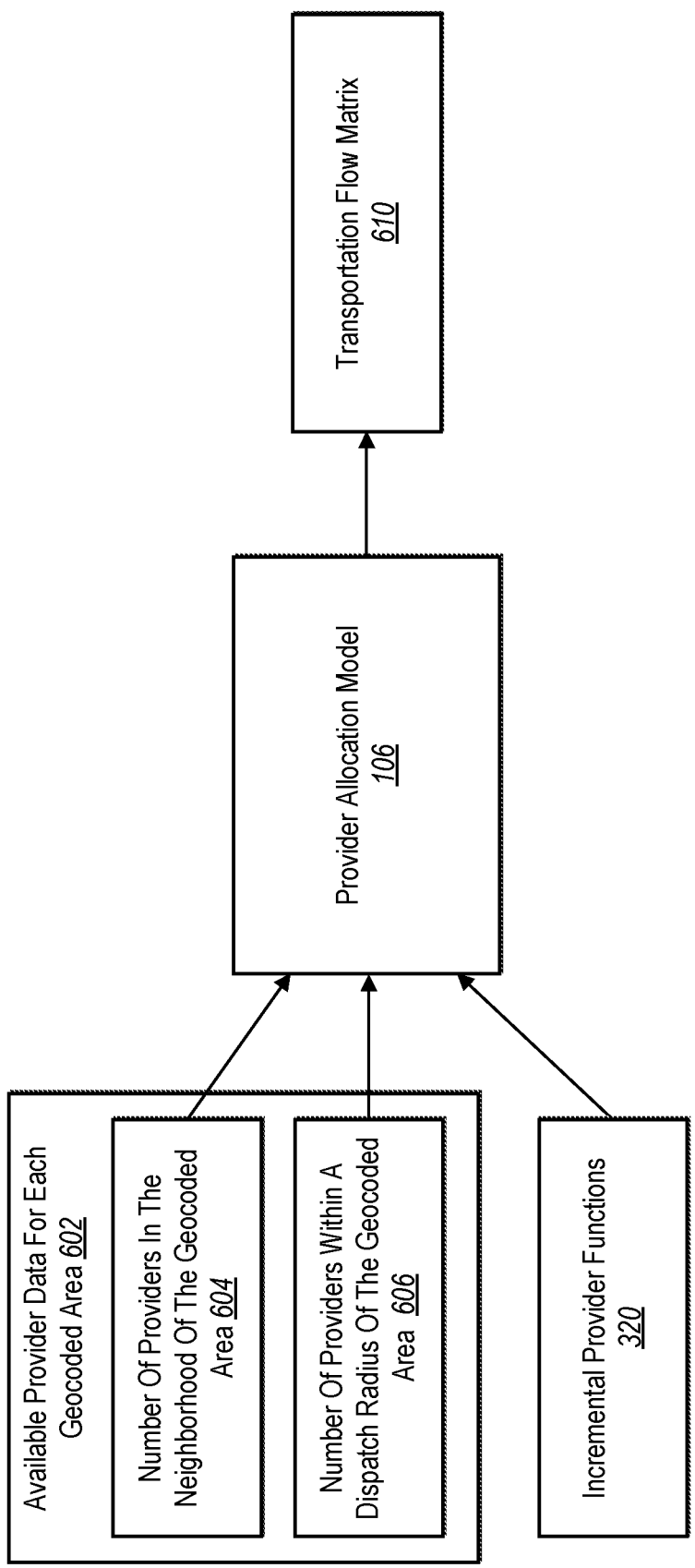
FIG. 6 illustrates a block diagram of a provider allocation model in accordance with one or more embodiments.
Figure 7A:
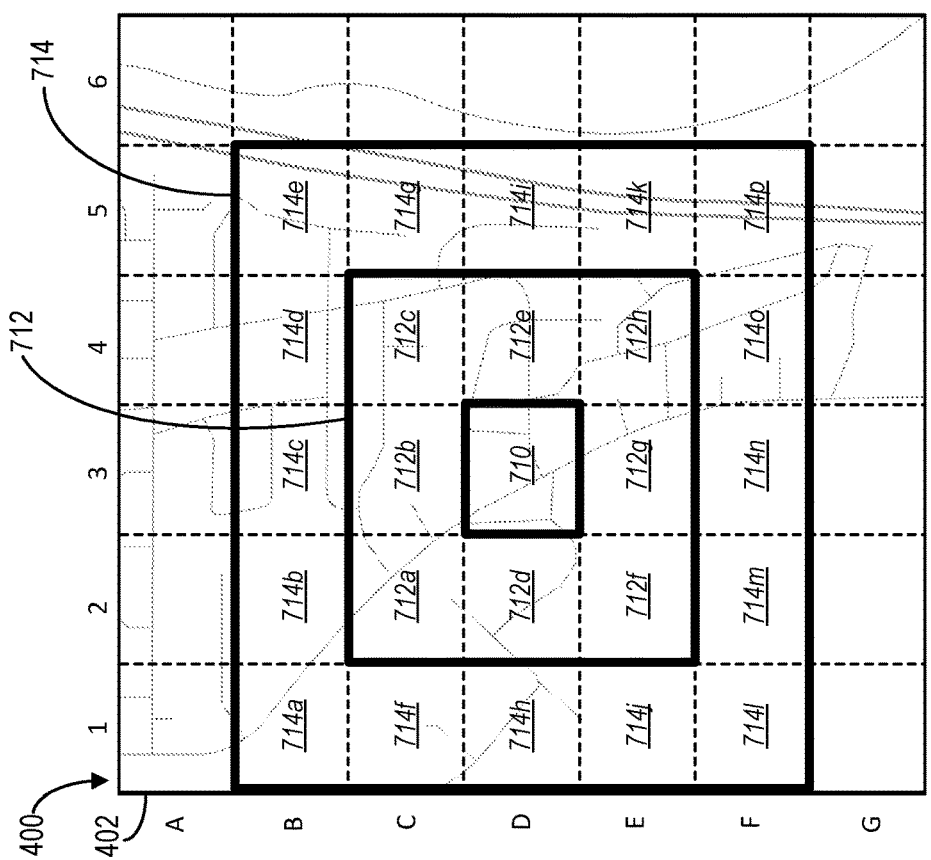
Figure 7C:
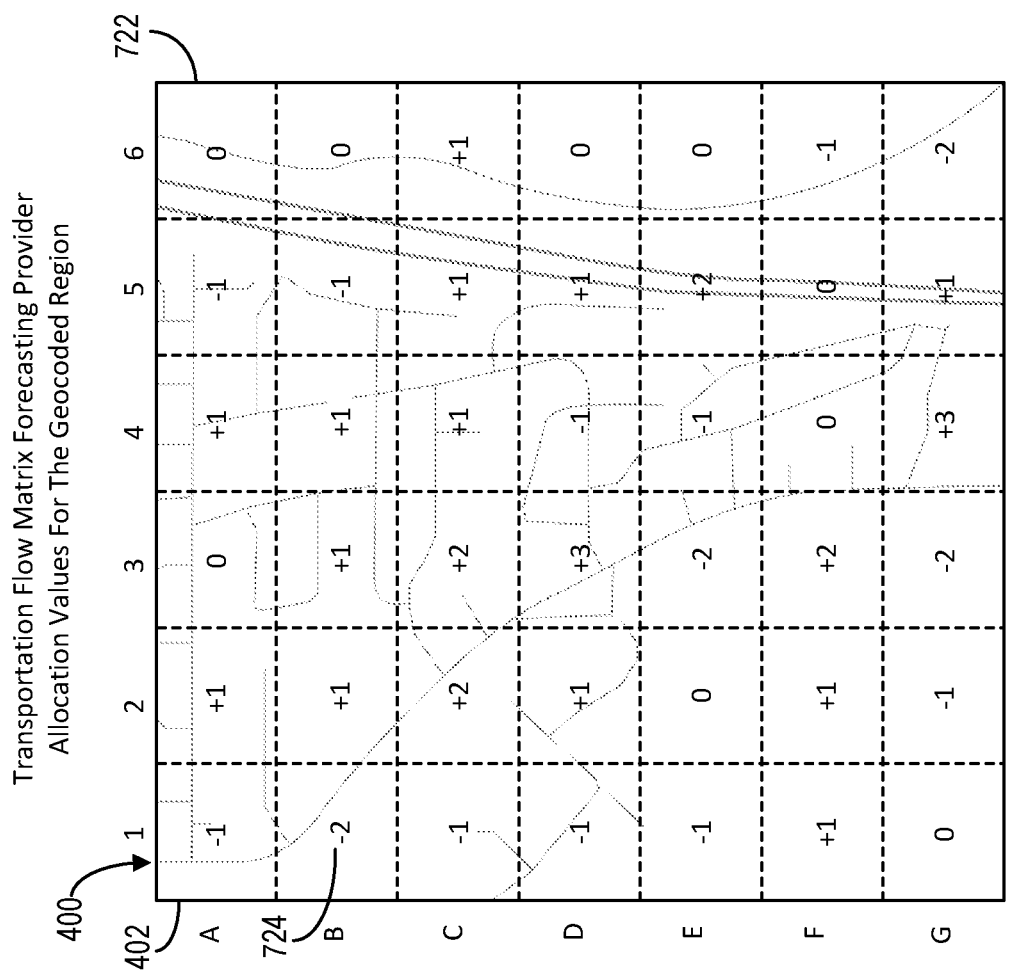
Figure 8:
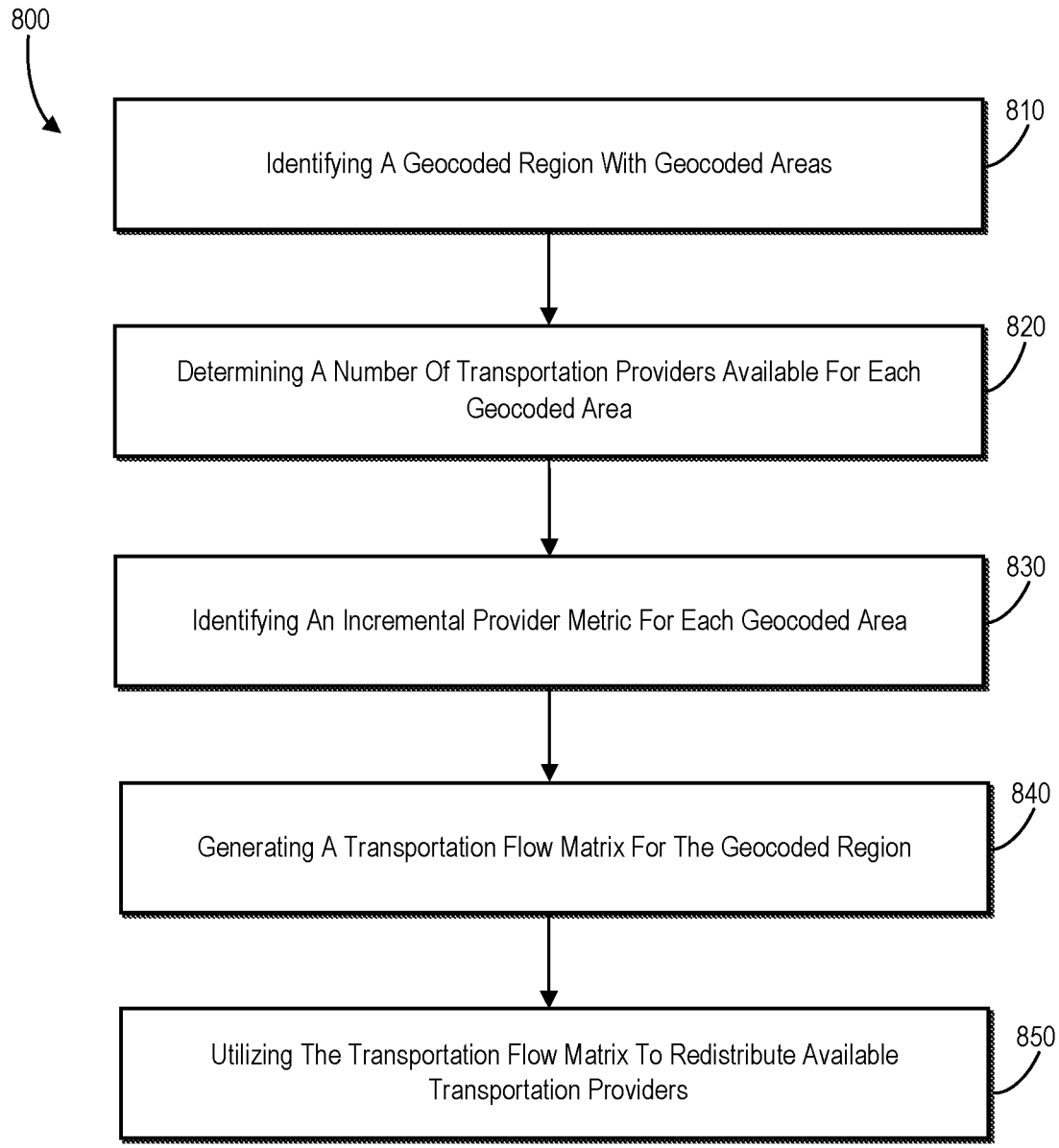
FIG. 8 illustrates a flowchart of a series of acts for generating a transportation flow matrix utilizing a provider allocation model for the geocoded region in accordance with one or more embodiments.

Turning now to FIGS. 6-8, additional description is provided regarding the provider allocation model. To illustrate, FIG. 6 shows a block diagram of a provider allocation model 106 in accordance with one or more embodiments. As shown in FIG. 1, the provider allocation model 106 can reside on the transportation matching system 102.

As shown, FIG. 6 includes available provider data for each geocoded area 602 in the geocoded region, the incremental provider functions 320 for each area, the provider allocation model 106, and a transportation flow matrix 610. Further, the available provider data for each geocoded area 602 includes the number of providers in the neighborhood of the geocoded area 604 and the number of providers within a dispatch radius of the geocoded area 606.

As described above, the transportation matching system 102 trains and utilizes the incremental provider model 104 to generate the incremental provider functions 320 (or one or more incremental provider metrics) for each of the areas in the region. Based on the incremental provider functions 320 (or the incremental provider metrics), the transportation matching system 102 can utilize the provider allocation model 106 to generate a transportation flow matrix 610 for the region, as described below.

As mentioned above, FIG. 6 includes available provider data for each geocoded area 602. In general, the available provider data for each geocoded area 602 includes all providers in the region that are capable of fulfilling a transportation request in a given area before or within a future time interval. As shown, the available provider data for each geocoded area 602 includes the number of providers in the neighborhood of the geocoded area 604. The number of providers in the neighborhood of the geocoded area 604 represents a base number of providers that are currently available to be reallocated to an area to fulfill requests that in the area based on their close proximity to the area. For example, the neighborhood providers 424 in FIG. 4C shows the number of providers in the neighborhood of the geocoded area 604 (e.g., excluding providers currently available in the area itself), which is included in the forecast data 302 previously identified by the transportation matching system 102.

In some embodiments, the number of providers in the neighborhood of the geocoded area 604 also includes non-available providers who will become available in the neighborhood of the area during the current time interval. For example, a provider who is dropping off a passenger in the area or area's neighborhood during the current interval will then be available to fulfill transportation requests in the area. Accordingly, the role of that provider transitions from an occupied provider to an available provider within the current time interval. Further, in some embodiments, the number of providers in the neighborhood of the geocoded area 604 includes occupied providers in the neighborhood of the area that are available to pick up additional passengers in the area, as described above.

Additionally, the available provider data for each geocoded area 602 also includes the number of providers within a dispatch radius of the geocoded area 606. As defined above, a dispatch radius refers to a geographical radius comprising locations within a larger predetermined travel time from a given area. Thus, the number of providers within a dispatch radius of the geocoded area 606 includes available providers that are beyond the boundaries of the area's neighborhood but within the predetermined travel time from the area.

In some embodiments, the predetermined travel time from the area is based on an amount of time until the beginning (or ending) of the future time interval. In further embodiments, the predetermined travel time from the area is based on the amount of time until the beginning (or ending) of the future time interval plus a predetermined passenger pickup wait time (e.g., as set by a service license agreement).

As an example of a dispatch radius, the dispatch radius includes all providers beyond the area's neighborhood that have an ETA of less than 15 or 20 minutes to the given area (e.g., measured from the border or the center). In another example, the dispatch radius includes all providers in the region that are within 7 minutes from the perimeter of the neighborhood of the given area. An example of a dispatch radius is shown in FIG. 7B, which is described below.

As shown, the transportation matching system 102 feeds the available provider data for each geocoded area 602 (e.g., both the neighborhood providers and the dispatch radius providers) and the incremental provider functions 320 (or the incremental provider metrics) to the provider allocation model 106. In some embodiments, before using the available provider data for each geocoded area 602, the transportation matching system 102 discounts each provider by a transportation provider metric that corresponds to the probability or likelihood that the provider will travel to the areas to fulfill a transportation request. In some instances, the transportation provider metric is inversely proportional to the distance (or ETA) between the provider and a target area.

As mentioned above, the personalized provider behavioral models, which are described below in detail with respect to FIGS. 9-12, can provide the provider allocation model 106 with the probability that each provider will travel to each area in a region. For example, in one or more embodiments, the transportation matching system 102 jointly inputs the provider probabilities from the personalized provider behavioral models with the generated incremental provider functions generated by the incremental provider model 104 to determine an optimal flow allocation of providers. In this manner the personalized provider behavioral models described below operate in tandem with the provider allocation model 106 to determine optimal allocations of providers (e.g., by maximizing expected provider values) throughout the region.

Using the available provider data for each geocoded area 602 and the incremental provider functions 320 (or the incremental provider metrics), the provider allocation model 106 employs machine-learning techniques to generate a transportation flow matrix 610 for the region that indicates an optimal allocation of providers across the region to prepare for anticipated transportation requests in a future time interval. In general, a transportation flow matrix is a (G×G) sized matrix that indicates provider interactions between an area in the region and other areas in the region, where G represents every area in a region. A representative example of a transportation flow matrix is shown in FIG. 7C, described below.

In particular, the provider allocation model 106 analyzes the incremental provider function of each area with respect to the number of available providers for the area (both current providers and providers within a dispatch radius) to determine how to allocate providers between areas and across the region. Indeed, the provider allocation model 106 determines how to maximize the overall benefit (i.e., incremental effect) to the region based on an area and neighborhood analysis for each area in the region given the total number of available providers in the region and the dispatch constraints placed on each available provider.

As an overly simplistic example, the provider allocation model 106 analyzes every incremental provider function in the region to determine which area in the region will receive the greatest benefit if given an additional provider (i.e., incremental provider effect). After selecting an area, the provider allocation model 106 determines if a provider in the neighborhood or dispatch radius is available. If yes, then the provider allocation model 106 decrements the total number of providers in the region by one and allocates it to the selected area. The provider allocation model 106 finds the area that yields the next highest benefit from adding an additional provider and repeats the above actions until all providers are allocated to target areas.

As mentioned, the above example is overly simplistic and does not detail the complex intricacies of: provider location and ETA to each area, preventing double counting or overlooking providers, grouping adjacent areas together that receive similar benefits for an additional provider, and cost of reallocating providers between areas, etc. However, through training the provider allocation model 106 with past results and the successfulness of those past results, the provider allocation model 106 can provide efficient, realistic, and accurate results in the form of a transportation flow matrix 610 that indicates an optimal redistribution of providers across the region.

As mentioned above, the transportation matching system 102 trains the provider allocation model 106 to maximize the benefit (i.e., incremental effect) across the region for a given time interval (e.g., the next time interval) given each area's incremental provider function and available providers (both number and locations). For example, in some embodiments, the transportation matching system 102 employs Equation 3, shown below, to determine a total provider value function (i.e., incremental driver value function). In one or more embodiments, the provider value function shown in Equation 3 utilizes the transportation flow matrix 610 that results in a maximal result.

$$\text{Total Provider Value} = \max \Sigma_g (\text{Benefit}_g(\text{Neighborhood Providers}_g)) \quad (3)$$

As described above, the transportation flow matrix is a (G×G) sized matrix that indicates how providers in an area (g) interact with every area in the region (G). Thus, as shown in Equation 3 above, for each area, the transportation matching system 102 maximizes the benefit or incremental effect of an area (e.g., based on an incremental provider function for the area) subject to the number of available providers in an area's neighborhood. In some embodiments, the transportation matching system 102 also imposes the constraint on Equation 3 that the number of available providers in the region cannot be exceeded.

In various embodiments, the transportation matching system 102 utilizes a concave approximation of the provider value function as part of the provider allocation model 106 to efficiently compute an optimal transportation flow matrix. For example, the concave approximation function is equivalent to Equation 3, but exploits the concave nature of the incremental provider functions.

In additional embodiments, the transportation matching system 102 prunes or disregards one or more areas in the region when generated the transportation flow matrix 610. For instance, within the transportation flow matrix 610, the transportation matching system 102 ignores areas that have an incremental provider function or metric below a threshold incremental provider metric. In particular, in various embodiments, the transportation matching system 102 reduces the effective dimension of the transportation flow matrix to reduce calculation requirements (i.e., both in terms of memory storage needs, processing time, and processing power). To illustrate, many regions include over ten thousand geocoded areas, which results in a transportation flow matrix that has over one hundred million entries. In order to reduce the size of the transportation flow matrix, the transportation matching system 102 removes geocoded areas that are unlikely to result in an increase in value (by at least threshold amount) when increasing the number of providers following the incremental drive value model described above. In this manner, by eliminating areas of low value, the transportation matching system 102 can substantially reduce the size of the transportation flow matrix and more efficiently compute a transportation flow matrix that is approximately optimal. Indeed, if the incremental provider function is flat or indicates that adding additional providers yields no benefit or incremental effect to the area, the transportation matching system 102 can prune the area from the transportation flow matrix 610. In another example, the transportation matching system 102 can skip areas (e.g., consider once every x iterations) that have a low-activity level for the specified time interval, such as rural areas that generate little to no requests.

Further, by pruning out areas in the transportation flow matrix 610, the transportation matching system 102 reduces computational requirements of determining allocations of providers, which enables the transportation matching system 102 to generate the transportation flow matrix 610 in real-time or near-real-time (e.g., under 30 seconds for a region of 5,000 geocoded areas). Further, pruning can enable the transportation matching system 102 to run smoothly and consistently in times of unexpected volume fluctuations.

FIGS. 7A-7C illustrate an example of the transportation matching system 102 utilizing the provider allocation model 106 to generate a transportation flow matrix 610. In particular, FIGS. 7A-7C illustrate utilizing the provider allocation model to determine a transportation flow matrix for the geocoded region in accordance with one or more embodiments.

As with FIGS. 4A-4E described above, FIGS. 7A-7C each includes a map of the region 400 that includes areas 402. As explained earlier, the provider allocation model 106 generates the transportation flow matrix based on incremental provider functions or metrics as well as available provider data for each area, which includes both neighborhood providers as well as providers within a dispatch radius. As described above with respect to FIG. 4B, the transportation matching system 102 can identify areas in a region to include in the neighborhood of an area. Further, the transportation matching system 102 can identify areas to include in a dispatch radius based on geographical distance or travel time. To illustrate, FIGS. 7A and 7B each show a possible configuration of a neighborhood and a dispatch radius for a given area (i.e., Area D3). In particular, FIG. 7A illustrates distance-based approach while FIG. 7B illustrates a travel time approach.

As mentioned above, FIG. 7A shows the transportation matching system 102 employing a distance-based approach in determining a neighborhood and a dispatch radius for a given area. In the distance-based approach, the transportation matching system 102 identifies areas to include in a neighborhood based on the proximity of those areas to a given area. For instance, the transportation matching system 102 includes all areas within a small radius or predetermined distance (e.g., 0.5 miles) of a given area to include in the neighborhood of the given area. Similarly, the transportation matching system 102 identifies areas to include in a dispatch radius based on a large radius or predetermined distance (e.g., 2 miles) of the given area.

To illustrate, FIG. 7A shows a first area 710 (i.e., Area D3). Based on the smaller predetermined distance, the transportation matching system 102 identifies the surrounding areas 712a-712h to make up the first neighborhood 712 for the first area 710. In addition, the transportation matching system 102 identifies more distant away areas 714a-714h as forming a first dispatch radius 714 corresponding to the first area 710, where the areas in the first dispatch radius 714 include areas outside of the first neighborhood 712.

FIG. 7B includes the transportation matching system 102 utilizing a travel time-based approach to identify the neighborhood and dispatch radius for a given area (i.e., Area D3). As illustrated, the transportation matching system 102 is identifying a second neighborhood 718 and a second dispatch radius 720 for a second area 716 (i.e., Area D3). Using the travel time-based approach, the transportation matching system 102 determines areas that are within a shorter predetermined travel time of the boundary (or the center) of the second area 716 to include in the second neighborhood 718 and areas within a longer predetermined travel time of the boundary (or the center) of second area 716 to include in the second dispatch radius 720 (e.g., dispatch area). As shown, the transportation matching system 102 identifies the areas 718a-718l to include in the second neighborhood 718 and the areas 720a-720u to include in the second dispatch radius 720.

In additional, or alternative, embodiments, rather than define the second dispatch radius from the boundary of the second area 716, the transportation matching system 102 begins measuring from the boundary of a neighborhood. For example, the second neighborhood 718 includes any area within a 9-minute travel time of the second area 716 and the second dispatch radius 720 includes any area within a 7-minute travel time of the border of the second neighborhood 718. Further, as described above, depending on traffic conditions, construction, time-of-day, etc., the neighborhood or the dispatch radius for a given area can expand or shrink under the travel time-based approach.

As described above, when determining the dispatch radius for an area, the transportation matching system 102 includes any surrounding area that has any portion within the predetermined travel time from the given area or the neighborhood boundary. In this manner, any provider in an area that is reached by the dispatch radius is included in the number of providers within a dispatch radius of a given area. In alternative embodiments, the transportation matching system 102 only includes providers that have an ETA matching or shorter than the predetermined travel time. In these embodiments, the number of providers within a dispatch radius of a given area only include providers that can travel to the given area (or at least the area's neighborhood) within the predetermined travel time.

As shown in FIGS. 7A and 7B, the first and second dispatch radii are larger than the first and second neighborhoods for the first and second areas. As one explanation, prices for an area (e.g., the price multiplier function calculated for each area) are less affected, if at all, by providers or requestors residing in distant areas. However, providers are often willing to travel some distance beyond that of a neighborhood to fulfill a transportation request and receive compensation for the completed service. Thus, the transportation matching system 102 utilizes different supply areas when determining incremental provider values versus determining reallocation of providers across the region. As a result, the incremental provider model 104 utilizes neighborhood providers and transportation requests to determine incremental provider functions while the provider allocation model 106 utilizes a dispatch radius to determine a transportation flow matrix of providers willing to reallocate across the region.

As mentioned above, FIG. 7C illustrates an example transportation flow matrix 722. As shown, the transportation flow matrix 722 includes a matrix of values that indicate an allocation metric 724 for each of the areas 402 in the region. For example, the Area D3 shows an allocation metric of "3," which indicates that three providers should be reallocated to the area before the future time interval. Likewise, the Area A5 shows an allocation metric of "−1," which indicates that one provider can be moved from the area without a benefit loss to the area. Notably, while the transportation flow matrix 722 includes integer for each of the areas 402 to indicate how providers should be distributed throughout the region, a more accurate transportation flow matrix includes floating point and/or complex numbers for each area region.

For case in explanation, the transportation matching system 102 shown in FIG. 7C serves as an overly simplified representation of a transportation flow matrix generated by the provider allocation model 106. For instance, as described above, the provider allocation model 106 generates a transportation flow matrix is (G×G) in size and compares each area with each other area in the region. Accordingly, a more accurate transportation flow matrix would be 42×42 in size to enable each of the 42 areas to be compared against one another. Based on the full transportation flow matrix, the transportation matching system 102 can derive the representative transportation flow matrix 722 shown in FIG. 7C.

Using the transportation flow matrix 722 generated by the provider allocation model 106, the transportation matching system 102 can determine which providers to reallocate within the region. In particular, the transportation matching system 102 can determine areas 402 that have a provider allocation surplus (e.g., a negative number) and a provider allocation shortage (e.g., a positive number). In the case of autonomous vehicles, the transportation matching system 102 can reallocate providers from areas of surplus to areas of shortage until the transportation flow matrix 722 is balanced (e.g., all areas are at or near zero). However, even in these cases, determining which provider to reallocate to which areas in the shortest overall travel time is a non-trivial task.

Further, as mentioned above, each time a provider is relocated from a first area to the second area, the transportation matching system 102 can verify that the benefit or incremental effect gained by adding the provider to the second area outweighs the benefit lost by the first area. In some embodiments, the transportation matching system 102 compares incremental provider metrics between the first area and the second area and confirms that the difference between the incremental provider metrics satisfies an incremental provider threshold. In other words, if the change in benefit is negligible or below a benefits threshold, the transportation matching system 102 determines if the cost of moving the provider outweighs the benefit.

Indeed, as described in FIGS. 9-12 below, reallocating providers from surplus areas to shortage areas is a complex process due, in part, to it being unknown whether each provider will remain in the same area, reallocate to a target area, or stop fulfilling transportation requests (e.g., go offline). In the case of autonomous vehicles, the transportation matching system 102 could balance provider allocation by determining to overall shortest travel distances between vehicles and target areas and reallocating the autonomous vehicles accordingly. As another issue in the case of both human and autonomous providers, the transportation matching system 102 is limited in time to reallocate providers across the region such that providers are at or near target areas at the start of the future time interval, which is often only 5-10 minutes in the future, or close enough to a target area to be paired with a requestor in the target area during the future time interval.

The previous figures, including FIGS. 1, 2, 6, and 7A-C, the corresponding text, and the examples describe several different systems, methods, techniques, components, and/or devices of the transportation matching system 102 in accordance with one or more embodiments. In addition to the description herein, one or more embodiments can also be described in terms of flowcharts including acts for accomplishing a particular result. For example, FIG. 8 illustrates a flowchart of an exemplary sequence of acts 800 for managing the allocation of transportation providers based on generating a transportation flow matrix that utilizes a provider allocation model for the geocoded region in accordance with one or more embodiments. In addition, FIG. 8 may be performed with more or fewer acts. Further, the acts may be performed in differing orders. Additionally, the acts described herein may be repeated or performed in parallel with one another or parallel with different instances of the same or similar acts.

While FIG. 8 illustrates the series of acts 800 according to particular embodiments, alternative embodiments may omit, add to, reorder, and/or modify any of the acts shown. The series of acts 800 can be performed as part of a method. Alternatively, a non-transitory computer-readable medium can comprise instructions, when executed by one or more processors, cause a computing device (e.g., a client device and/or a server device) to perform the series of acts of 800. In still further embodiments, a system performs the series of acts of 800.

To illustrate, the series of acts 800 includes an act 810 of identifying a geocoded region with geocoded areas. In particular, the act 810 can involve identifying a geocoded region including a plurality of geocoded areas. As noted above, in one or more embodiments, a geocoded area can be a uniform geographic space in length and width, such as 100 meters, 800 meters. 1 kilometer, 1 mile, 10 miles, etc. Further, a geocoded area can be square, rectangular, or another shape.

As shown in FIG. 8, the series of acts 800 further includes an act 820 of determining a number of transportation providers available for each geocoded area. In particular, the act 820 can involve determining a number of transportation providers available to fulfill transportation requests from each of the plurality of geocoded areas. In some embodiments, the act 820 includes determining the number of transportation providers available to fulfill transportation requests from each geocoded area based on determining transportation providers that are within a threshold transportation distance or a threshold travel time of the geocoded area.

In some embodiments, with respect to the act 820, the number of transportation providers available to fulfill the transportation request in a given geocoded area of the plurality of geocoded areas can also include transportation providers from the given area and transportation providers from geocoded areas near the given geocoded area and/or transportation providers that are within a second threshold transportation distance or a second threshold travel time of a geocoded area within the geocoded areas near the given geocoded area.

As shown, the series of acts 800 also includes an act 830 of identifying an incremental provider metric for each geocoded area. In particular, the act 830 can involve identifying an incremental provider metric for each of the plurality of geocoded areas. In one or more embodiments, the act 830 identifies an incremental provider function for each geocoded area and utilizes the incremental provider function to generate the incremental provider metric for each geocoded area.

As shown in FIG. 8, the series of acts 800 further includes an act 840 of generating a transportation flow matrix for the geocoded region. In particular, the act 840 can involve generating a transportation flow matrix for the geocoded region based on the number of available transportation providers in each of the geocoded areas and the incremental provider metric for each of the plurality of geocoded areas. In some embodiments, the act 840 includes maximizing a regional metric by correlating the available transportation providers in each of the geocoded areas with the incremental provider metric for each of the plurality of geocoded areas by allocating available transportation providers among the plurality of geocoded areas within the region.

In various embodiments, regarding the act 840, maximizing the regional metric is subject to a total number of available transportation providers in the geocoded region. Further, in some embodiments, the number of the allocated available transportation providers does not surpass the total number of available transportation providers in the geocoded region. In additional embodiments, maximizing the regional metric is also subject to a real-time transportation request forecast. In one or more embodiments, the act 840 further includes pruning out geocoded areas in the transportation flow matrix for the geocoded region that have an incremental provider metric below a threshold incremental provider metric, where pruning out the geocoded areas in the transportation flow matrix reduces computational requirements of redistributing the one or more available transportation providers in the region from the first geocoded area to the second geocoded area.

As shown in FIG. 8, the series of acts 800 further includes an act 850 of utilizing the transportation flow matrix to redistribute available transportation providers. In particular, the act 850 can involve utilizing the transportation flow matrix to redistribute one or more available transportation providers in the region from a first geocoded area to a second geocoded area. In some embodiments, the act 850 also includes causing a plurality of transportation providers to relocate from the first geocoded area to the second geocoded area.

In various embodiments, the act 850 includes identifying a first incremental provider metric for the first geocoded area from the transportation flow matrix, identifying a second incremental provider metric for the second geocoded area from the transportation flow matrix, determining that the difference between the first incremental provider metric and the second incremental provider metric satisfies an incremental provider threshold, and causing a transportation provider in the first geocoded area to relocate to the second geocoded area based on the incremental provider threshold being satisfied.

In one or more embodiments, the series of acts 800 includes additional acts. For example, the series of acts 800 includes an act of determining a transportation provider metric for the given geocoded area based on applying a distance probability metric to each of the transportation providers available to fulfill the transportation request from the given geocoded area indicating the likelihood of that each of the available transportation providers will travel to the given geocoded area to fulfill the transportation request. In some embodiments, determining the transportation flow matrix is based on the transportation provider metric for the given geocoded area and the incremental provider metric for the given geocoded area. In additional embodiments, the distance metric is inversely proportional to the distance of a given available transportation provider to the given geocoded area.

Figure 9:
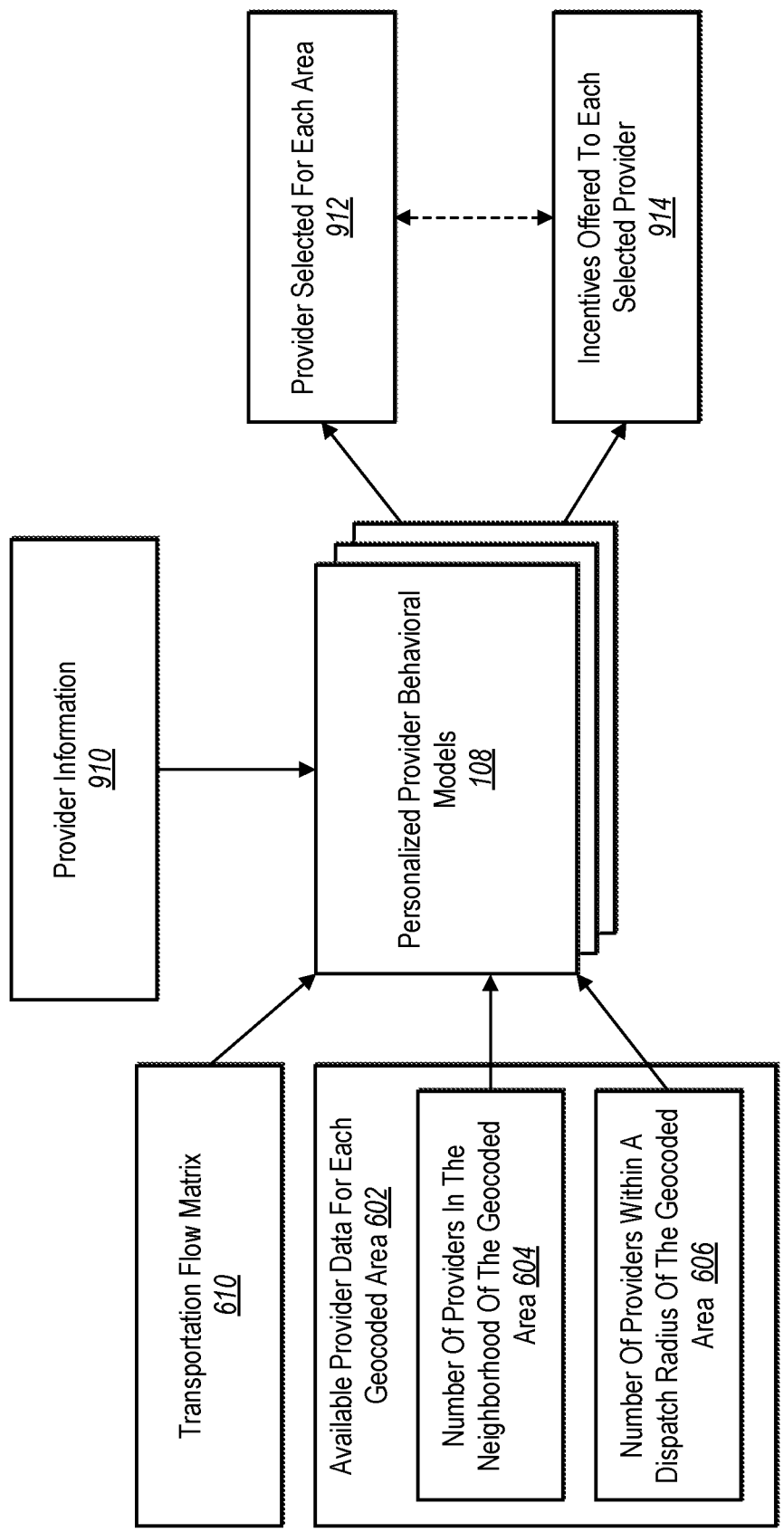
FIG. 9 illustrates a block diagram of multiple personal provider behavioral models in accordance with one or more embodiments.
Figure 10B:
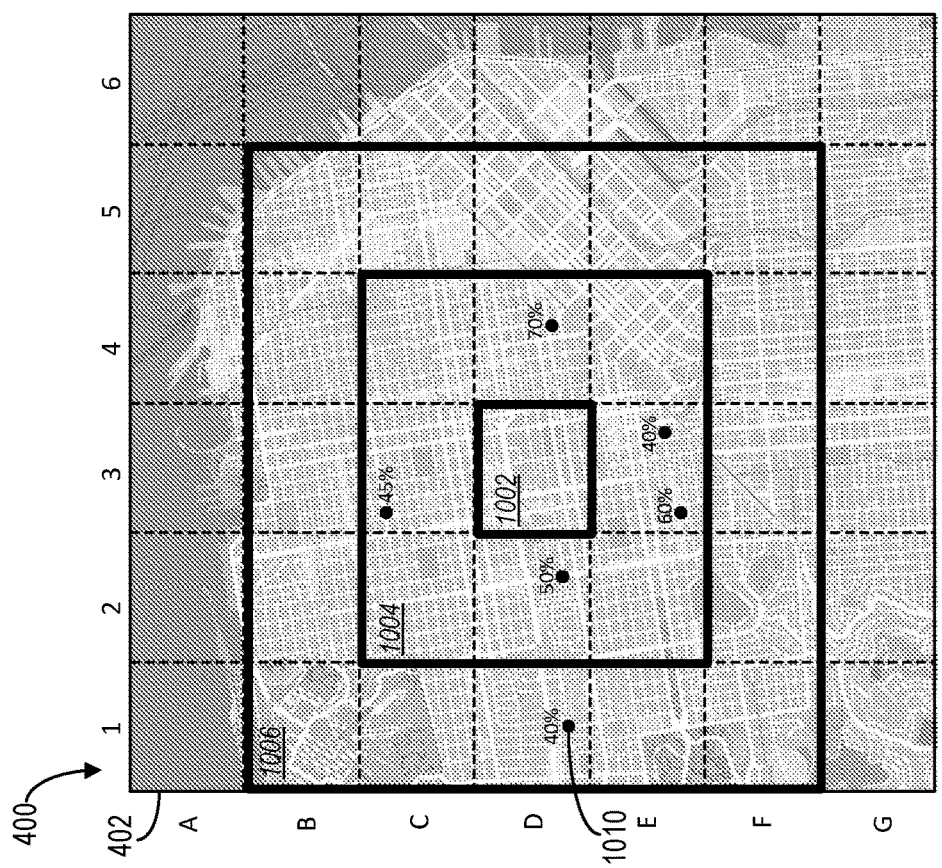
FIGS. 10A-10B illustrate utilizing the personal provider behavioral models to select one or more transportation providers to reallocate to a target geocoded area in accordance with one or more embodiments.
Figure 10A:
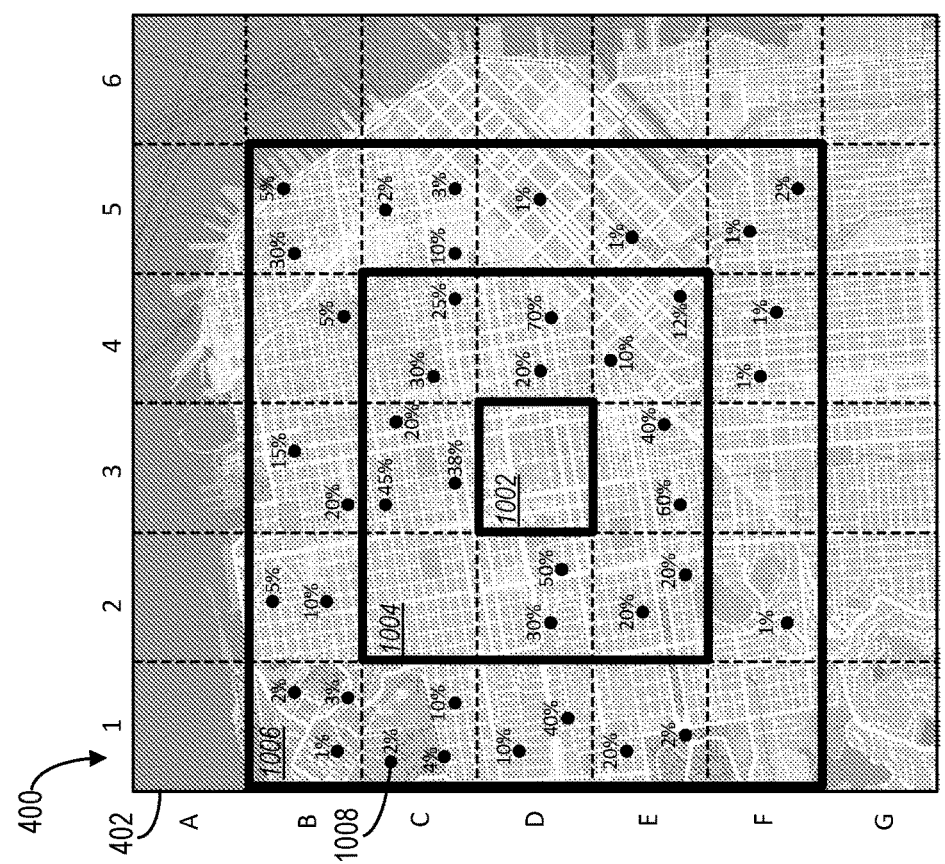
Figure 11:
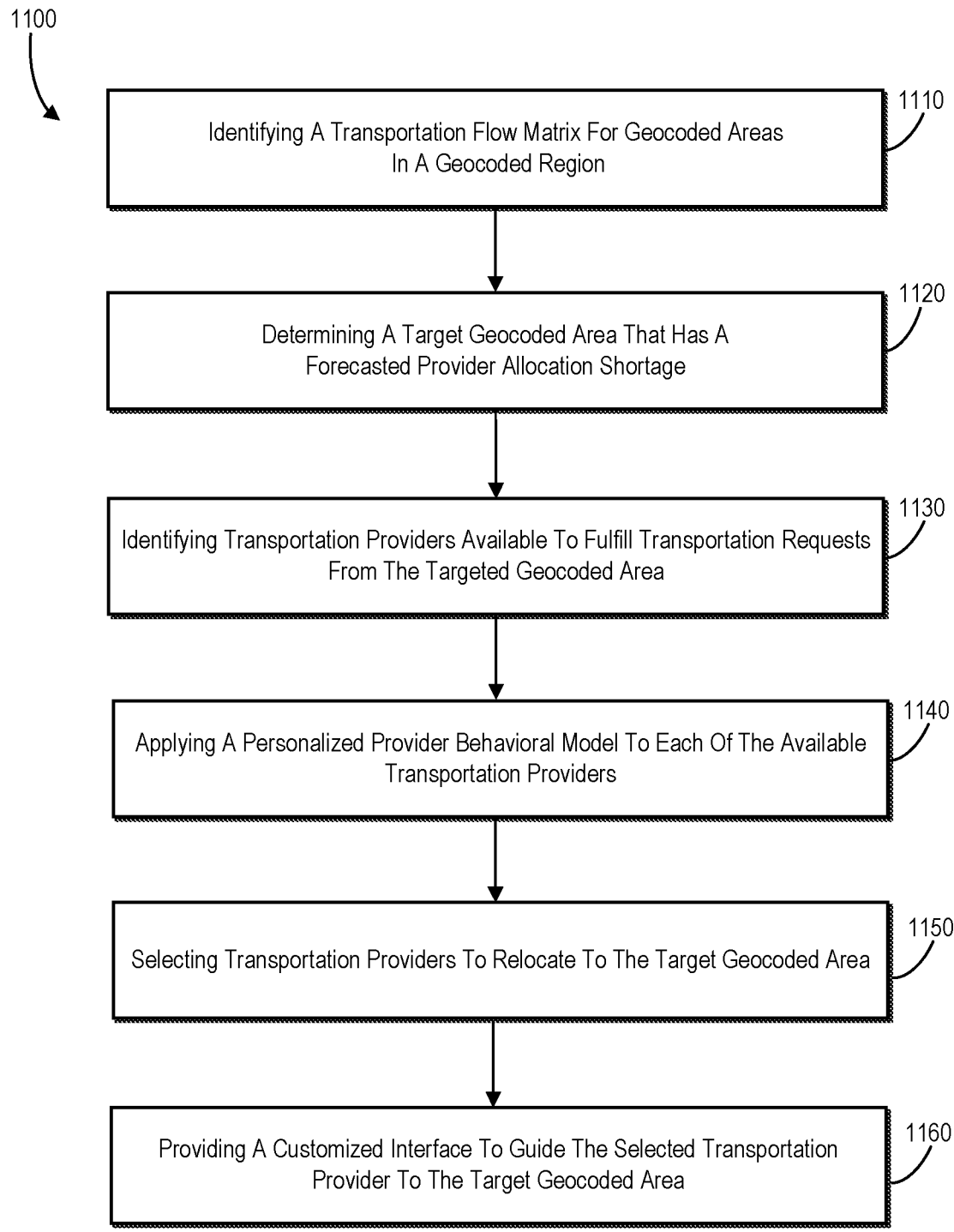
FIG. 11 illustrates a flowchart of a series of acts for selecting transportation providers for reallocation to a target geocoded areas by utilizing personal provider behavioral models in accordance with one or more embodiments.

Turning now to FIGS. 9-11, additional description is provided regarding selecting providers to relocate between areas based on personalized provider behavioral models trained specifically to each provider. To illustrate, FIG. 9 shows a block diagram of personal provider behavioral models in accordance with one or more embodiments. As shown in FIG. 1, the personalized provider behavioral models 108 can reside on the transportation matching system 102.

As shown, FIG. 9 includes a transportation flow matrix 610 for the region, available provider data for each geocoded area 602, and provider information 910. In addition, FIG. 9 includes personalized provider behavioral models 108, providers selected for each geocoded area 912 (or simply "selected providers 912"), and incentives offered to each selected provider 914 (or simply "offered incentives 914").

As described above, the transportation matching system 102 trains and utilizes the provider allocation model 106 to generate the transportation flow matrix 610. Based on the transportation flow matrix 610 and the available provider data for each geocoded area 602, the transportation matching system 102 can utilize the personalized provider behavioral models 108 to select which providers to allocate and assign to target areas with provider allocation shortages.

The available provider data for each geocoded area 602 includes the number of providers in the neighborhood of the geocoded area 604 and the number of providers within a dispatch radius of the geocoded area 606, each of which is described above with respect to FIG. 6. As explained previously, the transportation matching system 102 identifies providers in each area's neighborhood and dispatch radius to determine the transportation flow matrix for the region. Now, the transportation matching system 102 is selecting which provider(s) from the identified providers should be reallocated to each area.

As a brief overview of how the transportation matching system 102 utilizes the personalized provider behavioral models 108 to select which providers to relocate to which areas in a region, the transportation matching system 102 can feed the transportation flow matrix 610 and the available provider data for each geocoded area 602 to the personalized provider behavioral models 108. More specifically, in various embodiments, the transportation matching system 102 analyzes the transportation flow matrix 610 to determine a target area in the region that has a provider allocation shortage (e.g., the benefit or incremental effect to the area would increase by adding at least one provider). In additional embodiments, the transportation matching system 102 can determine from the transportation flow matrix 610 how many providers to reallocate to the target area based on the area's allocation metric.

Upon identifying a given area with a provider allocation shortage, the transportation matching system 102 can feed the available provider data for the given area to the personalized provider behavioral models 108, which can include provider identifiers (e.g., provider_id). In one or more embodiments, the transportation matching system 102 matches each provider identifier to a personalized provider behavioral model that has been specially trained and tailored to the provider.

Moreover, using the provider's personalized behavioral model, the transportation matching system 102 determines a probability that the provider will relocate to the target area. The transportation matching system 102 can repeat this process for each of the identified providers for the target area to determine each provider's probability that he or she will relocate to the target area to fulfill anticipated transportation requests at a future time interval. The transportation matching system 102 then selects one or more providers to allocate to the target area (e.g., selects the providers with the highest likelihood of relocating to the target area).

Furthermore, the transportation matching system 102 can repeat the process of selecting a provider for each target area having a provider allocation shortage. For example, FIG. 9 shows the personalized provider behavioral models 108 outputting selected providers 912. Additionally, in some embodiments, the personalized provider behavioral models 108 output offered incentives 914 corresponding to the selected providers 912, which is described further below.

After one or more providers are selected for an area, or after providers are selected for all target areas (or all areas), the transportation matching system 102 can send relocating requests to each of the selected drivers. For example, in one or more embodiments, the transportation matching system 102 generates and serves a customized map to each selected provider showing the target area to where the transportation matching system 102 wants the provider to move. Generating and serving customized maps is described below in connection with FIGS. 12-15.

As mentioned above, in various embodiments, the transportation matching system 102 trains each personalized provider behavioral model to uniquely predict the actions of an individual provider. For example, as described below, the transportation matching system 102 trains a personalized provider behavioral model for a provider based on driving history, driving preferences (e.g., dislikes freeways), and/or geographical preferences. In particular, in various embodiments, the transportation matching system 102 trains each personalized provider behavioral model to learn provider-specific parameters and metrics that influence the probability that a provider with travel to a given area to fulfill a transportation request at a future time interval.

To illustrate, the transportation matching system 102 can use provider information 910 to train the personalized provider behavioral models 108. In one or more embodiments, the provider information 910 for a provider includes personal information, transportation information, historical transportation data, provider preferences, and provider ratings. Indeed, the transportation matching system 102 can input provider-specific metrics into a provider's personalized behavioral model to teach the model to predict future behaviors of the provider (e.g., the likelihood that the provider will relocate to a target area in a given situation). In some embodiments, the personalized provider behavioral model uses a ground truth and/or guess-and-check approach to tune each metric (e.g., add to, remove, and/or adjust weights) to improve the accuracy of a provider's personalized behavioral model.

As mentioned above, the transportation matching system 102 can use the provider information 910 for a provider to train the provider's personalized behavioral model, which can include personal information. In some embodiments, personal information includes a provider identifier (e.g., provider_id) that uniquely identifies the provider from other providers, contact information, vital information, etc. Additionally, transportation information can include vehicle type, size, luxury level, mileage, service records, insurance, gas levels, etc.

In addition, the provider information 910 includes historical transportation data, which can include previous fulfilled transportation requests including areas where the transportation requests initiated and ended, the date of the week and the time of day, the vehicle speed and the duration, the number of passengers, intermediary stops, routes taken by the provider (e.g., surface streets or highway), tolls incurred, during a fulfilled transportation request, pick-up location types, lane history, etc. Historical transportation data can also include the average idle time between transportation requests, average travel distance between transportation requests, online and offline patterns (e.g., when the provider works), etc.

Historical transportation data can also include previous relocating requests, which include date and time of requests, whether the request was accepted, incentive amounts and rates associated with the request (described more below), reaction time to respond to request, average distance and time travel when responding to a relocating request, maximum distance and time traveled, areas where requests were received, areas traveled in while responding to a request, and other provider patterns associated with the previous relocating requests.

As mentioned above, the provider information 910 includes provider preferences, which can include home areas, a location preference of a transportation provider (e.g., in which areas the provider prefers to operate), an experience level of the transportation provider with respect to each area in the region, a passenger type preference, pick-up location preference, etc. Further, the provider information 910 includes provider ratings, which can include ratings by previous passengers as well as ratings left by the provider.

In some embodiments, the provider information 910 also includes incentive information. For example, incentive information can include which incentive types (described above) have been provided to a provider in connection with a relocating request, whether the incentive type was accepted, incentive amounts offered (e.g., minimums and maximums), incentive levels and tiers, whether the incentive was discounted or increased above average (e.g., based on offering the provider with varied incentive offers to learn the provider's willingness to accept incentives), the rate at which an incentive grew, whether the provider changed his or her regular behavior in response to receiving an incentive offer in connection with a relocating request, and the total amount earned through incentives for a period of time. Additional information regarding offering incentives is described below in connection with FIGS. 13A-13F.

Based on the above metrics, the transportation matching system 102 trains a personalized provider behavioral model that learns to predict the probability that a provider will respond to a request to relocate to a target area. In one or more embodiments, the transportation matching system 102 trains more than one personalized provider behavioral model for a provider. For example, when a provider operates across different regions, the transportation matching system 102 trains a region-specific personalized provider behavioral model for the provider. In alternative embodiments, the transportation matching system 102 employs the same personalized provider behavioral model for the driver across regions.

In one or more embodiments, the transportation matching system 102 employs default values for one or more of the above metrics to train a provider's personalized behavioral model. Then, as additional (or at least a threshold amount) of provider information 910 is obtained, the transportation matching system 102 replaces the default values with the updated information. In some embodiments, the default values represent the average values for the region for a previous time period (e.g., week, month, 6-months, year, etc.) and the transportation matching system 102 updates the default values used to train personalized provider behavioral models until the default values are replaced with provider-specific information. Further, in various embodiments, the transportation matching system 102 combines portions of provider information 910 from multiple providers to train a provider's personalized behavioral model until additional information for the provider is received.

In various embodiments, the transportation matching system 102 trains the personalized provider behavioral models 108 offline to save processing and computer resources (e.g., trained when other demands on the transportation matching system 102 are low). Further, the transportation matching system 102 updates the personalized provider behavioral models 108 as new provider information 910 is received. In alternative embodiments, the personalized provider behavioral models 108 are trained and updated online in real-time. In either case, because the personalized provider behavioral models 108 are pre-trained, the transportation matching system 102 can feed current information in the models and receive outputs in real-time.

Once a provider's personalized behavioral model is trained, the transportation matching system 102 can feed current information into the model and receive a predicted probability that the provider will accept a request to relocate to a target area that has a provider allocation shortage. For example, the transportation matching system 102 inputs a provider's current location, ETA to a target area, date and time information, current idle time of the provider, and other metrics known about the driver to the personalized behavioral model trained specifically for the provider. Then, the personalized provider behavioral model generates a probability that the provider will travel to the target area.

In one or more embodiments, the personalized provider behavioral model also predicts an incentive in connection with the predicted probability. For example, the personalized provider behavioral model provides an incentive type, how to divide the incentive over multiple levels or tiers, minimum accumulation metric or amount, maximum accumulation metric or amount, incremental rate per level or tier, and/or which areas trigger the incentive upon the provider entering. In some embodiments, the model provides multiple probabilities, where each of the probabilities is tied to different incentives for the provider.

As just mentioned, the personalized provider behavioral model can output an incentive having multiple levels. For example, an incentive is a two-tier or two-level incentive that corresponds to two zones around the target area, such as an inner or target zone that covers the target area and an outer zone that surrounds the inner zone. In many embodiments, the outer zone corresponds to the lower tier incentive and the inner zone corresponds to the higher tier incentive. Thus, to travel to the target area, the provider first travels through the outer zone triggering the lower incentive, then travels within the inner zone triggering the higher incentive. Examples of a two-tier zone layout with different incentives are shown in FIGS. 13A-13F.

In various embodiments, the personalized provider behavioral model weights the current location and ETA to the target area with greater weight than other provider information metrics when determining the probability that the provider will travel to the target area to fulfill a transportation request at a future time interval. For example, the distance of a provider to a target area my inversely influence the provider's likelihood of moving to the target area.

Similarly, the personalized provider behavioral model also factors in the provider's current and average idle time with determining the probability. On the other hand, a provider that has been idle for an extended period of time may be more likely to move to a target area, especially if an incentive is offered. Alternatively, if the provider's current To illustrate, in one or more embodiments, the transportation matching system 102 offers three incentive variants in a two-tier incentive framework (e.g., Zone 1 with the target area and surrounding Zone 2). The transportation matching system 102 may use the metrics shown in Table 1 as part of the testing.

TABLE 1

| Variant | Weight | Zone 1 | | | Zone 2 | | |
|---|---|---|---|---|---|---|---|
| | | Min | Max | Incremental Rate | Min | Max | Incremental Rate |
| 1 | 10% | $3.20 | $4.00 | $0.40 per min. | $1.60 | $3.20 | $0.20 per min. |
| 2 | 80% | $4.00 | $6.00 | $0.50 per min. | $2.00 | $4.00 | $0.25 per min. |
| 3 | 10% | $4.80 | $7.20 | $0.60 per min. | $2.40 | $4.80 | $0.30 per min. | idle time is low, then the likelihood of the driver moving is greater. Indeed, the transportation matching system 102 can utilize a provider's idle time to determine whether to relocate the provider, how far away to relocate the provider, and/or the incentives to offer the provider in connection with the relocation.

Furthermore, if two providers are the same ETA from a target location, the provider with a larger average idle time will have a higher probability than the provider with the lower average idle time. Likewise, if a provider's current idle time plus ETA to the target area is equal to or less than his or her average idle time, then the personalized provider behavioral model will likely increase the provider's probability as the driver will wait the same amount of time before being assigned a new ride request but will receive an accumulation, a bonus, and/or an incentive to move toward the target location.

As mentioned above, the personalized behavioral model for a provider can predict an offered incentive 914 that corresponds to the predicted probability. In one or more embodiments, the incentive is represented to a provider as an incremental accumulation metric, which increments as the provider travels toward the target area. In alternative embodiments, the incentive is a fixed amount or percentage that is applied to a future or previous fulfilled transportation request. Further, the transportation matching system 102 can offer a different incentive type or a combination of incentive types. In some embodiments, the transportation matching system 102 aims to match the average incentive or accumulation amount to the average idle time of a provider, which, as described above, efficiently converts idle providers into additional transportation requests being fulfilled in the region. Additional information regarding offering incentives is described below in connection with FIGS. 13A-13F.

In some embodiments, the transportation matching system 102 initially tests out variations of incentives for providers without a suitable sample of incentive data. For example, the transportation matching system 102 offers variants on an incentive, monitors a provider's response to the variants, and uses the test variation data to train the provider's personalized behavioral model. In particular, the transportation matching system 102 uses the test variation data to learn which variation to which the provider best responds given a combination of the provider information metrics described above. In this manner, the transportation matching system 102 can better correlate a particular incentive to a provider using the providers personalized behavioral model with respect to the provider's current provider information.

Using the variants in Table 1, the transportation matching system 102 can randomly assign a variant to a selected provider based on the corresponding weights. For instance, the transportation matching system 102 randomly select Variant 1 and Variant 3 around 10% of the time and Variant 2 about 80% of the time. As the response to the various variants by providers is monitored, the transportation matching system 102 can determine whether certain providers are sensitive to small or large incentive variants given a set of provider information metrics. Further, the transportation matching system 102 can learn cost curves based on the measured responses. In this manner, the transportation matching system 102 can better train and improve each provider's personalized provider behavioral model and determined the optimal incentive to offer a provider for a given situation. To illustrate, in some embodiments, the transportation matching system 102 trains the personalized provider behavior models based on numerous features, including a potential incentive level metric. By varying the incentive level metric, the transportation matching system 102 improves the quality of the training data for the behavior models, which results in increased accuracy of the models. Further, by plotting driver response metrics versus incentive level metrics resulting from the driver behavior models, the transportation matching system 102 can determine cost curves.

As mentioned above, upon identifying available providers that are capable of fulfilling a transportation request in a target area with a provider allocation shortage (e.g., within the dispatch radius of the target area), the transportation matching system 102 can apply the personalized provider behavioral models 108 to each provider, respectively. Upon which, the transportation matching system 102 obtains a list of probabilities for each provider and the target area.

In one or more embodiments, the transportation matching system 102 selects one or more providers with the highest probabilities to move to the target area (i.e., the area with the identified provider allocation shortage). For example, if the target area needs one additional provider, the transportation matching system 102 can select a single provider that has over a 75% probability of moving to the target area. In another example, the transportation matching system 102 selects two providers who each have a 50% probability of relocating to the target area.

In addition, the transportation matching system 102 can consider the various incentives and costs when selecting providers to move to the target area. Generally, relocating a provider to the target area to fulfill anticipated transportation requests in a future time interval will yield additional revenue to the system. Accordingly, the incentive needed to move providers to the target area should not exceed, or not exceed on average, the anticipated revenue from fulfilling the additional transportation request. Indeed, the transportation matching system 102 often gives the provider a fraction or partial amount of the anticipated revenue in the form of the incentive offered to the provider to relocated to a target area.

In some embodiments, when two providers have the same probability, the transportation matching system 102 selects the provider with the lower corresponding incentive cost. Additionally, in some embodiments, the transportation matching system 102 offsets selecting a higher probability and higher incentive cost provider with also selecting a lower probability and lower incentive cost provider, such that the incentive costs average out.

Further, the incentive cost to move a provider commonly increases based on the distance of the provider to the target area. For example, although a provider is capable of moving to the target areas (e.g., within the dispatch radius of the target area), the incentive cost to move the provider is too large. Moreover, the transportation matching system 102 can decrease the incentive offered as a function of the number of providers that have already received an incentive to travel to a target area. For example, in various embodiments, when assigning multiple providers to a target area, the transportation matching system 102 offers lower incentives to each subsequent provider selected to travel to the target area to account for the diminishing returns of each additional provider that travels to the target area.

As mentioned above, the personalized provider behavioral models 108 can predict different probabilities for the same provider given different incentive costs. For example, Provider A is 55% likely to move to the target area with a lower incentive and 75% likely to move to the target area with a higher incentive. In these embodiments, the transportation matching system 102 can determine whether the lower incentive probability is above a threshold probability (e.g., above 50%). Alternatively, the transportation matching system 102 compares the differences between the lower incentive probability and the higher incentive probability (or another incentive level) to determine if the difference is below a threshold probability range. If the provider is selected from the other available providers, the transportation matching system 102 can award the provider with the lower incentive if one of the above conditions are satisfied.

Moreover, in some embodiments, the transportation matching system 102 can use incentives to impart fairness across providers in a region. For example, in one or more embodiments, the transportation matching system 102 increases (or decreases) an incentive offered to a provider to align the provider's compensation with the average compensation of other providers in the area or region and/or for a period of time. Further, the transportation matching system 102 applies an incentive smoothing factor to prevent large fluctuations in incentives offered among the same provider, or different providers in the same area, neighborhood, or region, which improves overall fairness among drivers.

Upon selecting providers for areas in the region, but before assigning the providers to relocate, in some embodiments, the transportation matching system 102 verifies that a provider is not selected to move to conflicting areas. For example, if two areas are located 4 miles from each other and an available provider is located roughly between the two areas, the transportation matching system 102 may select the driver to move to both areas.

In one or more embodiments, the transportation matching system 102 determines the target areas to which to send the provider based on the target area with the shortest ETA. In some embodiments, the transportation matching system 102 compares the probabilities between the provider and the target areas and selects the area with the higher probability. In other embodiments, the transportation matching system 102 selects the target area that has the lower incentive cost. In some cases, the transportation matching system 102 selects the target area that are in the direction of the provider's current traveling direction. Alternatively, the transportation matching system 102 can randomly select one of the target areas to which to move the provider.

Further, in some embodiments, the transportation matching system 102 selects the target area that will yield the most significant benefit (i.e., incremental effect). For instance, the transportation matching system 102 compares the value added to each target area by receiving an additional provider and selects the target area that yields the largest benefit increase. Notably, the benefit gain of adding a single provider to a target area is not necessarily the same as the number of drivers needed in the target area.

As another consideration in determining which of two (or more) target areas to send an available provider selected for both target areas, the transportation matching system 102 identifies whether an alternative provider is available for each target area. If the first target area has no alternative provider available while the second target area has other providers that could be assigned, the transportation matching system 102 sends the provider to the first target area. Relatedly, if both areas have an alternative provider, the transportation matching system 102 compares the alternative providers together (e.g., based on ETA, probability, or incentive cost) and sends the provider selected to both target areas to move to the target area with the inferior alternative provider.

In various embodiments, a provider will be selected to move to multiple areas that are near each other. If the multiple areas are adjacent, the transportation matching system 102 can send the provider to either or both areas. Likewise, when sending a provider to a target area, the transportation matching system 102 can group adjacent areas to the provider's destination if the adjacent area has an incremental benefit (i.e., incremental effect) within a benefit threshold (e.g., 20% value of the target area. Additional detail regarding moving a provider is described below in connection with FIGS. 13A-13F.

As described above, the transportation matching system 102 can employ the personalized provider behavioral model 108 to select which areas in a region to allocate additional providers based on the provider's availability. In some embodiments, the transportation matching system 102 trains and utilizes the personalized provider behavioral models 108 to assign available providers to target areas indicated in the transportation flow matrix 610 that have an identified provider allocation shortage. Similar to the description above, the personalized provider behavioral models 108 identify each of the target areas of need with an ETA that are within the providers limits. Then, using the personalized behavioral model for the provider, the transportation matching system 102 selects the target area with the highest probability of the provider fulfilling a transportation request in the target area.

To illustrate, using the personalized behavioral model for a provider, the transportation matching system 102 identifies each area within a 7-minute ETA from the provider's current location. Based on the trained provider metrics, the personalized provider behavioral model outputs the probability that the provider will move to each identified area. Then, by balancing the probabilities with the incremental provider function of the identified areas (and/or incentive costs), the personalized provider behavioral model selects to which area to send the provider and, in some cases, a corresponding incentive to offer to the provider to attract the provider to the area.

In the above embodiments, the transportation matching system 102 may sequentially pair available providers and target areas together (e.g., serve the provider with a customized map the target area) and request the provider to move to the target area before matching the next available provider. While the transportation matching system 102 may not always achieve the optimal allocation of providers across the region, the transportation matching system 102 avoids selecting a single provider to be relocated to multiple target areas. By saving allocation costs, the transportation matching system 102 reduces computational time and costs as well as enables the transportation matching system 102 to run in real-time. Further, because of the fluctuation of providers logging in and out as well as running the models every few minutes (e.g., 1 min., 10 mins, 15 mins), the transportation matching system 102 quickly corrects previous provider assignment inefficiencies to approach the optimal allocation of providers.

FIGS. 10A-10B illustrate an example of the transportation matching system 102 utilizing the personalized provider behavioral models 108 to assign providers to a target area that has a provider allocation shortage. As with FIGS. 4A-4E described above, FIGS. 10A-10B shows a map of the region 400 that includes multiple areas 402.

As shown, the map includes a target area 1002 (i.e., Area D3). In one or more embodiments, the transportation matching system 102 identifies the target area 1002 based on the generated transportation flow matrix, as described above. For instance, the transportation flow matrix 722 in FIG. 7C shows Area D3 (e.g., the target area) as having an allocation metric of "3," which means that the target area 1002 is anticipated to have a provider shortage of three providers (e.g., based on optimal provider allocation) in the next time interval. As such, the transportation matching system 102 is allocating three providers to move to or near the target area 1002 such that the providers can fulfill anticipated transportation requests during the next time interval.

To determine which providers to select to attach to the target area 1002, the transportation matching system 102 identifies available providers that are in the target area neighborhood 1004 and/or the target area dispatch radius 1006. Identifying areas to include in a neighborhood or dispatch radius for an area is described previously. For example, the target area neighborhood 1004 and the target area dispatch radius 1006 match the first neighborhood 712 and the first dispatch radius 714 shown in FIG. 7A (and described above).

As shown in FIG. 10A, the transportation matching system 102 identifies each of the capable providers 1008 within the target area dispatch radius 1006 that is capable of fulfilling a transportation request in the target area during the future time interval. As described above, in various embodiments, the transportation matching system 102 applies the trained personalized provider behavioral models 108 to each of the capable providers 1008 to obtain the probability (and incentive) that each provider will travel to the target area 1002.

As shown in FIG. 10A, each of the capable providers 1008 is labeled with the probability that the provider will travel to the target area 1002 to fulfill a transportation request. While the probability associated with each provider generally grows as the distance (e.g., ETA) to the target area 1002 increases, other provider information metrics also influence a provider's predicted probability, as described above with respect to FIG. 9.

Using the probabilities (and in some cases, incentives) determined for the capable providers 1008, the transportation matching system 102 selects a subset of capable providers 1008 to send to the target area 1002. To illustrate, FIG. 10B shows selected providers 1010 that the transportation matching system 102 selects to attract to the target area 1002. As shown, the transportation matching system 102 selects the capable providers 1008 having the highest predicted probabilities.

As mentioned above, the transportation matching system 102 is attempting to reallocate three providers to the target area 1002 to fulfill the anticipated transportation requests in the target area 1002 during the future time period. While only three providers are needed, the transportation matching system 102 selects six providers (e.g., serves customized maps with incentives to the six providers to attract them to the target area 1002). However, because no single provider of the selected providers 1010 had a probability of 100% to travel to the target area 1002, the transportation matching system 102 selects providers until the total probability reached 300%, which equates to three providers travelling to the target area 1002.

In some embodiments, if a single provider is at or above a likelihood threshold (e.g., 70%), the transportation matching system 102 does not select another provider when needing to fulfill a single anticipated transportation request (or one of multiple requests) for a target area. In alternative embodiments, the transportation matching system 102 selects providers with the smallest ETA until the cumulative probability equals or passes 100%. In some embodiments, the transportation matching system 102 limits the selection of providers to a fixed number (e.g., 2 or 3) per anticipated transportation request to ensure that not too many providers are being drawn to any one single target area.

As mentioned above, the transportation matching system 102 selects providers until the cumulative probability reached at least 300%. In one or more embodiments, more than three of the selected providers 1010 travel to the target area 1002. In other embodiments, the less than three of the selected providers 1010 travel to the target area 1002. However, on average, three of the selected providers 1010 will travel to the target area 1002. Further, when more of the selected providers 1010 travel to the target area 1002, the transportation matching system 102 can modify the destination of one or more of the providers to travel to a nearby target area.

The previous figures, including FIGS. 1, 2, 9, and 10A-10B, the corresponding text, and the examples describe several different systems, methods, techniques, components, and/or devices of the transportation matching system 102 in accordance with one or more embodiments. In addition to the description herein, one or more embodiments can also be described in terms of flowcharts including acts for accomplishing a particular result. For example, FIG. 11 illustrates a flowchart of an exemplary sequence of acts 1100 for managing the allocation of transportation providers based on selecting transportation providers for reallocation to a target geocoded areas by utilizing personal provider behavioral models in accordance with one or more embodiments. In addition, FIG. 11 may be performed with more or fewer acts. Further, the acts may be performed in differing orders. Additionally, the acts described herein may be repeated or performed in parallel with one another or parallel with different instances of the same or similar acts.

While FIG. 11 illustrates the series of acts 1100 according to particular embodiments, alternative embodiments may omit, add to, reorder, and/or modify any of the acts shown. The series of acts 1100 can be performed as part of a method. Alternatively, a non-transitory computer-readable medium can comprise instructions, when executed by one or more processors, cause a computing device (e.g., a client device and/or a server device) to perform the series of acts of 1100. In still further embodiments, a system performs the series of acts of 1100.

To illustrate, the series of acts 1100 includes an act 1110 of identifying a transportation flow matrix for geocoded areas in a geocoded region. In particular, the act 1110 can involve identifying a transportation flow matrix including forecasted provider allocation values for each geocoded area of a plurality of geocoded areas in a geocoded region. In one or more embodiments, the act 1110 includes identifying a transportation flow matrix generated by a provider allocation model, as described above.

As shown in FIG. 11, the series of acts 1100 further includes an act 1120 of determining a target geocoded area that has a forecasted provider allocation shortage. In particular, the act 1120 can involve determining a target geocoded area of the plurality of geocoded areas that has a forecasted provider allocation shortage based on the transportation flow matrix. In some embodiments, the act 1120 includes determining a geocoded area that has an incremental provider metric that corresponds to a forecasted shortage of available providers in a future time interval.

As shown, the series of acts 1100 also includes an act 1130 of identifying transportation providers available to fulfill transportation requests from the target geocoded area. In various embodiments, the act 1130 includes identifying transportation providers in geocoded regions near the target geocoded area that are within a first threshold transportation distance or a first threshold travel time of the target geocoded area. In some embodiments, the act 1130 further includes identifying transportation providers that are within a second threshold transportation distance or a second threshold travel time of a geocoded area within the geocoded areas near the target geocoded area.

As shown in FIG. 11, the series of acts 1100 further includes an act 1140 of applying a personalized provider behavioral model to each of the available transportation providers. In particular, the act 1140 can involve applying, for each of the available transportation providers, a personalized provider behavioral model to predict a probability that each of the available transportation providers will relocate to the target geocoded area. In various embodiments, the probability that a selected available provider will relocate to the given area is based, in part, on a current location of the selected transportation provider and an estimated time of arrival of the selected available provider to the target geocoded area.

In some embodiments, the act 1140 includes applying, for each of the available transportation providers, the personalized provider behavioral model to identify an incentive from a plurality of incentives that corresponds to the predicted probability. In additional embodiments, selecting the one or more available transportation providers to send to the target geocoded area is further based on the incentive identified by the personalized provider behavioral models.

In various embodiments, with respect to the act 1140, the personalized provider behavioral models are machine learning models trained online using provider-specific current information and historical transportation data. For example, in some embodiments, the historical transportation data includes previous fulfilled transportation requests, geocoded areas where transportation requests are fulfilled, a time of day when previous transportation requests where fulfilled, maximum previous relocation travel time to a geocoded area, and incentive types offered and accepted by the given transportation provider. Additionally, or alternatively, in some embodiments, the historical transportation data includes a location preference of a transportation provider, an experience level of the transportation provider with one or more geocoded areas in the region, a passenger type preference of the transportation provider, an average idle time of the transportation provider between transportation requests, and patterns of when the transportation provider is online and offline.

As shown in FIG. 11, the series of acts 1100 further includes an act 1150 of selecting transportation providers to relocate to the target geocoded area. In particular, the act 1150 can involve selecting one or more transportation providers of the available transportation providers to relocate to the target geocoded area based on the predicted probabilities from the personalized provider behavioral models of the available transportation providers. In some embodiments, the act 1150 includes selecting the available transportation providers having the highest likelihood or probability of fulfilling a transportation request in the target geocoded area. In various embodiments, the act 1150 includes selecting a plurality of available transportation providers until the cumulative probability meets or exceeds the number of providers projected to be needed in the target geocoded area in the future time interval.

As shown in FIG. 11, the series of acts 1100 further includes an act 1160 of providing a customized interface to guide the selected transportation provider to the target geocoded area. In particular, the act 1160 can involve providing, to each of the one or more selected transportation providers, a customized interface to guide the selected transportation provider to the target geocoded area. In some embodiments, the act 1160 includes customizing an interface for a selected transportation provider of the one or more selected transportation providers based on the incentive predicted for the selected transportation provider.

In one or more embodiments, the series of acts 1100 includes additional acts. For example, the series of acts 1100 includes acts of selecting, for a second geocoded area of the plurality of geocoded areas, an available transportation provider to relocate to the second geocoded area, determining that the available transportation provider selected for the second geocoded area is included in the one or more selected transportation providers selected for the target geocoded area, and determining to relocate the selected transportation provider to the target geocoded area.

In additional embodiments, the series of acts 1100 includes acts of determining to relocate the selected transportation provider to the target geocoded area by determining a first expected driver metric based on a first probability of relocating the selected transportation provider to the target geocoded area and a first provider allocation value for the target geocoded area from the transportation flow matrix, determining a second expected driver metric based on a second probability of relocating the selected transportation provider to the second geocoded area and a second allocation value for the second geocoded area from the transportation flow matrix, and determining to relocate the selected transportation provider to the target geocoded area based on the first expected driver metric being greater than the second expected driver metric.

In one or more embodiments, the series of acts 1100 includes the act of balancing the forecasted provider allocation values across the transportation flow matrix by selecting, based on applying the personal behavior models to each available transportation provider in the geocoded region, other available transportation providers to send to other target geocoded areas in the geocoded region that have a forecasted provider allocation shortage.

Figure 12:
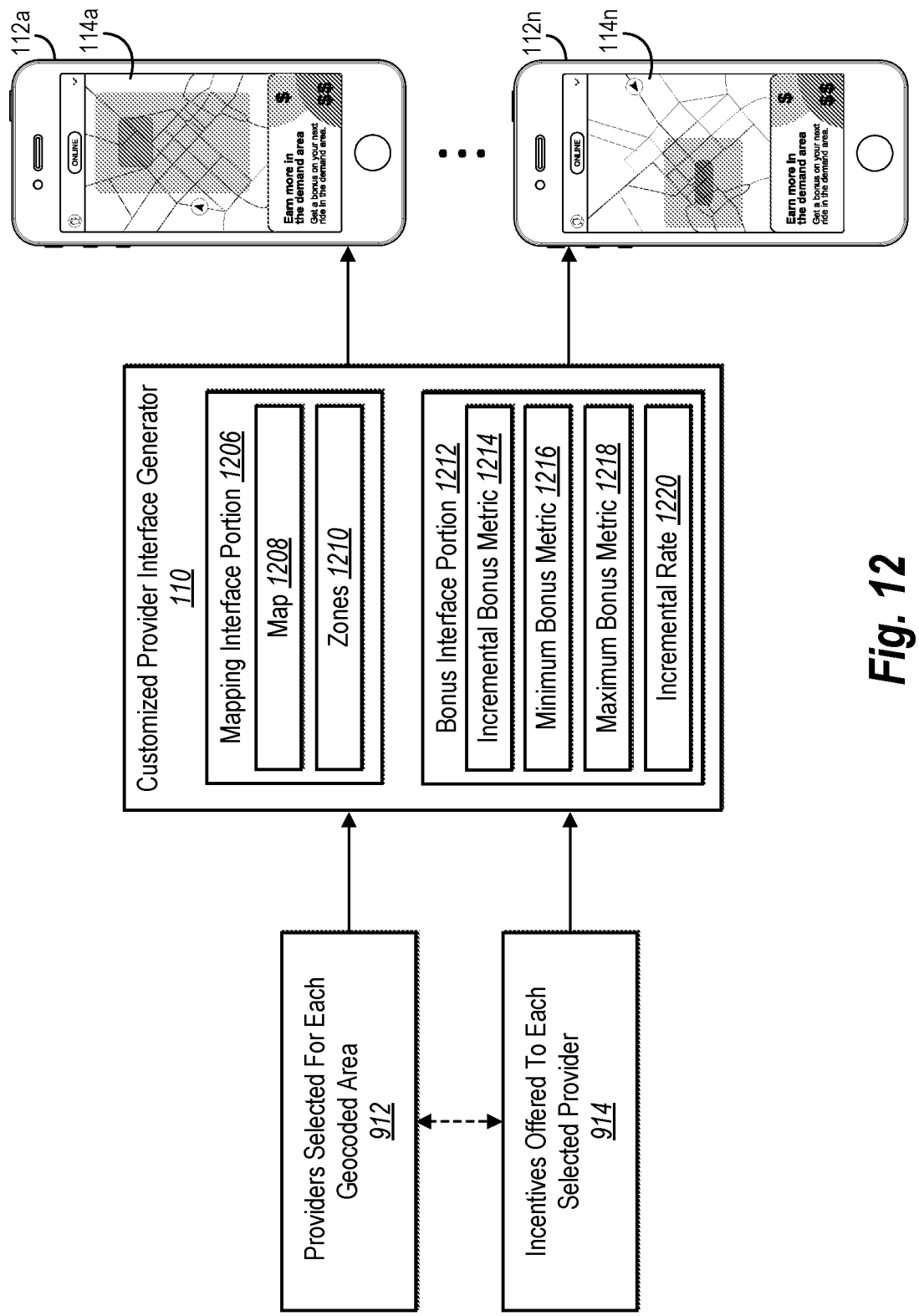
FIG. 12 illustrates a block diagram of a customized provider interface generator in accordance with one or more embodiments.
Figure 13B:
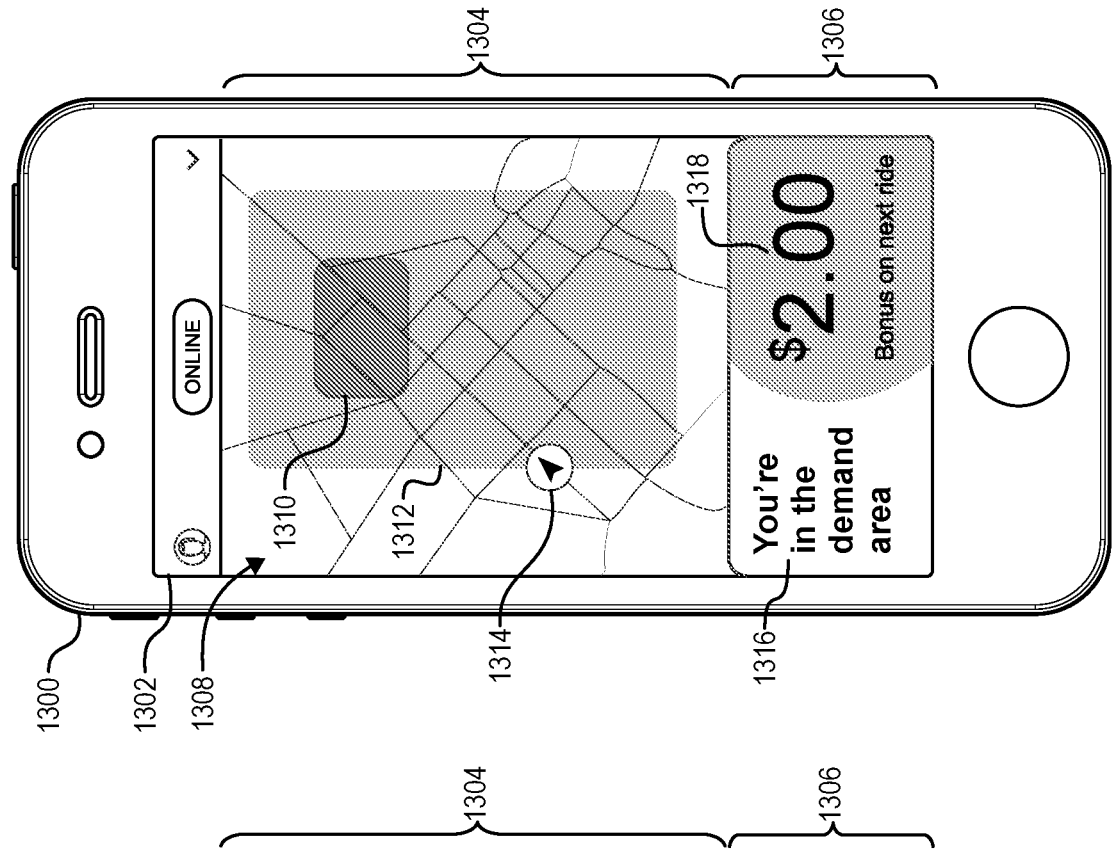
FIGS. 13A-13F illustrate a graphical user interface generated by the customized provider interface generator to relocate a selected transportation provider to a target geocoded area in accordance with one or more embodiments.
Figure 13A:
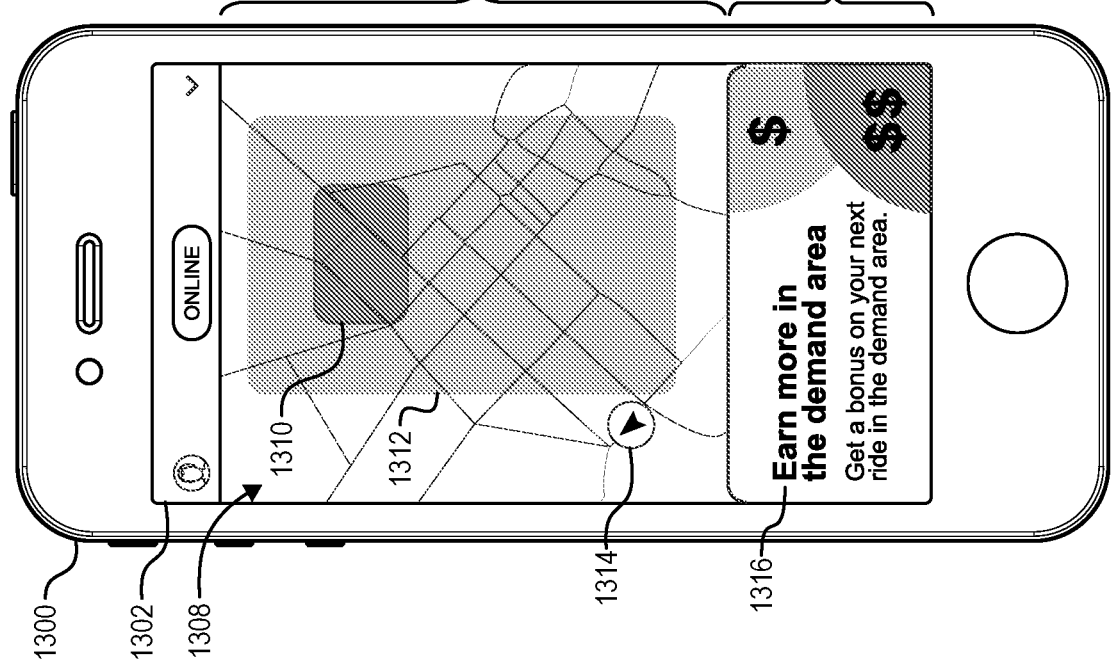
Figure 13C:
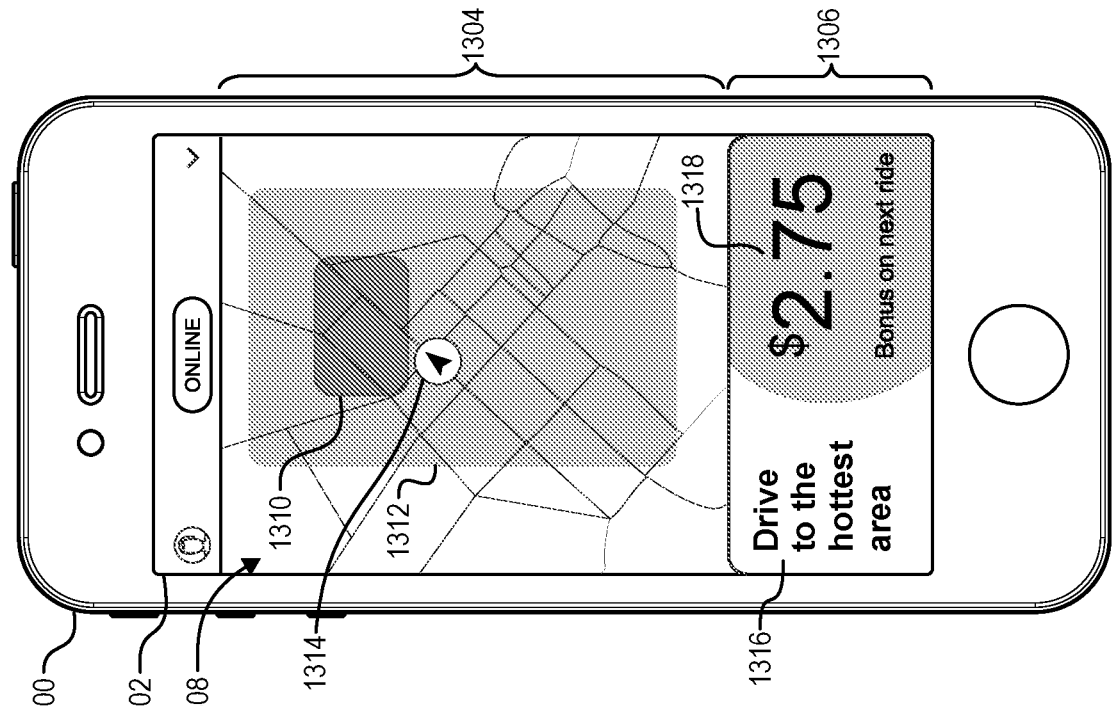
Figure 13D:
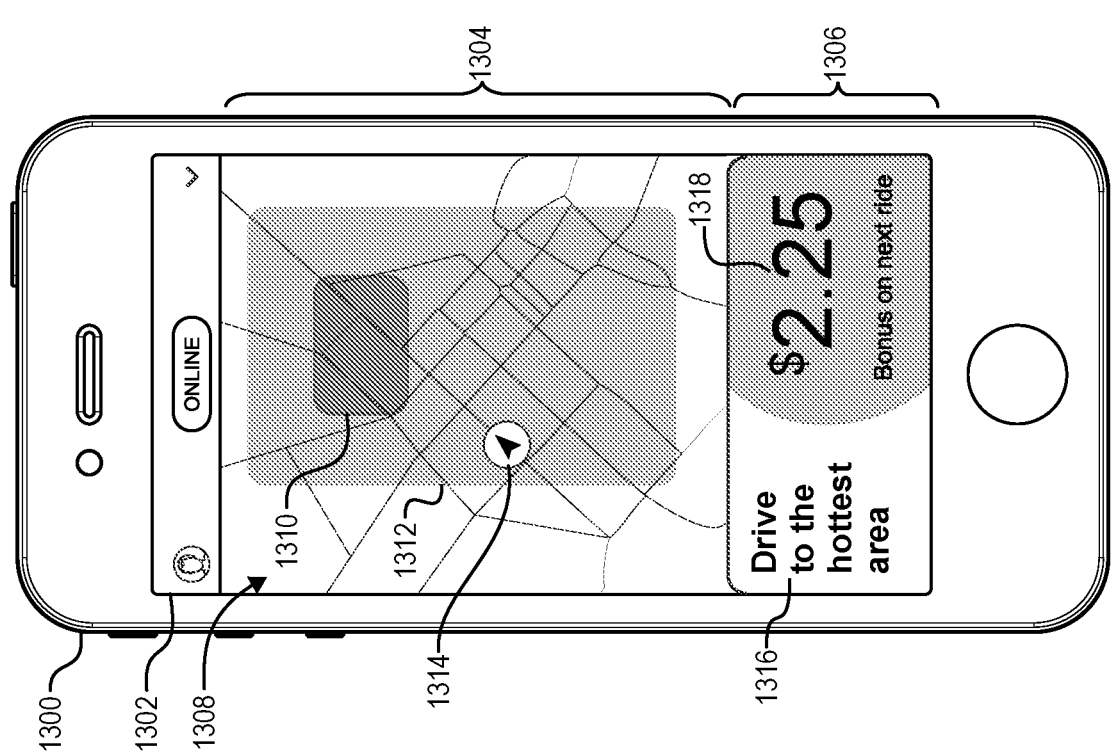
Figure 13F:
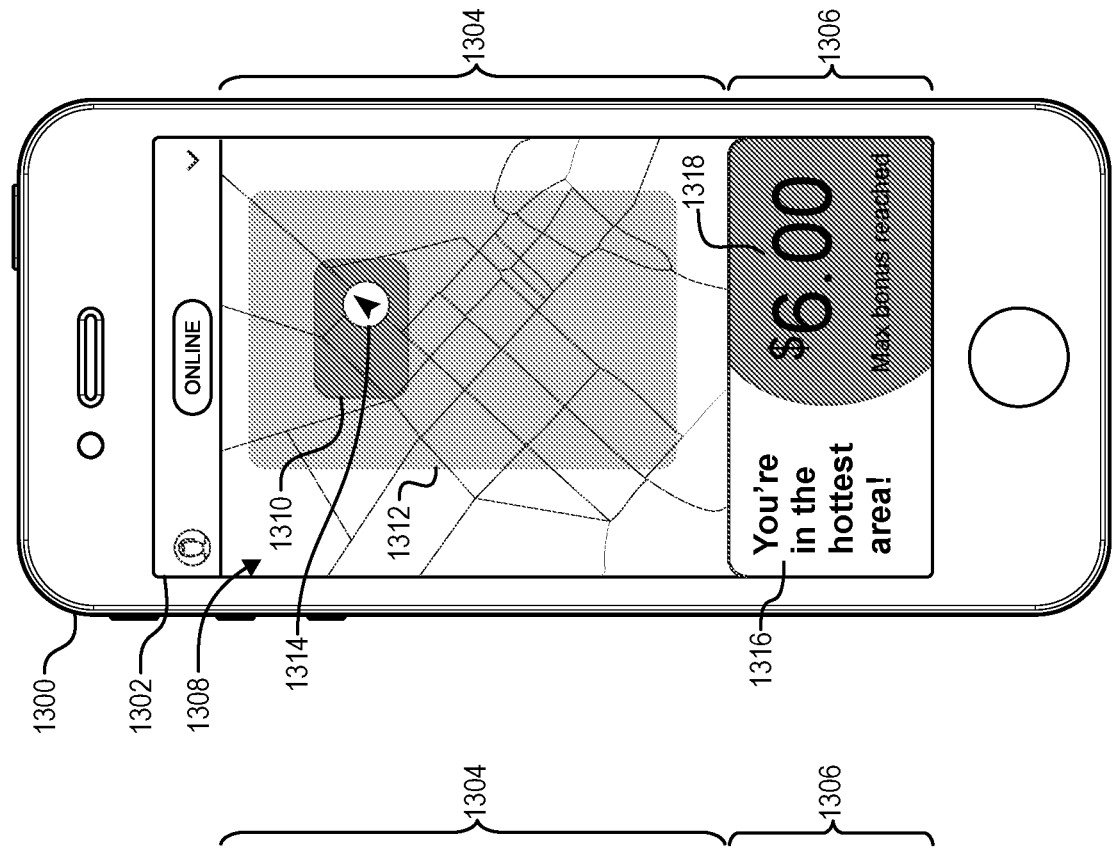
Figure 13E:
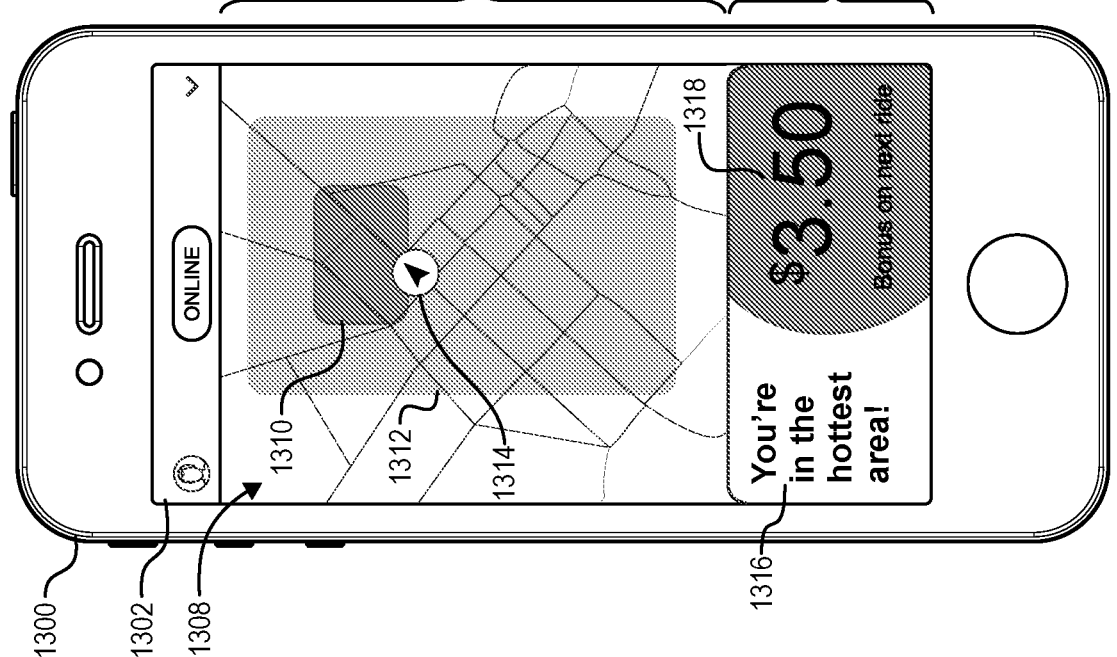
Figure 14:
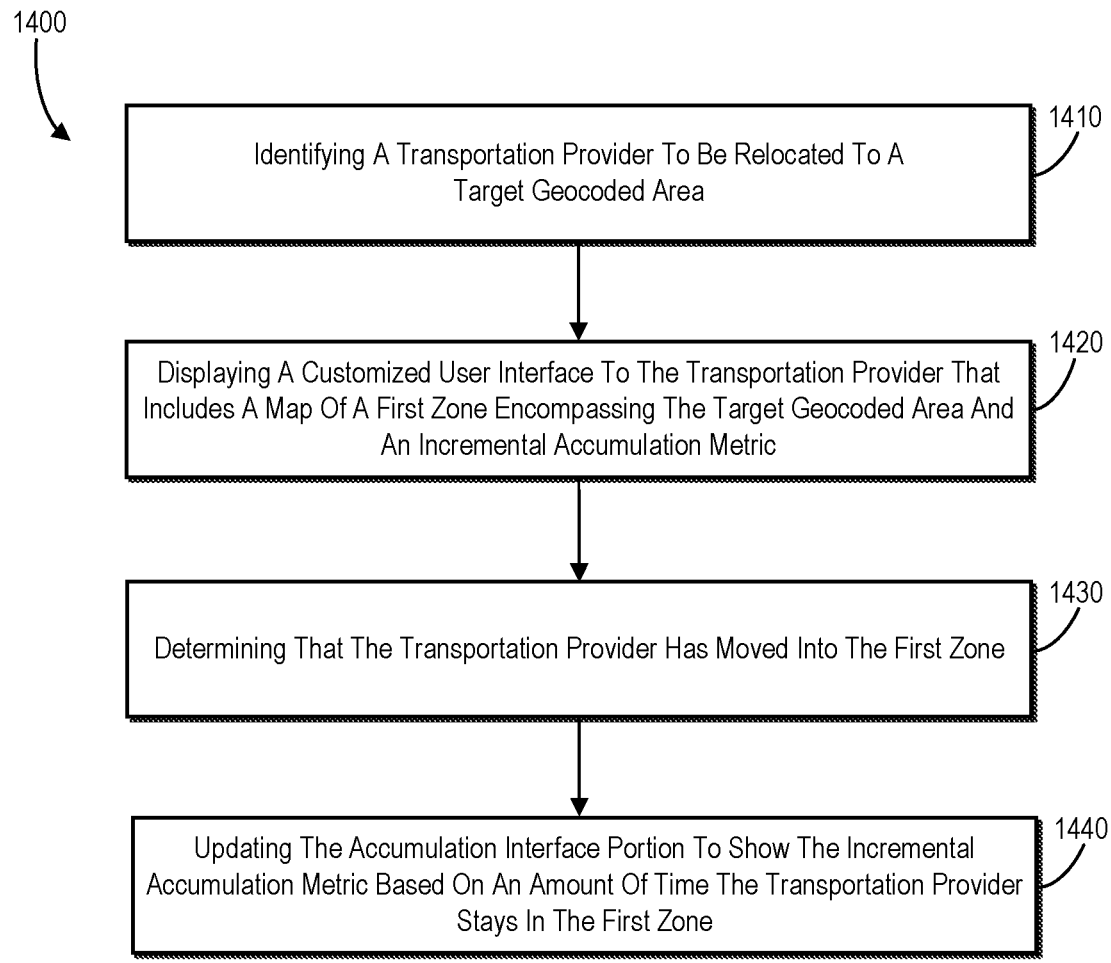
FIG. 14 illustrates a flowchart of a series of acts for generating and dynamically updating a customized user interface created for a selected transportation provider in accordance with one or more embodiments.

Turning now to FIGS. 12-14, additional description is provided regarding generating customized provider interfaces to providers who are selected to move to a target area. To illustrate, FIG. 12 shows a block diagram of a customized provider interface generator 110 in accordance with one or more embodiments. As described above, in many embodiments, the customized provider interface generator 110 is implemented within the transportation matching system 102. Indeed, as shown in FIG. 1, the customized provider interface generator 110 can reside on the transportation matching system 102.

As shown, FIG. 12 includes the providers selected for each geocoded area 912 (or simply "selected providers 912") and the incentives offered to each selected provider 914 (or simply "offered incentives 914"), as described above. In addition, FIG. 12 includes the customized provider interface generator 110 (or simply "interface generator 110"), which includes a mapping interface portion 1206 and an accumulation interface portion 1212 (e.g., a bonus interface portion). Further, FIG. 12 includes the provider client devices 112a-112n described above.

As an overview, the interface generator 110 creates a unique interface to serve to each provider selected to relocate to a target area. In addition, as described above, the personalized provider behavioral models utilizes a region's transportation flow matrix to determine which available providers to assign to target areas in the region (e.g., areas with a predicted provider allocation shortage). Upon the personalized provider behavioral models selecting which providers to send to which target areas, the transportation matching system 102 utilizes the interface generator 110 to create personalized maps to serve to each selected provider to attract the provider to the target area.

As mentioned above, FIG. 12 includes the selected providers 912 and the offered incentives 914. In various embodiments, the transportation matching system 102 inputs the selected providers 912 and the offered incentives 914 to the interface generator 110. In some embodiments, the selected providers 912 include the identifier of each selected provider (e.g., provider_id), the current location of the provider, and an identifier of the target area to which the provider is being attracted (e.g., target_area_id).

In one or more embodiments, the offered incentives 914 indicate the number of zones or incentive tiers to use when generating the customized user interface for the provider (i.e., customized provider interface). In additional embodiments, for each zone, the offered incentives 914 include a minimum accumulation amount, a maximum accumulation amount, and an incremental rate to be used by the interface generator 110.

As mentioned above, the interface generator 110 includes the mapping interface portion 1206 and the accumulation interface portion 1212. As shown, the mapping interface portion 1206 includes a map 1208 and zones 1210. In various embodiments, the interface generator 110 generates a separate map for each provider that shows the provider and the target area. In some embodiments, the target area is the epicenter of the map 1208 and the provider is located near an outer edge of the map 1208. In this manner, the size of the map is scaled to include the provider and the target area at the same time. Further, in some embodiments, the map can zoom in as the provider approaches the target area.

In addition, the interface generator 110 can overlay one or more zones 1210 on the map 1208. For example, in various embodiments, the interface generator 110 identifies the number of zones 1210 to include in the map 1208 from the offered incentives 914, described above. In some embodiments, the offered incentives 914 only indicates a single zone to be included in the map 1208. Accordingly, the interface generator 110 generates a single zone matching at least the boundaries of the target area identified from the selected providers 912.

In alternative (or additional) embodiments, the interface generator 110 generates a zone that encompasses the target area and additional areas or portions of additional areas. For example, the interface generator 110 can compare the incremental provider metric for an additional provider (described above) of the target area to adjacent areas, and if the incremental provider metric of the adjacent area is within a first incremental metric threshold (e.g., 20%) of the target area, then the interface generator 110 creates the zone around the target area and the adjacent area.

In one or more embodiments, the offered incentives 914 indicates that two zones are to be included in the map 1208 to accommodate a two-tiered incentive. In these embodiments, the interface generator 110 creates a second or outer zone around the first or inner zone (i.e., the zone around the target area). In some embodiments, the interface generator 110 determines the boundary of the outer zone by surrounding the inner zone by one or more areas on all sides creating concentric circles. In additional embodiments, the interface generator 110 also expands the outer zone to extend toward the provider's current location such that the provider's current position is near the edge of the outer zone. In this manner, the provider will be more motivated to cross into the outer zone to trigger an incentive, and subsequently travel to the target zone. In alternative embodiments, the zones are not concentric, but are sequentially arranged between the provider and the target area.

In some embodiments, the interface generator 110 creates an outer zone by including one or more areas that are within a threshold travel time of the inner zone. For example, the interface generator 110 includes areas that are within 7 driving minutes of the boundary of the inner zone. In this manner, the transportation matching system 102 ensures that no location within the outer zone has an ETA to the target area that would cause the provider to pick up a matched requestor beyond a service level agreement time (e.g., less than a 10 minutes wait time). In alternative embodiments, the interface generator 110 creates the outer zone by one or more gradients away from the inner zone that can be comfortably viewed on the map 1208 (e.g., no more than sixteen areas total). An example of a map 1208 having an inner zone and an outer zone is shown in FIG. 13A.

Further, in some embodiments the mapping interface portion 1206 includes additional zones on the map 1208. For example, if the provider is a farther distance away from the target area, the interface generator 110 creates multiple zones that progressively lead toward the target area. For example, the provider is 10 areas away from the target area and, in response, the interface generator 110 creates five zones that are each two areas wide.

Moreover, as with the inner zone, the interface generator 110 can select areas to include in the outer zone based on the incremental provider metrics of each area (e.g., value to each area of adding an additional provider). For example, if an adjacent area to the target area has an incremental provider metric that is within a second incremental metric threshold (e.g., 55%) of the target area's incremental provider metric, then the mapping interface portion 1206 includes the area in the second or outer zone.

In one or more embodiments, the interface generator 110 creates a zone by identifying the area identifier (e.g., area_id) that belongs in a zone. For example, the interface generator 110 creates an inner zone table that includes the identifier of the target area. In addition, the interface generator 110 creates an outer zone table that includes identifiers of areas surrounding the target zone. Then, using the tables, the interface generator 110 creates an overlay for the map 1208.

In embodiments where the interface generator 110 overlays more than one zone on the map 1208 served to a provider, the interface generator 110 can differentiate the zones by colors, transparencies, patterns, shading, or a combination thereof. In additional embodiments, the color, transparency, pattern intensity, and/or shading can change from one zone to the next to indicate a clear division between the zones. For example, the interface generator 110 utilizes pink to show the inner zone and purple to show the outer zone, where each zone is transparent, so streets and landmarks are visible on the map beneath. Indeed, when the interface generator 110 overlays the zones 1210 on the map 1208, the interface generator 110 generates a heatmap that guides a selected provider toward a corresponding target area, as shown on the provider client devices 112a-112n. A further example of a heat map of an inner zone and an outer zone is shown in FIG. 13A.

As mentioned above, the interface generator 110 includes the accumulation interface portion 1212. As shown, the accumulation interface portion 1212 includes an incremental accumulation metric 1214, a minimum accumulation metric 1216, a maximum accumulation metric 1218, and an incremental rate 1220. The accumulation interface portion 1212 can include the incremental accumulation metric within the user interface given to a provider.

As explained earlier, the interface generator 110 receives the offered incentives 914 from the personalized provider behavioral models. For instance, the offered incentives 914 can specify the number of zones associated with an incentive as well as the minimum accumulation metric 1216, the maximum accumulation metric 1218, and the incremental rate 1220 for each of the zones.

In one or more embodiments, the interface generator 110 increases the incremental accumulation metric as the provider travels toward and enters the inner zone (i.e., target area). In particular, the interface generator 110 tracks the location of a selected provider, and as the provider crosses a zone boundary, the minimum accumulation metric 1216 is trigger for that zone and applied to the incremental accumulation metric 1214.

In addition, for each incremental time interval (e.g., 30 seconds or 1 minute) that the provider spends time within the zone, the interface generator 110 increases the incremental accumulation metric 1214 by the incremental rate 1220 up to the maximum accumulation metric 1218 for the zone. Further, if the provider crosses into another zone (e.g., the inner zone), the interface generator 110 adjusts the incremental accumulation metric 1214 based on the minimum accumulation metric 1216, incremental rate 1220, and maximum accumulation metric 1218 for the other zone.

Upon generating a customized provider interface for a selected provider, the interface generator 110 serves the interface to the provider client device associated with the selected provider. For example, the interface generator 110 uploads the customized provider interface on the provider client application of the selected provider's client device.

To illustrate, FIG. 12 shows the provider client devices 112a-112n each implementing the provider client application 114a-114n. In particular, the provider client applications 114a-114n show a customized provider interface (e.g., heatmap with incentives) that the interface generator 110 created for the provider associated with the corresponding provider client devices 112a-112n.

As described above, the interface generator 110 generates customized provider interfaces (e.g., heatmaps with incentives) for each provider selected by the transportation matching system 102 using the personalized provider behavioral models. Thus, the interface generator 110 does not create a customize provider interface for every available provider. In various embodiments, the interface generator 110 serves a customized provider interface to a provider's client device when the provider becomes available to fulfill a transportation request, such as when the provider signs on or completes a previous transportation request.

Furthermore, the transportation matching system 102 can continually update a provider's customized interface until the transportation matching system 102 serves the provider with a transportation request. Indeed, as the provider travels toward and lingers in the target area, the interface generator 110 updates the provider's current location on the map as well as increases the incremental accumulation metric (until the maximum incentive is reached). Then, when the provider is matched with a requestor in connection with a transportation request, the provider's client application switches over to facilitate the transportation request.

In some embodiments, upon receiving a transportation request, the incentive shown in the incremental accumulation metric (e.g., bonus metric) is added to the provider's compensation for the transportation request. In alternative embodiments, depending on the incentive type, the incentive is given to the provider at a later time (e.g., at the end of the week) and/or the incentive is recorded to the provider's account. For example, the interface generator 110 updates an incentives page that tracks and lists provider's earned incentives.

FIGS. 13A-13F illustrate example provider interfaces as a provider responds to an incentive offered by the transportation matching system 102. In particular, FIGS. 13A-13F illustrate a graphical user interface generated by the customized provider interface generator 110 to relocate a selected transportation provider to a target geocoded area in accordance with one or more embodiments.

As shown, FIGS. 13A-13F include a provider client device 1300 that implements a provider client application displaying a customized provider interface 1302. The provider client device 1300 can represent embodiments of corresponding components previously described. For example, in various embodiments, the provider client device 1300 is a smartphone or tablet that runs various client applications.

Further, as shown in FIGS. 13A-13F, the customized provider interface 1302 includes a mapping interface portion 1304 and an accumulation interface portion 1306. The mapping interface portion 1304 displays a map 1308 that includes an inner zone 1310, an outer zone 1312, and the provider's location 1314 (i.e., current location). The accumulation interface portion 1306 displays incentive instructions 1316 and an incremental accumulation metric 1318 (not included in FIG. 13A).

As described above, the transportation matching system 102 generates the customized provider interface 1302 for a selected provider to attract the provider from their location 1314 to a target area, which is indicated by the inner zone 1310. In response to the provider traveling to the target area, the transportation matching system 102 offers the provider a bonus incentive (i.e., an accumulation incentive).

In the illustrated embodiments, the map 1308 is centered on the target area (e.g., inner zone 1310) and remains fixed while the provider's location 1314 changes to reflect the provider's movement. In alternative embodiments, the map 1308 is centered around the provider's location 1314. However, it is beneficial if the scale of the map 1308 is such that the provider's location 1314 and the full border of the zone the provider currently is in (or all zones, if not within any zone) is visible at one time. Thus, as the provider crosses into smaller zones, the transportation matching system 102 can zoom in on the map 1308 to show the current zone and any interior zones.

As shown in FIGS. 13A-13F, the inner zone 1310 and the outer zone 1312 are visually distinct from one another. For example, the inner zone 1310 is displayed as a lighter shading and the outer zone 1312 is displayed as a darker shading. As described above, the transportation matching system 102 can distinguish zones on a map by colors, transparencies, patterns, shading, or a combination thereof. For example, the transportation matching system 102 colors the inner zone 1310 pink and the outer zone 1312 purple. In addition, or in the alternative, the transportation matching system 102 varies the color or pattern densities to distinguish the two zones (e.g., the inner zone 1310 has a denser or more intense color than the outer zone 1312). In this manner, the customized provider interface 1302 serves a provider with a heatmap that enables the provider to easily understand where the location target area and surrounding heatmap zones.

FIG. 13A represents a customized provider interface 1302 given to a provider upon the provider being selected by the transportation matching system 102 to reallocate to the target area. As shown in FIG. 13A, the provider's location 1314 is outside of the outer zone 1312. However, the provider is located near the boundary of the outer zone 1312. As described above, in one or more embodiments, the transportation matching system 102 skews or extends the outer most zone to be near the provider's location 1314 to draw the provider into a zone and towards the target area.

As illustrated in FIG. 13A, the accumulation interface portion 1306 includes incentive instructions 1316, but not the incremental accumulation metric 1318. In one or more embodiments, the transportation matching system 102 does not indicate incentive amounts to the provider until the provider achieves the amount or enters into a zone. For example, the transportation matching system 102 serves the currently achieved incremental accumulation metric 1318 as well as an indication of if the maximum accumulation metric is achieved for a zone (e.g., the outer zone or the inner zone). In alternative embodiments, the transportation matching system 102 provides full or partial information regarding an incentive (e.g., the maximum accumulation amount achievable).

To trigger a bonus (i.e., an accumulation) corresponding to the offered incentive, the provider can cross the boundary of the outer zone 1312. In particular, the incentive instructions 1316 in FIG. 13A instruct the provider on how to trigger and receive an accumulation amount. Upon the provider crossing the boundary of the outer zone 1312, the transportation matching system 102 updates the accumulation interface portion 1306 to show an incremental accumulation metric.

To illustrate, FIG. 13B shows an updated map 1308 of the provider's location 1314 crossing the boundary of the outer zone 1312. Also shown is the incremental accumulation metric 1318 within the accumulation interface portion 1306 of the customized provider interface 1302. For example, the transportation matching system 102 updates the incremental accumulation metric 1318 to show the minimum accumulation metric ($2.00) of the outer zone 1312. Further, the transportation matching system 102 updates the incentive instructions 1316 indicating to the provider that they have entered into a zone.

In one or more embodiments, the accumulation interface portion 1306, or portions thereof, can visually match the color or pattern of the zone through which the provider is currently traveling. For example, as shown, the background of the incremental accumulation metric 1318 updates to match the lighter shading of the outer zone 1312. In alternative embodiments, the background of the accumulation interface portion 1306 updates to match the shading of the zone corresponding to the provider's location 1314. Additionally, or alternatively, the text within the accumulation interface portion 1306 (e.g., the text of the incentive instructions 1316 or the incremental accumulation metric 1318) update to match the zone through which the provider is traveling.

As the driver spends time in a zone, the incremental accumulation metric 1318 can increase at regular time intervals based on the incremental rate associated with the zone. As mentioned above, in some embodiments, for each minute that the provider remains in a zone (or distance traveled), the incremental accumulation metric 1318 increase. For example, in the illustrated embodiment, the outer zone 1312 has a minimum accumulation metric of $2.00, an incremental rate of $0.25, and a maximum accumulation metric of $3.00. Relatedly, the inner zone 1310 has a minimum accumulation metric of $3.50, an incremental rate of $0.50, and a maximum accumulation metric of $6.00.

As shown, FIG. 13C includes an updated map 1308 of the provider's location 1314 traveling within the outer zone 1312. Notably, the incremental accumulation metric 1318 in FIG. 13C has increased to $2.25. As shown, the provider is traveling away from the border of the outer zone 1312 and toward the target area (e.g., the inner zone 1310). Indeed, based on the provider traveling in the outer zone 1312 for at least 1 minute, the transportation matching system 102 increases the incremental accumulation metric 1318 by $0.25. Further, the transportation matching system 102 updates the incentive instructions 1316 to direct the provider to keep traveling toward the target area.

Similarly, 13D includes an updated map 1308 of the provider's location 1314 traveling within the outer zone 1312. Notably, the incremental accumulation metric 1318 in FIG. 13D has increased to $2.75. Accordingly, in FIG. 13D, based on the example given above, the provider remained within the outer zone 1312 for at least 3 minutes.

If the provider remains in the outer zone 1312 for an additional minute, the transportation matching system 102 updates the incremental accumulation metric 1318 to $3.00, which is the maximum accumulation metric for the outer zone 1312. However, if the provider continues to stay in the outer zone 1312 for over four minutes, the incremental accumulation metric 1318 will not increase. To receive an additional bonus (i.e., to increase the accumulation amount), the provider needs to enter into the inner zone 1310.

As shown, FIG. 13E includes an updated map 1308 of the provider's location 1314 traveling across the border of the inner zone 1310. Notably, the incremental accumulation metric 1318 in FIG. 13E has increased to $3.50, which is the minimum accumulation metric for the inner zone 1310. In addition, the transportation matching system 102 updates the incentive instructions 1316 indicating to the provider that they have arrived in the target area. Further, the background of the incremental accumulation metric 1318 updates to match the darker shading of the inner zone 1310.

In some embodiments, the maximum accumulation metric for the outer zone 1312 equals the minimum accumulation metric of the inner zone 1310. In these embodiments, if the provider has been awarded the maximum accumulation metric for the outer zone 1312 before entering the inner zone 1310, the incremental accumulation metric 1318 will not change until the provider has remained in the inner zone 1310 for a least one incremental time interval. However, if the provider has not yet been awarded the maximum accumulation metric for the outer zone 1312 before entering the inner zone 1310, the incremental accumulation metric 1318 will increase to the minimum accumulation metric of the inner zone 1310. Thus, if a provider can travel to the inner zone 1310 in a short period of time, then the provider can archive a larger incremental accumulation jump when entering into the inner zone 1310.

In alternative embodiments, such as shown in FIG. 13E, the minimum accumulation metric of the inner zone 1310 is larger than the maximum accumulation metric of the outer zone 1312. Thus, when the provider crosses the boundary of the inner zone 1310, the incremental accumulation metric 1318 jumps up to the minimal accumulation metric of the inner zone 1310. Still in other embodiments, the minimum accumulation metric of the inner zone 1310 is the same or below the maximum accumulation metric of the outer zone 1312. For example, the inner zone 1310 and outer zone 1312 have the same minimum accumulation metrics (but different maximum accumulation metrics).

As mentioned above, FIG. 13E shows the transportation matching system 102 increasing the incremental accumulation metric 1318 to match the minimum accumulation metric of the inner zone 1310 upon the provider entering into the inner zone 1310. At this point in time, the provider has arrived in the target area. To encourage the provider to remain in the target area, the transportation matching system 102 can continue to increase the incremental accumulation metric 1318 as the provider remains in the inner zone 1310.

To illustrate, FIG. 13F includes an updated map 1308 of the provider's location 1314 traveling within the inner zone 1310. Notably, the incremental accumulation metric 1318 in FIG. 13F has increased to $6.00 based on the time the provider spent in the inner zone 1310. In addition, the incremental accumulation metric 1318 in FIG. 13F indicates that the provider has reached the maximum accumulation amount (i.e., "Max bonus reached"). Ideally, the transportation matching system 102 matches the provider with a transportation request from the target area at or before the provider reaching the maximum accumulation metric.

As mentioned previously, in one or more embodiments, the customized provider interface 1302 showing the mapping interface portion 1304 and the accumulation interface portion 1306 is displayed on the provider client device 1300 until a matched transportation request is served to the provider. Then, upon initiating or completing the transportation request, the incremental accumulation metric 1318 can be awarded to the provider as a bonus.

The previous figures, including FIGS. 1, 2, 12, and 13A-F, the corresponding text, and the examples describe several different systems, methods, techniques, components, and/or devices of the transportation matching system 102 in accordance with one or more embodiments. In addition to the description herein, one or more embodiments can also be described in terms of flowcharts including acts for accomplishing a particular result. For example, FIG. 14 illustrates a flowchart of an exemplary sequence of acts 1400 for managing the allocation of transportation providers based on generating and dynamically updating a customized user interface created for a selected transportation provider in accordance with one or more embodiments. In addition, FIG. 14 may be performed with more or fewer acts. Further, the acts may be performed in differing orders. Additionally, the acts described herein may be repeated or performed in parallel with one another or parallel with different instances of the same or similar acts.

While FIG. 14 illustrates the series of acts 1400 according to particular embodiments, alternative embodiments may omit, add to, reorder, and/or modify any of the acts shown. The series of acts 1400 can be performed as part of a method. Alternatively, a non-transitory computer-readable medium can comprise instructions, when executed by one or more processors, cause a computing device (e.g., a client device and/or a server device) to perform the series of acts of 1400. In still further embodiments, a system performs the series of acts of 1400.

To illustrate, the series of acts 1400 includes an act 1410 of identifying a transportation provider to be relocated to a target geocoded area. In particular, the act 1410 can involve identifying a transportation provider in a first geocoded area to be relocated to a target geocoded area. In one or more embodiments, the act 1410 includes detecting available transportation providers that are within a threshold transportation distance or a threshold travel time of the target geocoded area such that the available transportation providers can fulfill a transportation request during a future time interval.

As shown in FIG. 14, the series of acts 1400 further includes an act 1420 of displaying a customized user interface to the transportation provider that includes a map of a first zone encompassing the target geocoded area and an incremental accumulation metric. In particular, the act 1420 can involve causing a computing device associated with the transportation provider to display a customized user interface that includes: a mapping interface portion having a map including the target geocoded area, a first zone encompassing the target geocoded area, and a current location of the transportation provider; and an accumulation interface portion that includes an incremental accumulation metric associated with movements of the transportation provider. In various embodiments, the map within the mapping interface portion of the customized user interface provided to the computing device associated with the transportation provider includes a second zone that encompasses the target geocoded area and at least one additional geocoded area.

As shown, the series of acts 1400 also includes an act 1430 of determining that the transportation provider has moved into the first zone. For example, in some embodiments, the act 1430 includes monitoring movements of the transportation provider with respect to the geocoded areas within the geocoded region.

As shown in FIG. 14, the series of acts 1400 further includes an act 1440 of updating the accumulation interface portion to show the incremental accumulation metric based on an amount of time the transportation provider stays in the first zone. In particular, the act 1440 can involve causing, based on determining that the transportation provider has moved into the first zone, the customized user interface to update the accumulation interface portion to show the incremental accumulation metric based on an amount of time the transportation provider stays in the first zone. In some embodiments, the act 1140 includes displaying the incremental accumulation metric until a transportation request is provided to the transportation provider. In additional embodiments, the incremental accumulation metric is applied to the transportation request.

In one or more embodiments, the series of acts 1400 includes additional acts. For example, the series of acts 1400 includes an act of assigning a first minimum accumulation metric, a first maximum accumulation metric, and a first incremental rate to the first zone, and causing the customized user interface to update the incremental accumulation metric to the minimum accumulation metric upon detecting the transportation provider entering the first zone. In further embodiments, the above act includes increasing the incremental accumulation metric by the first incremental rate for each time interval the transportation provider stays in the first zone until the incremental accumulation metric reaches the first maximum accumulation metric.

In some embodiments the series of acts 1400 further include an act of assigning a second minimum accumulation metric, a second maximum accumulation metric, and a second incremental rate to the second zone, where the second maximum accumulation metric is less than or equal to the first minimum accumulation metric of the first zone. In additional embodiments, the map updates the current location of the transportation provider as the transportation provider moves within the map. In some instances, the map remains centered on the first zone as the transportation provider moves within the map.

In further embodiments, the current location of the transportation provider is located outside of the second zone upon initially serving the customized user interface to the computing device associated with the transportation provider. In some embodiments, the at least one additional geocoded area in the second zone is within a travel threshold time of the target geocoded zone.

In various embodiments, the first zone is displayed as a first color or a first pattern overlaid on the map and the second zone is displayed as a second color or a second pattern overlaid on the map. Additionally, in some embodiments, the series of acts 1400 further include acts of detecting that the current location of the transportation provider is within the second zone, and updating the accumulation interface portion to include the second color or the second pattern in association with the incremental accumulation metric.

Figure 15:
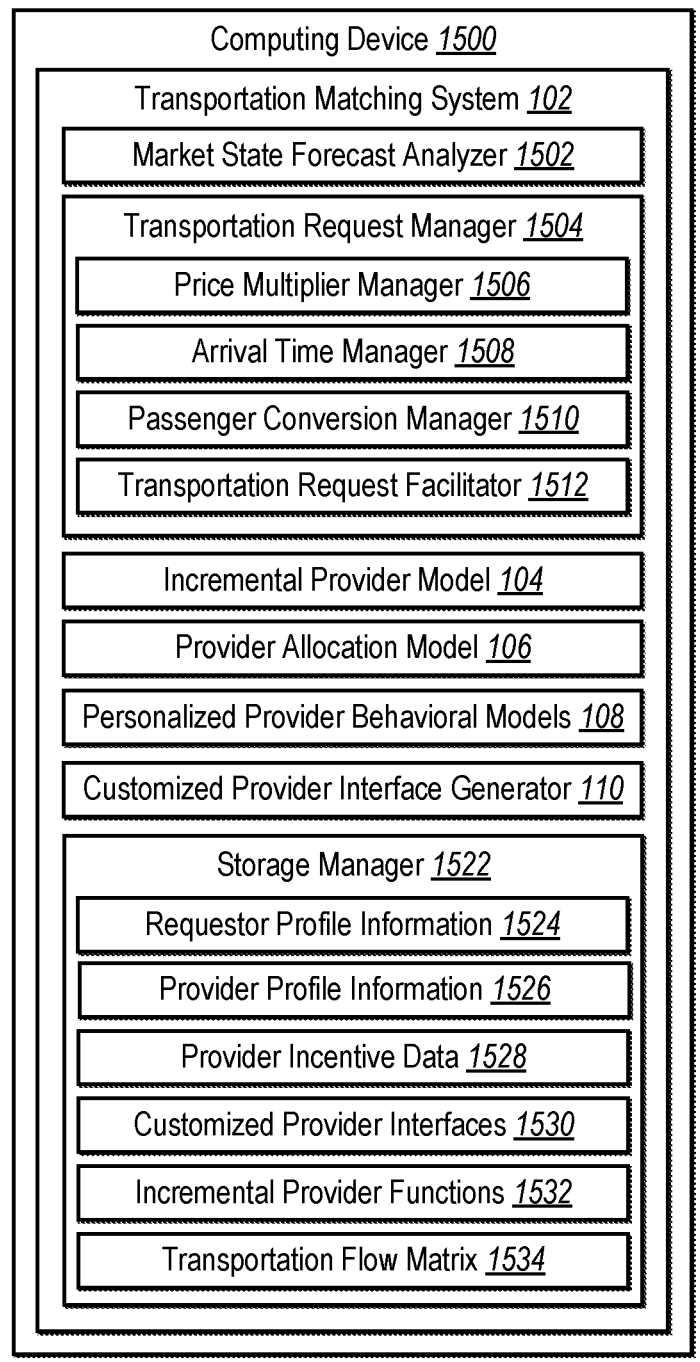
FIG. 15 illustrates a schematic diagram of the transportation matching system in accordance with one or more embodiments.

Turning now to FIG. 15, additional detail is provided regarding capabilities and components of the transportation matching system 102 in accordance with one or more embodiments. In particular, FIG. 15 shows a schematic diagram of a computing device 1500 that includes the transportation matching system 102. Moreover, the computing device 1500 can include a variety of different devices. For example, in some embodiments, some or all the components of the transportation matching system 102 are implemented on one or more server devices and/or client devices.

As shown, the transportation matching system 102 is located on a computing device 1500. In general, the computing device 1500 represents various types of client devices. For example, in some embodiments, the computing device 1500 is a non-mobile device, such as a desktop or server, or another type of computing device. In other embodiments, the computing device 1500 is a mobile device, such as a laptop, a tablet, a mobile telephone, a smartphone, etc. Additional details regarding the computing device 1500 are discussed below as well as with respect to FIG. 16.

The transportation matching system 102 includes various components for performing the processes and features described herein. For example, the transportation matching system 102 includes a market state forecast analyzer 1502, a transportation request manager 1504, an incremental provider model 104, a provider allocation model 106, personalized provider behavioral models 108, a customized provider interface generator 110, and a storage manager 1522. Each of these components is further described below.

As shown, the transportation matching system 102 includes the market state forecast analyzer 1502. In general, the market state forecast analyzer 1502 receives, gathers, obtains, identifies, analyzes, determines, predicts, serves, and/or provides forecasts for the transportation matching system 102. For instance, the market state forecast analyzer 1502 predicts forecast data for a current or future time interval, as described above. For example, the market state forecast analyzer 1502 identifies the number of providers in a geocoded area, in a geocoded region, neighborhood of an area, and/or a dispatch radius of an area. Similarly, the market state forecast analyzer 1502 forecasts identifies the number of transportation requests for an area in a region and/or neighborhood of an area for a current or future time interval. Additional detail regarding identifying forecast data is provided above in connection with FIG. 3.

As mentioned above, the transportation matching system 102 includes a transportation request manager 1504. The transportation request manager 1504 includes a price multiplier manager 1506, an arrival time manager 1508, a passenger conversion manager 1510, and a transportation request facilitator 1512. In general, the transportation request manager 1504 identifies, receives, manages, matches, assigns, pricing, converts, estimates, modifies, and/or provides transportation requests initiated by requestors (via a requestor client device) or portions thereof.

As part of managing transportation requests, the transportation request manager 1504 utilizes the price multiplier manager 1506. In various embodiments, the price multiplier manager 1506 determines a base price and/or multiplier for each area in a region. For example, the price multiplier manager 1506 feeds forecast data into one or more online learning models or functions to determine a multiplier for each area. Additional description regarding determining price multiplier functions and price multipliers are included above with respect to FIG. 3.

In addition, the transportation request manager 1504 utilizes the arrival time manager 1508. In one or more embodiments, the arrival time manager 1508 determines an estimated time of arrival for providers available to fulfill transportation requests in each area in a region. For example, in some embodiments, the arrival time manager 1508 determines the average ETA of providers outside an area and within a defined perimeter or radius (e.g., area neighborhood, dispatch radius, etc.). In alternative embodiments, the arrival time manager 1508 identifies the shortest ETA of a provider to an area, as described above. Further detail regarding estimated times of arrival functions are provided above in connection with FIG. 3.

Further, the transportation request manager 1504 utilizes the passenger conversion manager 1510. In one or more embodiments, the passenger conversion manager 1510 determines a conversion rate of requestors that are anticipated to initiate a transportation request for each area in the region. In some embodiments, the passenger conversion manager 1510 determines a probability that transportation requests will result in matched rides and/or completed rides. The passenger conversion manager 1510 can execute a conversion function for each area based on the price multiplier and ETA, as further described above with respect to FIG. 3.

Moreover, the transportation request manager 1504 includes the transportation request facilitator 1512. In many embodiments, the transportation request facilitator 1512 manages the matching of transportation requests to providers. For example, the transportation request facilitator 1512 receives transportation requests from requestors, identifies available providers in or near an area, and matches the requestors to the providers. As described above, components of the transportation matching system 102 attracts providers to target areas such that the providers will be in or near a target area when a requestor in the target area initiates a transportation request. Further, the transportation request facilitator 1512 can store and retrieve requestor information 1524 and provider information 1526 with the storage manager 1522 to identify and match requestors to providers in matching transportation requests.

As shown, the transportation matching system 102 includes the incremental provider model 104. The incremental provider model 104 can represent the incremental provider model previously described in detail. For example, in many embodiments, the incremental provider model 104 determines the forecasted benefit (i.e., value or incremental effect) to each area in a region of adding additional providers by generating incremental provider functions for each area, as described previously. In some embodiments, the incremental provider model 104 communicates with the market state forecast analyzer 1502 to determine incremental provider functions for each area. Further, in various embodiments, the incremental provider model 104 stores generated incremental provider functions 1532 with the storage manager 1522.

As mentioned above and as shown in FIG. 15, the transportation matching system 102 includes the provider allocation model 106. The provider allocation model 106 can represent the provider allocation model described above in detail. In one or more embodiments, the provider allocation model 106 determines how to reallocate providers within the region to optimally fulfill anticipated transportation requests for a current or future time interval. For example, the provider allocation model 106 accesses the incremental provider functions 1532 from the storage manager 1522, generates a transportation flow matrix 1534 based on the incremental provider function 1532 and forecast data, and stores the transportation flow matrix 1534 with the storage manager 1522.

As shown, the transportation matching system 102 includes the personalized provider behavioral models 108. The personalized provider behavioral models 108 can represent the personalized provider behavioral models 108 described in detail above. For example, the personalized provider behavioral models 108 utilize provider information 1526, and provider incentive data 1528 stored with the storage manager 1522 and/or other information to train. Further, the personalized provider behavioral models 108 utilizes the transportation flow matrix 1534 and current profile information to select which providers to send to which target areas. In some embodiments, the personalized provider behavioral models 108 also determine which incentive to offer to providers to best attract the provider to a target area.

As mentioned above and as shown, the transportation matching system 102 includes the customized provider interface generator 110. The customized provider interface generator 110 can represent the customized provider interface generator described previously. For example, the customized provider interface generator 110 creates customized provider interfaces 1530 (stored with the storage manager 1522) specific to each of the providers selected by the personalized provider behavioral models 108. Further, the customized provider interface generator 110 can update the customized provider interfaces 1530 (e.g., heatmaps) as providers approach a target area, including modifying an incremental accumulation metric included in one or more customized provider interfaces 1530.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
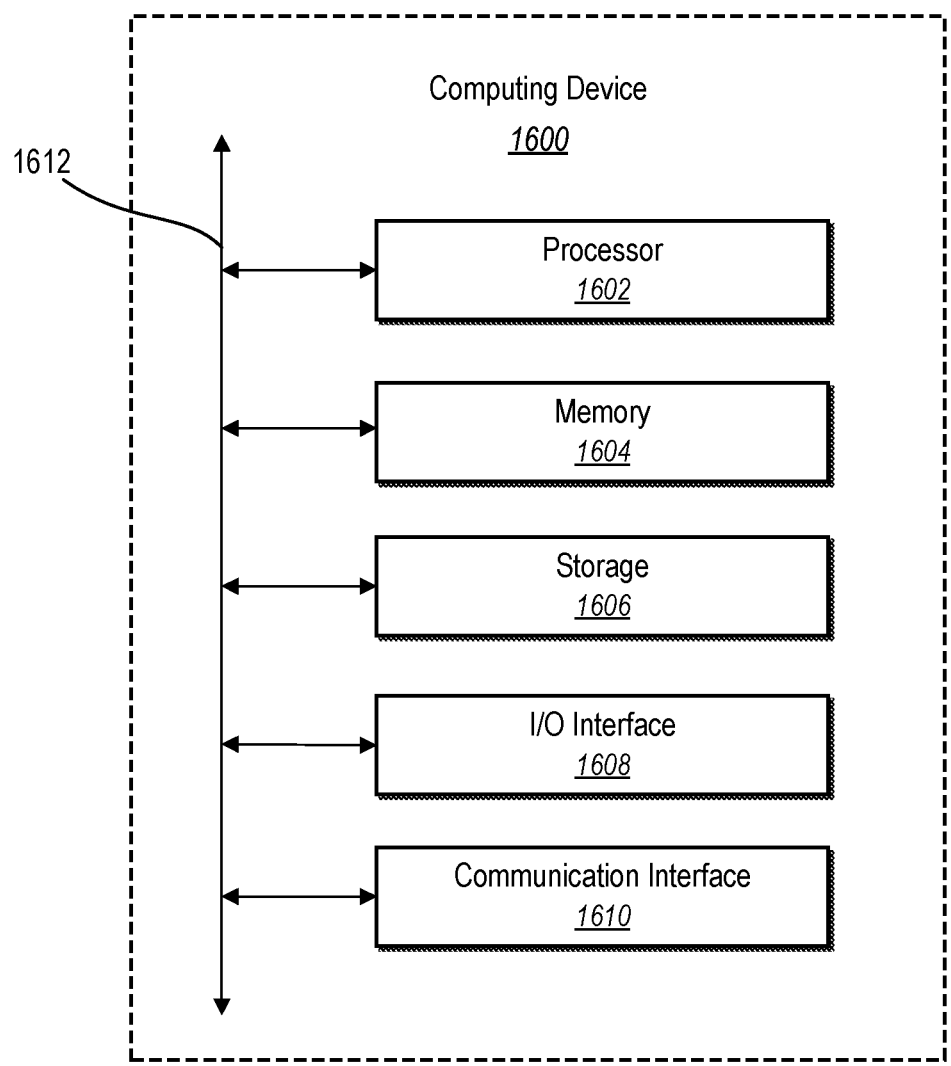
FIG. 16 illustrates a block diagram of a computing device for implementing one or more embodiments of the present disclosure.

FIG. 16 illustrates, in block diagram form, an exemplary computing device 1600 that may be configured to perform one or more of the processes described above. One will appreciate that the transportation matching system 102 can comprise implementations of the computing device 1600, including, but not limited to, the server device 101, the provider client devices 112a-112n, the requestor client devices 116a-116n, the provider client device 1300, and the computing device 1500. As shown by FIG. 16, the computing device can comprise a processor 1602, memory 1604, a storage device 1606, an I/O interface 1608, and a communication interface 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive ("HDD"), flash memory, a Universal Serial Bus ("USB") drive or a combination of these or other storage devices.

The computing device 1600 also includes one or more input or output interface 1608 (or "I/O interface 1608"), which are provided to allow a user (e.g., requestor or provider) to provide input to (such as user strokes), receive output from, and otherwise transfer data to and from the computing device 1600. These I/O interface 1608 may include a mouse, keypad or a keyboard, a touch screen, camera, optical scanner, network interface, modem, other known I/O devices or a combination of such I/O interface 1608. The touch screen may be activated with a stylus or a finger.

The I/O interface 1608 may include one or more devices for presenting output to a user, including, but not limited to, a graphics engine, a display (e.g., a display screen), one or more output providers (e.g., display providers), one or more audio speakers, and one or more audio providers. In certain embodiments, interface 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller ("NIC") or network adapter for communicating with an Ethernet or other wire-based network or a wireless NIC ("WNIC") or wireless adapter for communicating with a wireless network, such as a WI-FI. The computing device 1600 can further include a bus 1612. The bus 1612 can comprise hardware, software, or both that connects components of computing device 1600 to each other.

Figure 17:
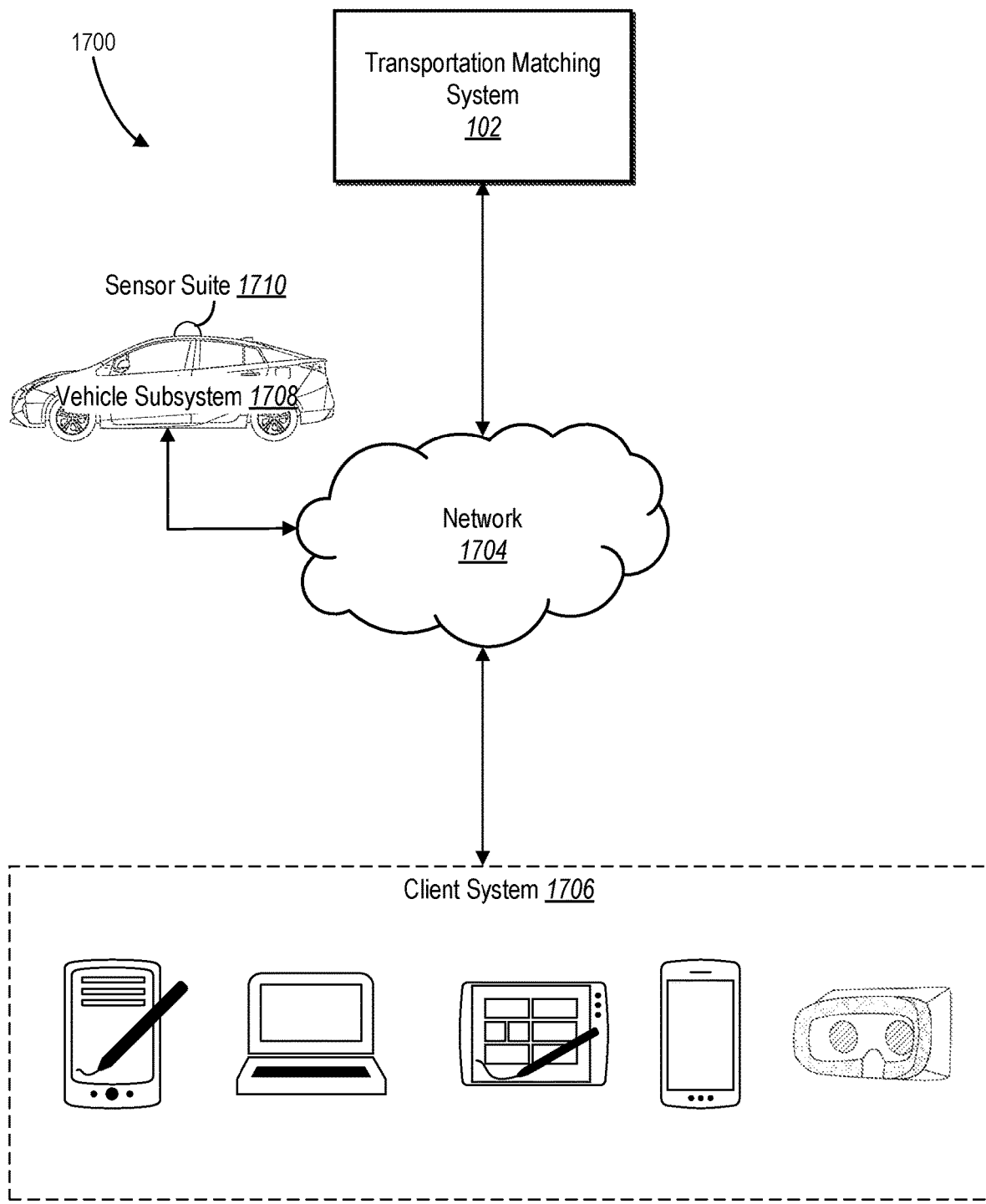
FIG. 17 illustrates an example environment for a dynamic transportation matching system in accordance with one or more embodiments.

FIG. 17 illustrates an example network environment 1700 of a transportation matching system. The network environment 1700 includes a client device 1706, a transportation matching system 102, and a vehicle subsystem 1708 connected to each other by a network 1704. Although FIG. 17 illustrates a particular arrangement of the client device 1706, transportation matching system 102, vehicle subsystem 1708, and network 1704, this disclosure contemplates any suitable arrangement of client device 1706, transportation matching system 102, vehicle subsystem 1708, and network 1704. As an example, and not by way of limitation, two or more of client device 1706, transportation matching system 102, and vehicle subsystem 1708 communicate directly, bypassing network 1704. As another example, two or more of client device 1706, transportation matching system 102, and vehicle subsystem 1708 may be physically or logically co-located with each other in whole or in part. Moreover, although FIG. 17 illustrates a particular number of client devices 1706, transportation matching systems 102, vehicle subsystems 1708, and networks 1704, this disclosure contemplates any suitable number of client devices 1706, transportation matching systems 102, vehicle subsystems 1708, and networks 1704. As an example, and not by way of limitation, network environment 1700 may include multiple client device 1706, transportation matching systems 102, vehicle subsystems 1708, and networks 1704.

This disclosure contemplates any suitable network 1704. As an example, and not by way of limitation, one or more portions of network 1704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1704 may include one or more networks 1704.

Links may connect client device 1706, transportation matching system 102, and vehicle subsystem 1708 to network 1704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, client device 1706 may be an electronic device including hardware, software, or embedded logic components or a combination of two or more such components and capable of carrying out the appropriate functionalities implemented or supported by client device 1706. As an example, and not by way of limitation, a client device 1706 may include any of the computing devices discussed above in relation to FIG. 16. A client device 1706 may enable a network user at client device 1706 to access network 1704. A client device 1706 may enable its user to communicate with other users at other client devices 1706.

In particular embodiments, client device 1706 may include a requestor client application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1706 one or more Hyper Text Markup Language ("HTML") files responsive to the HTTP request. Client device 1706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. Transportation matching system 102 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the transportation matching system 102. In addition, the dynamic transportation matching system may manage identities of service requestors such as users/requestors. In particular, the dynamic transportation matching system may maintain requestor data such as driving/riding histories, personal data, or other user data in addition to navigation and/or traffic management services or other location services (e.g., GPS services).

In particular embodiments, the transportation matching system 102 may manage transportation matching services to connect a user/requestor with a vehicle and/or provider. By managing the transportation matching services, the transportation matching system 102 can manage the distribution and allocation of resources from the vehicle systems 108*a* and 108*n* and user resources such as GPS location and availability indicators, as described herein.

Transportation matching system 102 may be accessed by the other components of network environment 1700 either directly or via network 1704. In particular embodiments, transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1706, or a transportation matching system 102 to manage, retrieve, modify, add, or delete, the information stored in data store.

In particular embodiments, transportation matching system 102 may provide users with the ability to take actions on various types of items or objects, supported by transportation matching system 102. As an example, and not by way of limitation, the items and objects may include transportation matching networks to which users of transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 102 or by an external system of a third-party system, which is separate from transportation matching system 102 and coupled to transportation matching system 102 via a network 1704.

In particular embodiments, transportation matching system 102 may be capable of linking a variety of entities. As an example, and not by way of limitation, transportation matching system 102 may enable users to interact with each other or other entities, or to allow users to interact with these entities through an application programming interfaces ("API") or other communication channels.

In particular embodiments, transportation matching system 102 may include a variety of servers, sub-systems, programs, modules, logs, and data stores. In particular embodiments, transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 102 may also include suitable components such as network interfaces, security mechanisms, load balancers, failover servers, management-and-network-operations consoles, other suitable components, or any suitable combination thereof. In particular embodiments, transportation matching system 102 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 102 and one or more client devices 1706. An action logger may be used to receive communications from a web server about a user's actions on or off transportation matching system 102. In conjunction with the action log, a third-party-content-object log may be maintained of user exposures to third-party-content objects. A notification controller may provide information regarding content objects to a client device 1706. Information may be pushed to a client device 1706 as notifications, or information may be pulled from client device 1706 responsive to a request received from client device 1706. Authorization servers may be used to enforce one or more privacy settings of the users of transportation matching system 102. A privacy setting of a user determines how particular information associated with a user can be shared. The authorization server may allow users to opt in to or opt out of having their actions logged by transportation matching system 102 or shared with other systems, such as, for example, by setting appropriate privacy settings. Third-party-content-object stores may be used to store content objects received from third parties. Location stores may be used for storing location information received from client devices 1706 associated with users.

In addition, the vehicle subsystem 1708 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1708 can include an autonomous vehicle—i.e., a vehicle that does not require a human operator. In these embodiments, the vehicle subsystem 1708 can perform maneuvers, communicate, and otherwise function without the aid of a human provider, in accordance with available technology.

In particular embodiments, the vehicle subsystem 1708 may include one or more sensors incorporated therein or associated thereto. For example, sensor(s) 1710 can be mounted on the top of the vehicle subsystem 1708 or else can be located within the interior of the vehicle subsystem 1708. In certain embodiments, the sensor(s) 1710 can be located in multiple areas at once—i.e., split up throughout the vehicle subsystem 1708 so that different components of the sensor(s) 1710 can be placed in different locations in accordance with optimal operation of the sensor(s) 1710. In these embodiments, the sensor(s) 1710 can include a LIDAR sensor and an inertial measurement unit ("IMU") including one or more accelerometers, one or more gyroscopes, and one or more magnetometers. The sensor(s) 1710 can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1708 may include a communication device capable of communicating with the client device 1706 and/or the transportation matching system 102. For example, the vehicle subsystem 1708 can include an on-board computing device communicatively linked to the network 1704 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying provider computing devices in a geocoded region comprising a plurality of geocoded areas;
   determining estimated times of arrival for provider computing devices in the geocoded region based on GPS location information of the provider computing devices;
   generating, utilizing a provider allocation model, a transportation flow matrix for the geocoded region based, at least in part, on the estimated times of arrival for the provider computing devices in the geocoded region;
   determining, utilizing the transportation flow matrix, provider allocation shortages for at least one of the plurality of geocoded areas of the geocoded region;
   generating, utilizing personalized provider behavioral models corresponding to the provider computing devices, and based on the provider allocation shortages determined utilizing the transportation flow matrix and on the estimated times of arrival, relocation prediction probabilities indicating individual probabilities that the provider computing devices will relocate to a target geocoded area of the plurality of geocoded areas;
   selecting a provider computing device of the provider computing devices to relocate to the target geocoded area based on the relocation prediction probabilities generated utilizing the personalized provider behavioral models; and
   providing, in real-time, to the provider computing device, a customized interface to guide the provider computing device to the target geocoded area with an updated estimated time of arrival for the provider computing device.

2. The computer-implemented method of claim 1, further comprising:
   identifying the transportation flow matrix comprising forecasted provider allocation values for the plurality of geocoded areas in the geocoded region; and
   determining, based on the transportation flow matrix, the target geocoded area of the plurality of geocoded areas by identifying a forecasted provider allocation shortage from the forecasted provider allocation values.

3. The computer-implemented method of claim 1, further comprising:
   selecting, for a second geocoded area of the plurality of geocoded areas, an available provider computing device to relocate to the second geocoded area;
   determining that the available provider computing device selected for the second geocoded area is the provider computing device selected for the target geocoded area; and
   determining to relocate the provider computing device to the target geocoded area.

4. The computer-implemented method of claim 3, wherein determining to relocate the provider computing device to the target geocoded area comprises:
   determining a first expected provider metric based on a first relocation prediction probability for the target geocoded area and a first provider allocation value for the target geocoded area;
   determining a second expected provider metric based on a second relocation prediction probability for the second geocoded area and a second allocation value for the second geocoded area; and
   determining to relocate the provider computing device to the target geocoded area based on comparing the first expected provider metric and the second expected provider metric.

5. The computer-implemented method of claim 1, further comprising:
   determining a plurality of value multipliers for the plurality of geocoded areas;
   determining, utilizing the plurality of value multipliers and the estimated times of arrival, the relocation prediction probabilities;
   determining, utilizing the relocation prediction probabilities, impacts to the estimated times of arrival caused by increasing or decreasing a number of provider computing devices within the plurality of geocoded areas; and
   providing the updated estimated time of arrival for the provider computing device according to the impacts to the estimated times of arrival.

6. The computer-implemented method of claim 1, further comprises:
   determining, for the provider computing devices utilizing the personalized provider behavioral models, incentives from a plurality of incentives based on the relocation prediction probabilities; and
   selecting the provider computing device to send to the target geocoded area based on the incentives identified utilizing the personalized provider behavioral models.

7. The computer-implemented method of claim 6, further comprising generating the customized interface for the provider computing device based on an incentive predicted for the provider computing device.

8. The computer-implemented method of claim 1, wherein the personalized provider behavioral models comprise machine learning models trained using provider-specific information and historical transportation data.

9. The computer-implemented method of claim 8, wherein:
   the historical transportation data utilized to train the machine learning models comprises at least one of: previous fulfilled transportation requests, geocoded areas where transportation requests are fulfilled, a time of day when previous transportation requests were fulfilled, previous relocation travel time to a geocoded area, or incentive types offered to or accepted by the provider computing device; and the historical transportation data utilized to train the machine learning models comprises at least one of: provider location preference, provider experience level with one or more geocoded areas in the geocoded region, provider passenger type preference, average idle time between transportation requests, or provider online/offline patterns.

10. The computer-implemented method of claim 1, wherein identifying provider computing devices in the geocoded region available to fulfill transportation requests from the target geocoded area comprises identifying provider computing devices in geocoded regions near the target geocoded area that are within a first threshold transportation radius of the target geocoded area.

11. A system comprising:
at least one processor; and
at least one non-transitory computer readable storage medium storing instructions that, when executed by the at least one processor, cause the system to:
identify provider computing devices in a geocoded region comprising a plurality of geocoded areas;
determine estimated times of arrival for provider computing devices in the geocoded region based on GPS location information of the provider computing devices;
generate, utilizing a provider allocation model, a transportation flow matrix for the geocoded region based, at least in part, on the estimated times of arrival for the provider computing devices in the geocoded region;
determine, utilizing the transportation flow matrix, provider allocation shortages for at least one of the plurality of geocoded areas of the geocoded region;
generate, utilizing personalized provider behavioral models corresponding to the provider computing devices, and based on the provider allocation shortages determined utilizing the transportation flow matrix and on the estimated times of arrival, relocation prediction probabilities indicating individual probabilities that the provider computing devices will relocate to a target geocoded area of the plurality of geocoded areas;
select a provider computing device of the provider computing devices to relocate to the target geocoded area based on the relocation prediction probabilities generated utilizing the personalized provider behavioral models; and
provide, in real-time, to the provider computing device, a customized interface to guide the provider computing device to the target geocoded area with an updated estimated time of arrival for the provider computing device.

12. The system of claim 11, further comprising instructions that, when executed by the at least one processor, cause the system to:
identify the transportation flow matrix comprising forecasted provider allocation values for the plurality of geocoded areas in the geocoded region; and
determine, based on the transportation flow matrix, the target geocoded area of the plurality of geocoded areas by identifying a forecasted provider allocation shortage from the forecasted provider allocation values.

13. The system of claim 11, further comprising instructions that, when executed by the at least one processor, cause the system to:
determine a first expected provider metric based on a first relocation prediction probability for a target geocoded area and a first provider allocation value for the target geocoded area;

determine a second expected provider metric based on a second relocation prediction probability for a second geocoded area and a second allocation value for the second geocoded area; and
relocate the provider computing device to the target geocoded area based on comparing the first expected provider metric and the second expected provider metric.

14. The system of claim 11, further comprising instructions that, when executed by the at least one processor, cause the system to:
determine, for the provider computing devices utilizing the personalized provider behavioral models, incentives from a plurality of incentives based on the relocation prediction probabilities;
select the provider computing device to send to the target geocoded area based on the incentives identified utilizing the personalized provider behavioral models; and
customize the customized interface for the provider computing device based on an incentive predicted for the provider computing device.

15. The system of claim 11, wherein the personalized provider behavioral models comprise machine learning models trained using provider-specific information and historical transportation data.

16. A non-transitory computer readable medium storing instructions thereon that, when executed by at least one processor, cause a computing device to:
identify provider computing devices in a geocoded region comprising a plurality of geocoded areas;
determine estimated times of arrival for provider computing devices in the geocoded region based on GPS location information of the provider computing devices;
generate, utilizing a provider allocation model, a transportation flow matrix for the geocoded region based, at least in part, on the estimated times of arrival for the provider computing devices in the geocoded region;
determine, utilizing the transportation flow matrix, provider allocation shortages for at least one of the plurality of geocoded areas of the geocoded region;
generate, utilizing personalized provider behavioral models corresponding to the provider computing devices, and based on the provider allocation shortages determined utilizing the transportation flow matrix and on the estimated times of arrival, relocation prediction probabilities indicating individual probabilities that the provider computing devices will relocate to a target geocoded area of the plurality of geocoded areas;
select a provider computing device of the provider computing devices to relocate to the target geocoded area based on the relocation prediction probabilities generated utilizing the personalized provider behavioral models; and
provide, in real-time to the provider computing device, a customized interface to guide the provider computing device to the target geocoded area with an updated estimated time of arrival for the provider computing device.

17. The non-transitory computer readable medium of claim 16, further comprising instructions that, when executed by the at least one processor, cause the computing device to:
identify the transportation flow matrix comprising forecasted provider allocation values for the plurality of geocoded areas in the geocoded region; and determine, based on the transportation flow matrix, the target geocoded area of the plurality of geocoded areas by identifying a forecasted provider allocation shortage from the forecasted provider allocation values.

18. The non-transitory computer readable medium of claim 16, further comprising instructions that, when executed by the at least one processor, cause the computing device to:
- determine a first expected provider metric based on a first relocation prediction probability for a target geocoded area and a first provider allocation value for the target geocoded area;
- determine a second expected provider metric based on a second relocation prediction probability for a second geocoded area and a second allocation value for the second geocoded area; and
- relocate the provider computing device to the target geocoded area based on comparing the first expected provider metric and the second expected provider metric.

19. The non-transitory computer readable medium of claim 16, further comprising instructions that, when executed by the at least one processor, cause the computing device to:
- determine, for the provider computing devices utilizing the personalized provider behavioral models, incentives from a plurality of incentives based on the relocation prediction probabilities;
- select the provider computing device to send to the target geocoded area based on the incentives identified utilizing the personalized provider behavioral models; and
- customize the customized interface for the provider computing device based on an incentive predicted for the provider computing device.

20. The non-transitory computer readable medium of claim 16, wherein the personalized provider behavioral models comprise machine learning models trained using provider-specific information and historical transportation data.

\* \* \* \* \*